US006111336A

United States Patent [19]
Yoshida et al.

[11] Patent Number: 6,111,336
[45] Date of Patent: *Aug. 29, 2000

[54] DRIVING APPARATUS USING TRANSDUCER

[75] Inventors: Ryuichi Yoshida, Sakai; Yasuhiro Okamoto, Tondabayashi; Minoru Kuwana, Osaka, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/947,806

[22] Filed: Oct. 9, 1997

Related U.S. Application Data

[63] Continuation of application No. 08/679,034, Jul. 12, 1996, abandoned, which is a continuation of application No. 08/404,240, Mar. 15, 1995, Pat. No. 5,589,723.

[51] Int. Cl.$^7$ ..................................................... H02N 2/00
[52] U.S. Cl. .......................................... 310/328; 310/317
[58] Field of Search ...................................... 310/328, 317

[56] References Cited

U.S. PATENT DOCUMENTS

| | | | |
|---|---|---|---|
| 4,195,243 | 3/1980 | Thaxter | 310/317 |
| 4,468,583 | 8/1984 | Mori | 310/328 |
| 4,613,782 | 9/1986 | Mori et al. | 310/328 |
| 4,620,122 | 10/1986 | Howell | 310/328 |
| 4,645,964 | 2/1987 | Hiramatsu et al. | 310/323 |
| 4,736,131 | 4/1988 | Fujimoto | 310/328 |
| 4,894,579 | 1/1990 | Higuchi et al. | 310/328 |
| 4,947,077 | 8/1990 | Murata | 310/328 |
| 5,013,956 | 5/1991 | Kurozumi et al. | 310/323 |
| 5,013,958 | 5/1991 | Ohnishi et al. | 310/323 |
| 5,036,245 | 7/1991 | Ohnishi et al. | 310/323 |
| 5,039,899 | 8/1991 | Yamaguchi | 310/323 |
| 5,166,572 | 11/1992 | Ohnishi | 310/323 |
| 5,170,088 | 12/1992 | Naito et al. | 310/323 |
| 5,225,941 | 7/1993 | Saito et al. | 359/824 |
| 5,233,258 | 8/1993 | Myoga et al. | 320/323 |
| 5,237,238 | 8/1993 | Berghaus et al. | 310/328 |
| 5,252,884 | 10/1993 | Dona | 310/328 |
| 5,410,206 | 4/1995 | Luecke et al. | 310/328 |
| 5,424,597 | 6/1995 | Gloss et al. | 310/328 |
| 5,455,478 | 10/1995 | Kimura et al. | 310/323 |
| 5,465,021 | 11/1995 | Visscher et al. | 310/328 |
| 5,523,643 | 6/1996 | Fujimura et al. | 310/328 |
| 5,554,905 | 9/1996 | Gschwind et al. | 310/323 |
| 5,563,465 | 10/1996 | Nakahara et al. | 310/328 |
| 5,589,723 | 12/1996 | Yoshida et al. | 310/328 |
| 5,596,242 | 1/1997 | Seki et al. | 310/328 |

FOREIGN PATENT DOCUMENTS

| | | | |
|---|---|---|---|
| 61-224883 | 10/1986 | Japan | H02N 2/80 |
| 1-303361 | 12/1989 | Japan | F16H 25/20 |
| 4-17584 | 1/1992 | Japan | H02N 2/00 |
| 4-69070 | 3/1992 | Japan | H02N 2/00 |

*Primary Examiner*—Thomas M. Dougherty
*Attorney, Agent, or Firm*—Sidley & Austin

[57] ABSTRACT

A driving apparatus using a transducer. The apparatus comprises an electromechanical transducer, a driving shaft, a moving member and a pushing member. The driving shaft is coupled with the electro-mechanical transducer; the moving member is pushed against the driving shaft for frictional coupling therewith, the pushing member being interposed between the driving shaft and the moving member. The moving member is connected with the target moving object such as a lens mechanism. In operation, the electromechanical transducer is fed with driving pulses of a frequency of at least 18 kHz so that the transducer and the driving shaft will be displaced slowly in one direction and rapidly in the opposite direction, whereby the moving member coupled frictionally with the driving shaft is driven axially in a reciprocating manner at two different velocities. Repeating these operations allows the moving member to move slowly in the same axial direction in which the driving shaft is driven, whereby the lens mechanism or the like connected to the moving member is moved up to the desired position.

17 Claims, 43 Drawing Sheets

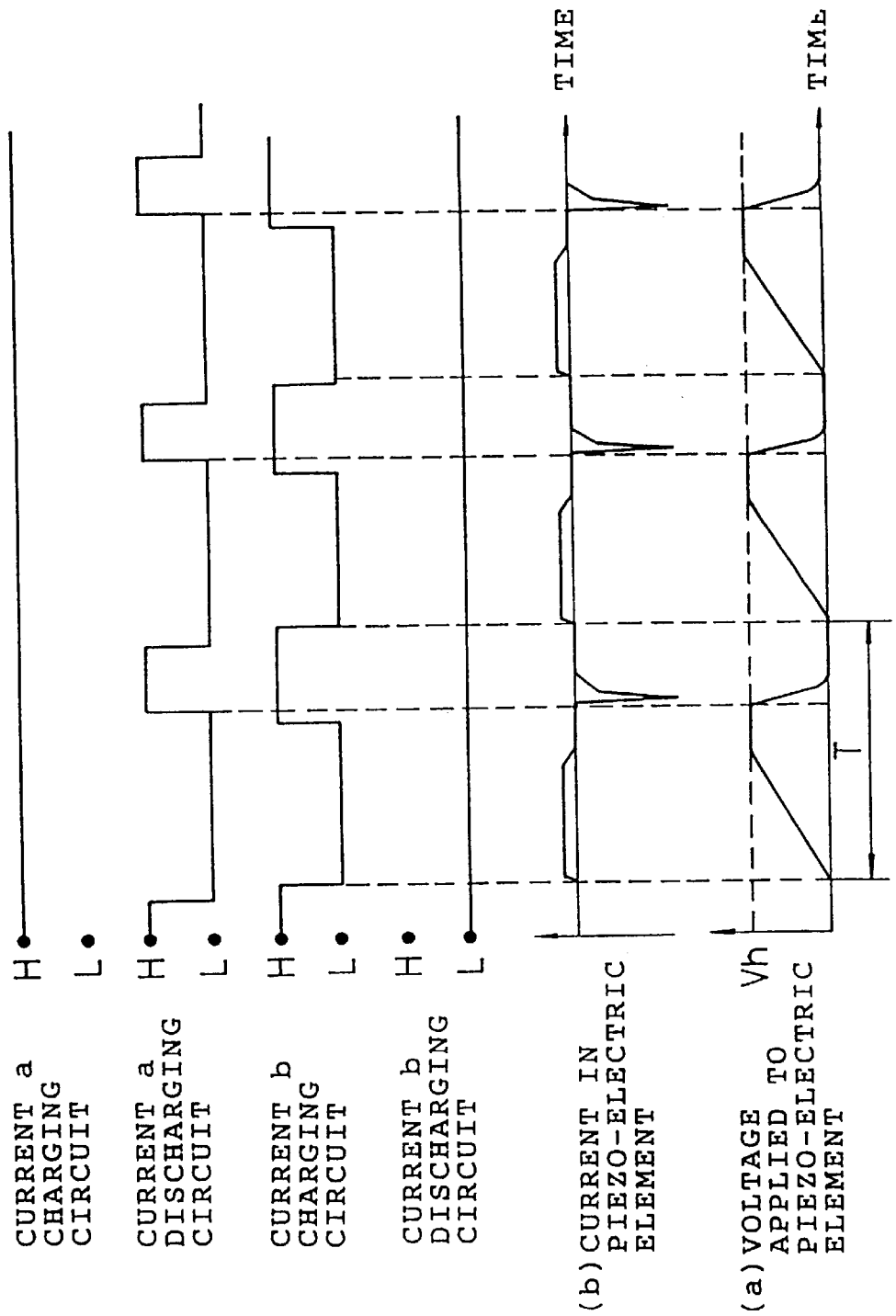

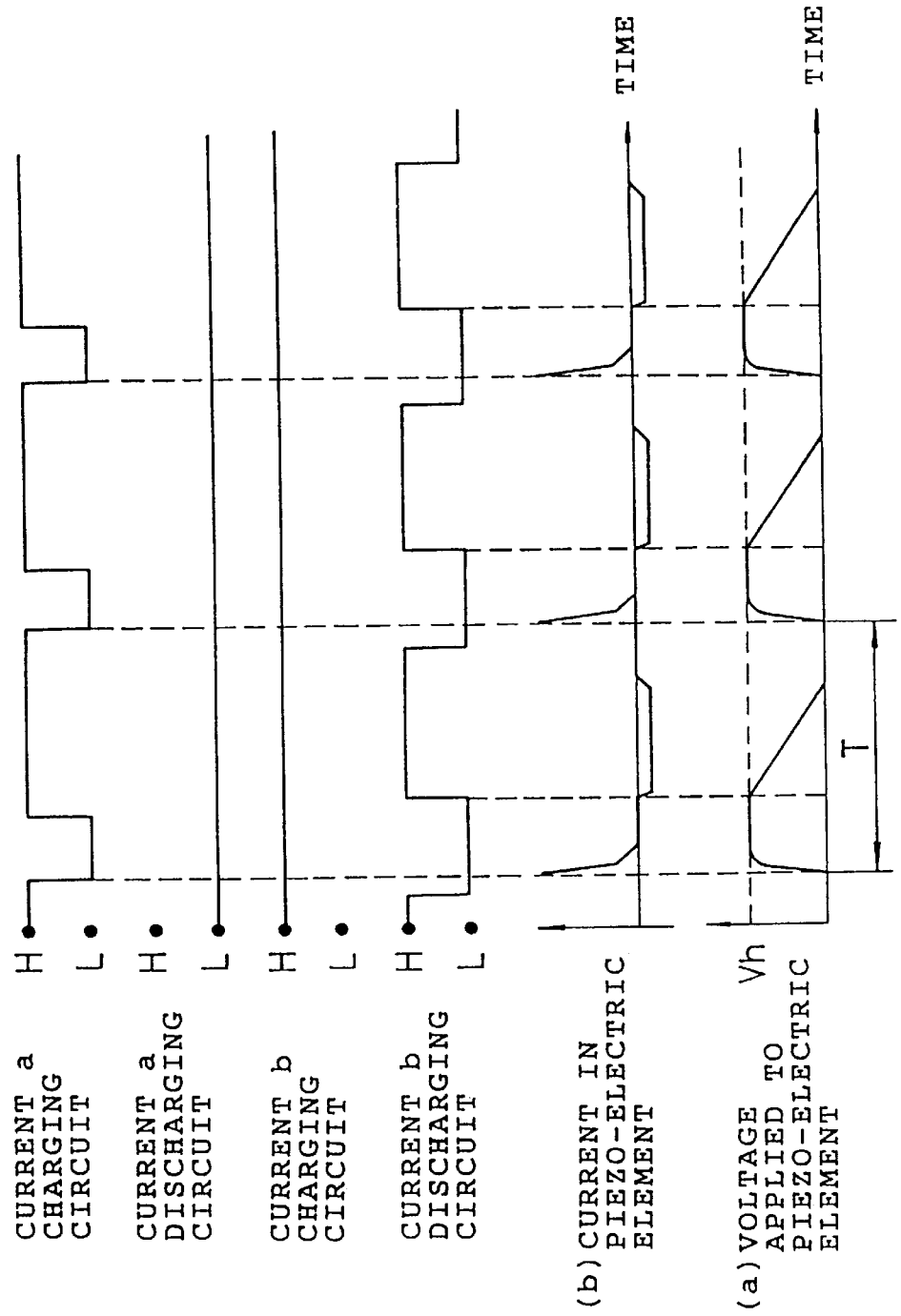

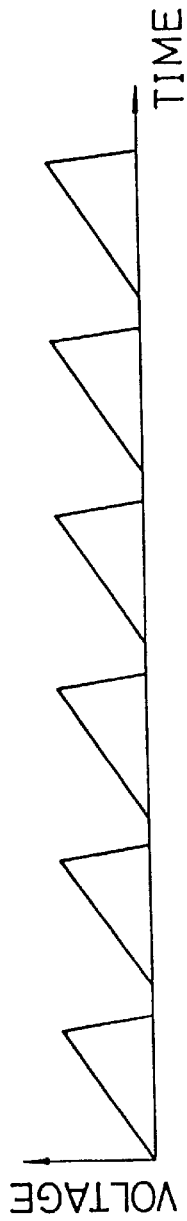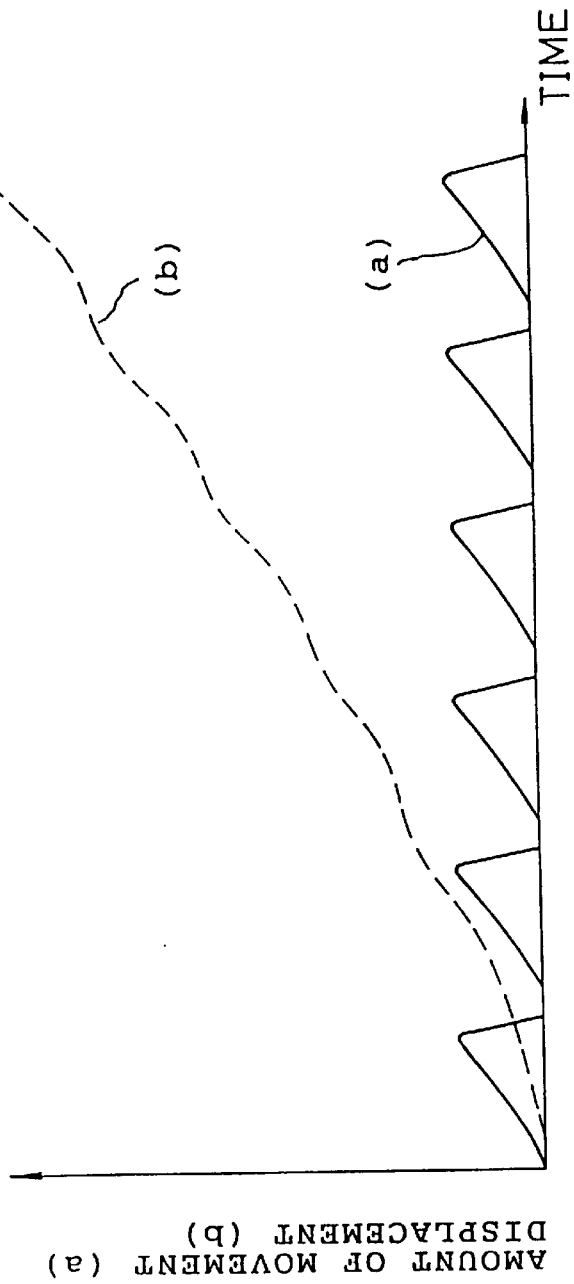

FIG.30(a)

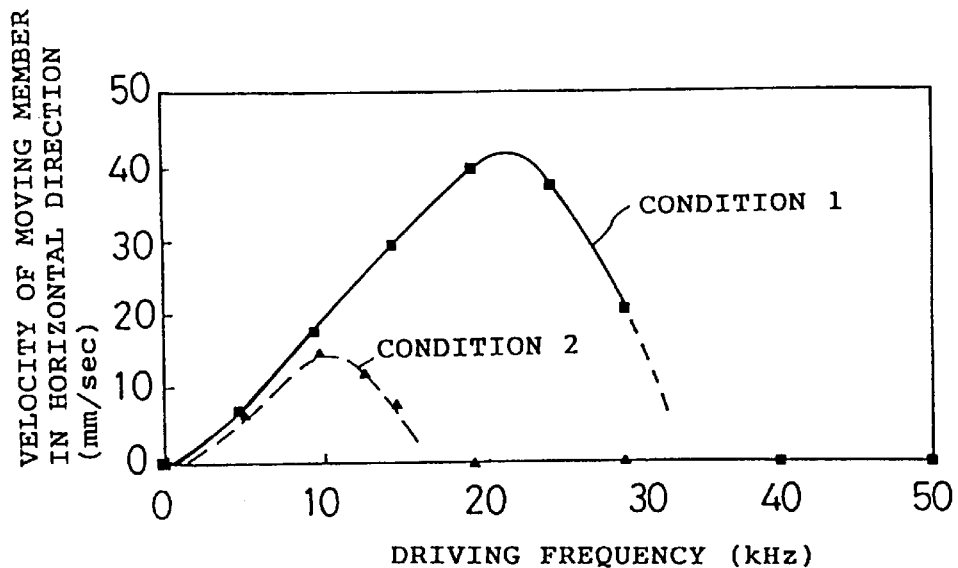

FIG.30(b)

|  | CONDITION 1 | CONDITION 2 |
|---|---|---|
| PIEZO-ELECTRIC ELEMENT | SIZE: 2×2×9 mm<br>MASS: 0.28 g<br>RESONANT FREQ.: 138 kHz | |
| DRIVING MEMBER<br>  MATERIAL:<br><br>  MASS:<br>  RESONANT FREQ.<br>  OF COMPONENT<br>  SYSTEM: | CARBON FIBER<br>REINFORCED<br>RESIN<br>0.2 g<br>45 kHz | STAINLESS STEEL<br>(SUS)<br><br>1.0 g<br>25 kHz |
| MAX. DRIVING VOLTAGE | 30 V | ← |
| WAVEFORM | ⎓ | ← |
| MASS OF MOVING MEMBER Mm | 20 g | ← |
| SPRING FORCE Fb<br>FRICTIONAL FORCE Fs | 500 gf<br>200 gf | ←<br>← |

|  | CONDITION 1 | CONDITION 2 |
|---|---|---|
| PIEZO-ELECTRIC ELEMENT | SIZE: 2×2×9 mm<br>MASS: 0.28 g<br>RESONANT FREQ.: 138 kHz | |
| DRIVING MEMBER<br>MATERIAL:<br><br>MASS:<br>RESONANT FREQ.<br>OF COMPONENT<br>SYSTEM: | CARBON FIBER<br>REINFORCED<br>RESIN<br>0.2 g<br>45 kHz | ← |
| MAX. DRIVING VOLTAGE | 30 V | 20 V |
| WAVEFORM | ⟋‾⟍_ | ← |
| MASS OF MOVING MEMBER Mm | 20 g | ← |
| SPRING FORCE Fb<br>FRICTIONAL FORCE Fs | 500 gf<br>200 gf | ←<br>← |

|  | CONDITION 1 | CONDITION 2 |
|---|---|---|
| PIEZO-ELECTRIC ELEMENT | SIZE: 2×2×9 mm<br>MASS: 0.28 g<br>RESONANT FREQ.: 138 kHz |  |
| DRIVING MEMBER<br>MATERIAL:<br><br>MASS:<br>RESONANT FREQ.<br>OF COMPONENT<br>SYSTEM: | CARBON FIBER<br>REINFORCED<br>RESIN<br>0.2 g<br>45 kHz | ← |
| MAX. DRIVING VOLTAGE | 30 V | ← |
| WAVEFORM | ⎍ OPTIMUM | ◢ SAW TOOTH |
| MASS OF MOVING MEMBER Mm | 20 g | ← |
| SPRING FORCE Fb<br>FRICTIONAL FORCE Fs | 500 gf<br>200 gf | ← |

|  | CONDITION 1 | CONDITION 2 |
|---|---|---|
| PIEZO-ELECTRIC ELEMENT | SIZE: 2×2×9 mm<br>MASS: 0.28 g<br>RESONANT FREQ.: 138 kHz | ← |
| DRIVING MEMBER<br>  MATERIAL:<br><br>  MASS:<br>  RESONANT FREQ.<br>  OF COMPONENT<br>  SYSTEM: | CARBON FIBER<br>REINFORCED<br>RESIN<br>0.2 g<br>45 kHz | ← |
| MAX. DRIVING VOLTAGE | 30 V | ← |
| WAVEFORM | ⎍ | ← |
| MASS OF MOVING MEMBER Mm | 20 g | 40 g |
| SPRING FORCE Fb<br>FRICTIONAL FORCE Fs | 500 gf<br>200 gf | ←<br>← |

|  | CONDITION 1 | CONDITION 2 |
|---|---|---|
| PIEZO-ELECTRIC ELEMENT | SIZE: 2×2×9 mm<br>MASS: 0.28 g<br>RESONANT FREQ.: 138 kHz | |
| DRIVING MEMBER<br>MATERIAL:<br><br>MASS:<br>RESONANT FREQ.<br>OF COMPONENT<br>SYSTEM: | CARBON FIBER<br>REINFORCED<br>RESIN<br>0.2 g<br>45 kHz | ← |
| MAX. DRIVING VOLTAGE | 30 V | ← |
| WAVEFORM | ⎍ | ← |
| MASS OF MOVING MEMBER Mm | 20 g | ← |
| SPRING FORCE Fb<br>FRICTIONAL FORCE Fs | 500 gf<br>200 gf | 1000 gf<br>400 gf |

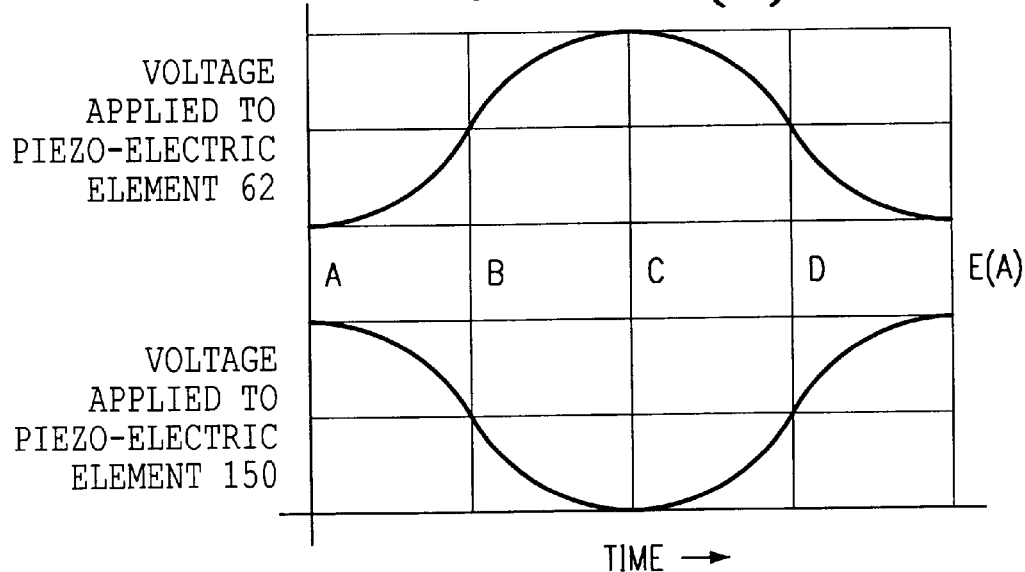
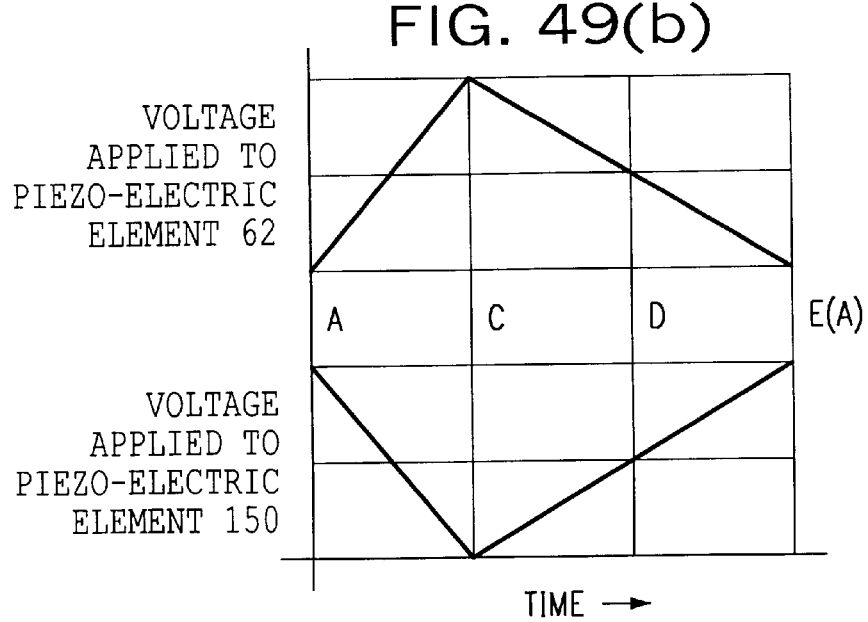

DRIVING APPARATUS USING TRANSDUCER

CROSS REFERENCE TO RELATED APPLICATION

This is a continuation of U.S. patent application Ser. No. 08/679,034 filed Jul. 12, 1996, now abandoned, which is a continuation of U.S. patent application Ser. No. 08/404,240 filed Mar. 15, 1995, now U.S. Pat. No. 5,589,723.

BACKGROUND OF THE INVENTION

1. Field of the Invention

The present invention relates generally to a driving apparatus for driving lenses and other parts using a transducer such as an electro-mechanical transducer. More particularly, the invention relates to a driving apparatus which drives such optical system lenses as the photographic lenses of cameras, projection lenses of overhead projectors, binocular lenses and copier lenses, the apparatus being also used in driver-equipped devices such as plotters and X-Y drive tables.

2. Description of the Related Art

There have been proposed impact type driving apparatuses using an electro-mechanical transducer having a piezo-electric element for driving component parts in cameras and other precision equipment. One such driving apparatus is disclosed in Japanese Patent Laid-Open No. Hei 4-69070. The disclosed apparatus will now be outlined with reference to FIGS. 50 and 51. The mechanical parts shown in FIG. 50 may also be utilized in implementing the driving apparatus of this invention.

FIG. 50 illustrates a lens driving apparatus in which reference numeral 201 is a lens supporting barrel and 203 is a guide bar that supports and guides the barrel 201 in the optical axis direction. The guide bar 203 supporting and guiding the barrel 201 penetrates a fork 201f formed on a support member 201e extending from the barrel 201.

Reference numeral 217 is a driving member that doubles as a barrel support member. The member 217 supports the barrel 201 in cooperation with the support member 201e while driving the barrel 201 axially. The driving member 217 penetrates bearing holes 213b and 213d formed respectively on bearings 213a and 213c. The bearings 213a and 213c are furnished on a support member 213. Located as shown, the driving member 217 is movable axially. The driving member 217 further penetrates holes 201b and 201d formed respectively on two ends 201a and 201c of a bracket 201k. The bracket 201k extends from the barrel 201 in the opposite direction of the support member 201e. The rear end of the driving member 217 is fastened to the front end of a piezo-electric element 212. The rear end of the piezo-electric element 212 is fixed to another end plate 213e of the support member 213.

In FIG. 50, a plate spring 214 is attached with screws 215 and 216 to the two ends 201a and 201c of a bracket 201k from below. The plate spring 214 is positioned so as to be parallel to the driving member 217. In the approximate middle of the plate spring 214 is a friction part 214c protruding upward. When coming into contact with the driving member 217, the friction part 214c produces a frictional force between the barrel 201 (whose contacting part is the bracket 201k) and the driving member 217. The frictional force drives the barrel 201 that is frictionally coupled. The frictional force derives from and varies with the spring pressure of the plate spring 214.

A driving circuit 205 supplies the piezo-electric element 212 with a voltage. The piezo-electric element 212 is expanded or contracted in accordance with the supplied voltage. A position detecting circuit 208 detects the position of the barrel 201. When the barrel 201 is driven and detected to have reached its target position, the detecting circuit 208 orders the driving circuit 205 to stop. This terminates the supply of the voltage to the piezo-electric element 212.

As the piezo-electric element is expanded or contracted by the supplied voltage in order to actuate the driving member 217 in its longitudinal direction, the resulting frictional force moves the frictionally coupled barrel 201 accordingly. When the barrel 201 reaches its target position, the expansion or contraction of the piezo-electric element 212 ends and the driving action comes to an end.

Suppose that with the driving member 217 positioned horizontally, N stands for the vertical drag of the driving member 217 against the pressure from the plate spring 214, $\mu$ for the coefficient of static friction between the driving member 217 and the barrel 201, and Mm for the moving member mass involved. In that case, the maximum coefficient of static friction Fs between the driving member 217 ad the barrel 201 is given as:

$$Fs = \mu(Mm \cdot g + N)$$

If the coefficient of dynamic friction is assumed to be represented by $\mu'$, the dynamic frictional force Fd of this example is given as:

$$Fd = \mu'(Mm \cdot g + N)$$

As the driving member 217 is moved, the resulting frictional force moves the barrel 201 accordingly. If the acceleration of the driving member 217 is sufficiently small, the barrel 201 can move without sliding over the driving member 217. Once beyond a critical value, the acceleration causes the barrel 201 to slide over the driving member 217. The critical value Al for the acceleration is given as:

$$Al = Fs/Mm$$

With conventional driving apparatuses of the above kind, when the driving member is moved in the target direction, the acceleration of the driving member (i.e., barrel) is set below the critical value Al so as not to let the moving member slide over the driving member; when the driving member is moved opposite to the target direction, the acceleration of the driving member is set beyond the critical value Al so as to have the moving member slide over the driving member.

Referring to FIG. 50, suppose that the barrel 201 (i.e., moving member) is driven in the direction of the arrow a (in the direction in which the lens is moved) by the piezo-electric element 212. In this example, the voltage applied to the piezo-electric element 212, displacements, velocities and acceleration are shown in FIG. 51 through FIG. 54. In FIG. 52 through FIG. 54, solid lines (a) represent the characteristics of the driving member 217 and broken lines (b) denote those of the moving member (barrel) 201.

FIG. 51 shows a typical waveform of pulses applied to the piezo-electric element 212. At each pulse, the voltage is slowly raised and then rapidly turned off. This keeps the acceleration from exceeding the critical value while the voltage is being applied to the piezo-electric element 212. With the acceleration held below the critical value, the moving member moves together with the driving member. When the voltage is turned off, the acceleration exceeds the critical value Al so that the moving member remains substantially stationary (or slightly retracted under some circumstances) whereas the driving member alone returns to its initial position. Repeating this action translates the reciprocal motion of the driving member into a unidirectional movement of the moving member. FIG. 52 depicts how the conventional driving and moving members are displaced over time.

FIG. 53 indicates typical velocities at which the driving member and the moving member are moved, and FIG. 54 illustrates how the driving member and the moving member are typically accelerated over time. As shown, the higher the frequency of the supplied voltage (i.e., driving frequency), the higher the velocity of the moving member.

The driving member and the moving member (i.e., barrel 201) may also be coupled frictionally as shown in FIG. 55. In FIG. 55, a lens barrel 221 (moving member) is furnished peripherally with notched sleeves 222 and a groove 223. A driving shaft 225 (driving member) penetrates the sleeves 222, and a support shaft 226 is engaged with the groove 223. Springs 227 engaged with the grooves of the sleeves 222 are pressed against the driving shaft 225. This generates an appropriate frictional force between the contacting parts.

In acquiring their driving force, the above-described driving apparatuses using the electro-mechanical transducer utilize the frictional coupling force between the moving member and the driving member attached to the transducer. The driving force thus obtained is not sufficient where the frictional coupling force is not enough between the driving and the moving member, e.g., in a setup where lubricant is introduced between the driving and the moving member, or in a case where the contact surface of the moving member needs to be specularly finished with regard to the other parts involved.

When driving apparatuses of this kind are used in cameras or other portable devices, the positional relationship between the driving and the moving member varies with the attitude in which the portable device is operated. This causes the frictional coupling force between the driving and the moving member to fluctuate, making it difficult to ensure stable driving force.

In the examples of FIGS. 50 through 55, attempts could be made to increase the recoiling force of the plate spring so as to generate a sufficient frictional coupling force between the moving member and the driving member equipped with the plate spring. In such cases, the contacting portions form a point or a line. This can result in an abnormally increased contact pressure concentration making the acquisition of steady driving force difficult.

The above-described driving apparatuses using the electro-mechanical transducer such as the piezo-electric element utilize the expansion and contraction of that transducer for the actuating motion. The velocity of the moving member is associated with the frequency of driving pulses applied to the electro-mechanical transducer and with the amount of displacement of the transducer fed with such driving pulses. Under this condition, as long as the displacement of the electro-mechanical transducer varies more or less proportionately depending on the driving pulses applied thereto, the velocity of the moving member may be increased by raising the frequency of the driving pulses.

When the velocity ratio of expansion to contraction of the electro-mechanical transducer (i.e., expanding velocity/contracting velocity) is sufficiently high (2, 3 or higher from the inventors' experiments), the amount of movement of the moving member is close to the amount of the electro-mechanical transducer activated by each driving pulse applied to the latter.

However, electro-mechanical transducers have a physical characteristic called a delayed response. The delayed response is a phenomenon wherein the electro-mechanical transducer produces a displacement upon elapse of a certain period of time following the supply of a driving pulse. Because of this characteristic, higher frequencies of the driving pulses applied to the electro-mechanical transducer are more liable to cause the expanding and contracting displacements to overlap. The phenomenon eventually reduces the velocity ratio of expansion to contraction of the electro-mechanical transducer. Furthermore, the delayed response time varies with the mass of the driving and moving members as well as with the elastic modulus thereof.

When the electro-mechanical transducer is supplied with sawtooth driving pulses such as those used in the examples above, the transducer generates vibration called ringing. Thus the electro-mechanical transducer adds the ringing vibration to the displacement it generates. When the displacement of the electro-mechanical transducer is supplemented by the ringing vibration, the driving member coupled to with the transducer vibrates simultaneously. This reduces the velocity of the moving member in motion.

It is a known fact that the ringing vibration is avoided by making the rise time of each driving pulse an integer multiple of the resonance frequency of the driving system in use. However, the moving member is moved only when the rise time of each driving pulse is made shorter than the fall time thereof. This means that the rise time of the driving pulse must be less than half of, or in practice much smaller than, each driving period. Where the driving period is substantially short, the method of making the pulse rise time an integer multiple of the resonance frequency cannot be practiced.

In the conventional setup of FIG. 50, a rapid expansion or contraction of the piezo-electric element 212 causes the dynamic frictional force between the barrel 201 and the driving member 217 to shift the barrel 201 more or less together with the driving member 217. This can move the barrel 201 opposite to the desired direction, causing losses in its displacement. The greater the frictional force, the larger the driving losses. However, contrary to what might be expected from this, reducing the frictional force may not be preferable in practice for the following reasons:

The greater the inertia of the driving system, the greater the frictional force the system needs for its actuating motion. If the mass of the member to be driven becomes larger, the frictional force must be increased correspondingly to counter it. It may well be that the practiced application in question will not work unless a substantially large frictional force is somehow generated.

Furthermore, since lower frequencies of driving pulses fed to the piezo-electric element 212 can raise the vibration noise to an annoyingly audible level, relatively high driving frequencies are preferred in practice. This, however, means that even slow expansion and contraction of the piezo-electric element 212 can result in a fairly high velocity of displacement. For the barrel 201 (moving member) to by driven by the driving member 217 then requires a substantially large frictional force.

Suppose that there is provided a setup where a plate spring is pressed directly against the driving member to generate the necessary frictional force in the contacting portions. In this setup, the driving member is assumed to move reciprocally at varying velocities in the forward and reverse directions with respect to the axial direction. In such a case, the plate spring deforms elastically in its moving direction. Specifically, that part of the plate spring which contacts the driving member is deformed relative to the moving member. This means that the displacement caused by the reciprocal motion of the driving member cannot be transmitted precisely to the moving member. As a result, the moving member such as the lens barrel cannot be moved as desired.

With the above-mentioned impact type driving apparatus using the electro-mechanical transducer, the transducer fed with driving pulses of a given frequency mechanically vibrates the driving system composed of the driving member and of the moving member frictionally coupled with the driving member. This inevitably causes the driving system to generate a vibration noise corresponding to the frequency of the supplied driving pulses.

The impact type driving apparatus generally adopts driving pulses having frequencies ranging approximately from 100 to 500 Hz. When such a driving apparatus is activated, the vibrating noise is audible to the human ear. Conventionally, few measures have been taken specifically to inhibit such noise. The relatively low level of the generated noise did not encourage the effort to suppress it.

When a driving apparatus of the above kind is incorporated in portable equipment used under quiet circumstances, the vibrating noise from the driving apparatus in motion becomes conspicuous. In particular, if the equipment incorporating the driving apparatus is a camera operated illustratively in a concert hall, the noise from the activated apparatus cannot be ignored.

In the conventional setup of FIG. 50, parts of the driving apparatus cannot be replaced unless the entire setup is taken apart. This is because the driving member 217 is coupled directly to the barrel 201. Where the electro-mechanical transducer such as a piezo-electric element is used for the driving action, the reciprocating motion takes place rapidly. This causes the electro-mechanical transducer, the driving member and the moving member to suffer from impact-related breakage and from the impact-induced peeling of bonded parts more often in the above apparatus than in other kinds of driving apparatuses. Such irregularities, if developed in the above type of driving apparatus, are difficult to deal with.

The entire setup of the driving apparatus also needs to be disassembled conventionally when it is desired to repair and/or clean the driven parts (the barrel and lens in the above example).

Also in the setup of FIG. 50, it is impossible to remove the driving apparatus alone without disassembling the whole setup. This means that the driving apparatus alone cannot be tested independently for performance; it must be assembled into the target equipment, tested for performance, and dismounted again if necessary from the target equipment for further adjustment. The procedure adds redundant steps to the process of manufacturing the target product and thus leads to cost increases.

Furthermore, the conditions for efficiently activating driving apparatuses using the above-mentioned impact type actuator have yet to be fully clarified.

SUMMARY OF THE INVENTION

It is therefore a principal object of the present invention to provide a driving apparatus using a general-purpose transducer, the apparatus driving the target moving member at higher velocities than ever before.

It is another object of the invention to provide a driving apparatus using a transducer, the apparatus furnishing a sufficient frictional coupling force between the driving and the moving member in use.

It is a further object of the invention to provide a driving apparatus using a transducer, the apparatus driving the target moving member with a driving member at higher velocities than before by minimizing the delayed response of the transducer incorporating that driving member.

It is an even further object of the invention to provide a driving apparatus using a transducer, the apparatus driving the target moving member at higher velocities than before by employing an appropriately selected material from which to make the driving member of the transducer, the driving member of the selected material minimizing the delayed response of the transducer.

It is a still further object of the invention to provide a driving apparatus using a transducer, the apparatus driving the target moving member at higher velocities than before by suppressing the ringing vibration generated by the transducer.

It is a yet further object of the invention to provide a driving apparatus using a transducer, the apparatus in motion preventing its vibrating noise from reaching an acoustic level audible to the human ear.

It is another object of the invention to provide a driving apparatus using a transducer, the apparatus preventing losses in the driving action while remaining practically effective when used in the target application in question.

It is a further object of the invention to provide a driving apparatus using a transducer which works efficiently by employing driving pulses of an optimum frequency range.

These and other objects, features and advantages of the invention will become more apparent upon a reading of the following description and appended drawings.

BRIEF DESCRIPTION OF THE DRAWINGS

FIG. 6($b$) is a diagram of typical displacements generated by the piezo-electric element supplied over time with the pulses of FIG. 6($a$);

FIG. 8($b$) is a view of typical displacements generated over time by the piezo-electric element;

FIG. 25 is a timing chart depicting typical timings of a driving mechanism in its expanding action;

FIG. 26 is a timing chart showing typical timings of the driving mechanism in its contracting action;

FIG. 27(a) is a diagram illustrating a typical waveform of the voltage applied to a piezo-electric element;

FIG. 27(b) is a diagram illustrating displacements of a driving shaft activated in response to the applied voltage whose waveform is shown in FIG. 27(a), the diagram also indicating the amount of movement of a slider frictionally coupled with the driving shaft;

FIG. 30(a) and FIG. 30(b) are diagrams showing how, at different resonance frequencies, the driving frequency for a driving member is typically related to changes in the velocity of a moving member moved horizontally by the driving member;

FIG. 49(a) and FIG. 49(b) are diagrams showing varying voltages applied to a piezo-electric element;

DETAILED DESCRIPTION OF THE PREFERRED EMBODIMENTS

Figure 1:
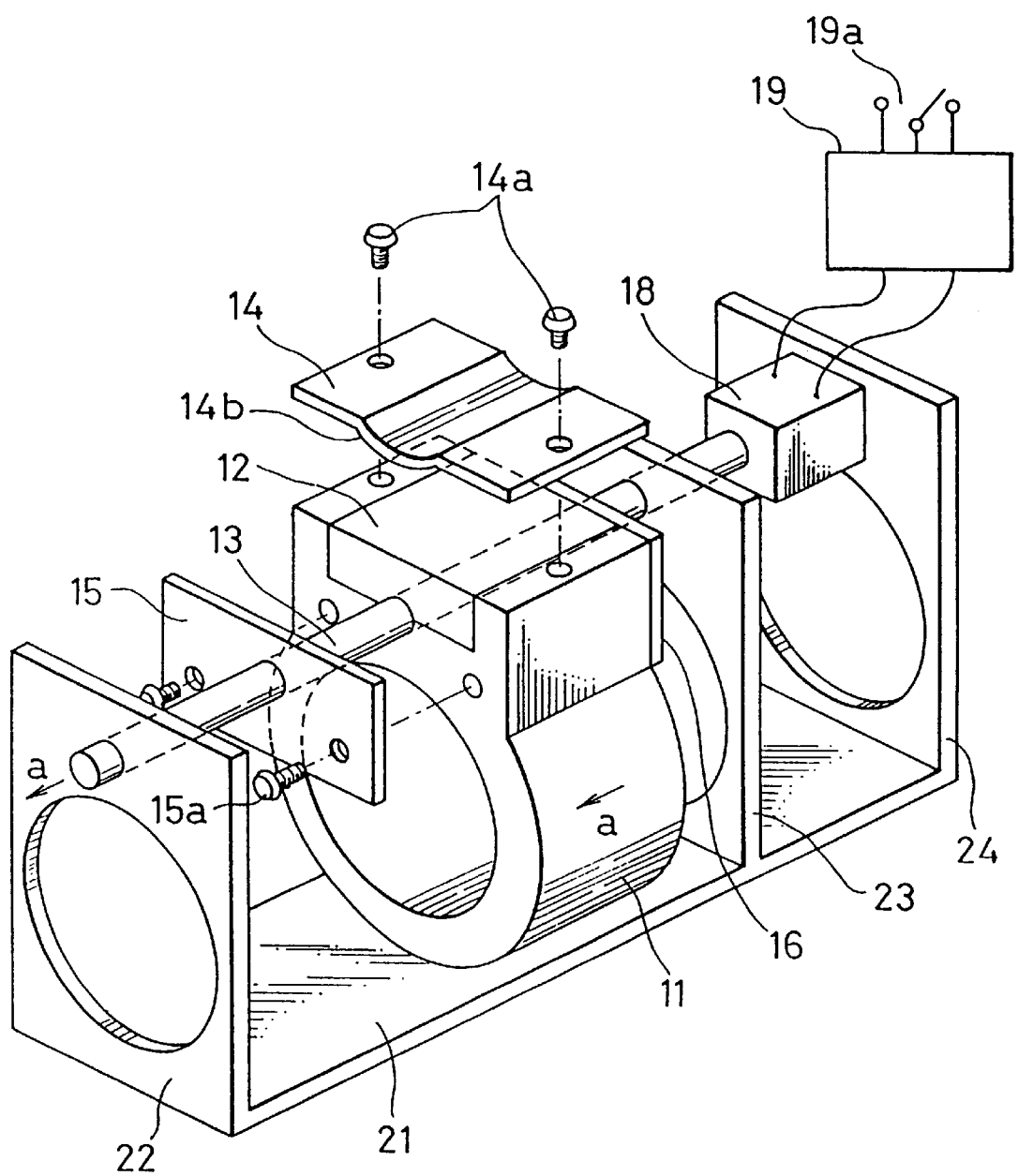
FIG. 1 is a perspective view of a driving apparatus using an electro-mechanical transducer practiced as a first embodiment of the invention.

Preferred embodiments of this invention will now be described with reference to the accompanying drawings. FIG. 1 shows a driving apparatus practiced as the first embodiment of the invention, the embodiment being applied to the driving mechanism of a zoom lens.

In FIG. 1, reference numeral 11 is a zoom lens barrel that is driven by the apparatus; 12 is a friction plate; 13 is a driving shaft; and 14 is a pressure contact spring. The pressure contact spring 14 is fastened to the zoom lens barrel 11 with small screws 14a. The pressure contact spring 14 is secured in such a manner that a curved portion 14b in the middle of the spring pushes the friction plate 12 downward. Keep plates 15 and 16 are furnished to prevent the friction plate 12 from getting dislodged in the axial direction of the driving shaft 13. The keep plates 15 and 16 are fixed with small screws 15a to the right- and left-hand ends of the zoom lens barrel 11.

The driving shaft 13 penetrates the zoom lens barrel 11 and friction plate 12. The pressure contact spring 14 pushes the friction plate 12 in a way that engages the driving shaft 13 with the zoom lens barrel 11. Thus the driving shaft 13 comes into surface-to-surface contact with both the zoom lens barrel 11 and the friction plate 12, generating a suitable frictional force over the contacting surfaces. The peripheral surface of the driving shaft 13 serves as a guide surface for guiding the zoom lens barrel 11 and friction plate 12 in their movement.

It may be desired that the zoom lens barrel 11 is not to be rotated around the driving shaft 13. In that case, a support shaft, not shown, may be provided in parallel with the driving shaft 13 as in the case of the conventional setup of FIG. 50. That is, the zoom lens barrel 11 will be supported both by the driving shaft 13 and by the support shaft.

Reference numeral 21 in FIG. 1 represents a frame, and 22 as well as 23 denote support plates furnished to the frame 21 and supporting the driving shaft 13 in an axially movable manner. Reference numeral 18 is a piezo-electric element that is displaced in the direction of its thickness. One end of the piezo-electric element 18 is fixed to one end of the driving shaft 13; the other end of the element is secured to a support plate 24 furnished to the frame 21. The electrode of the piezo-electric element 18 is connected to a power unit 19, to be described later.

Figure 4:
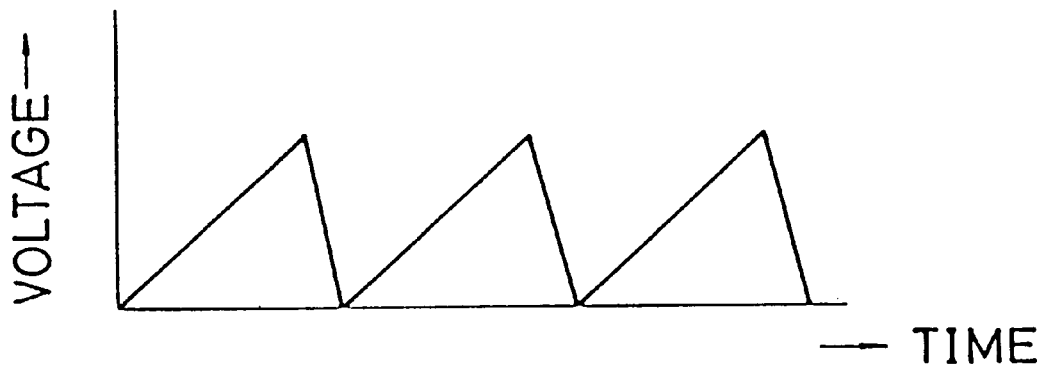
FIG. 4($a$) and FIG. 4($b$) are diagrams showing typical waveforms of driving pulses applied over time to a piezo-electric element.
Figure 4:
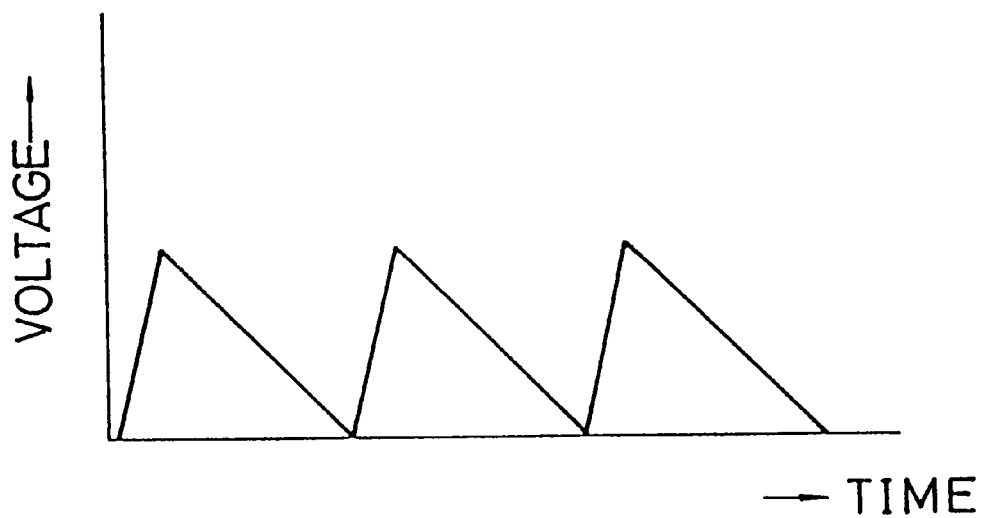

Reference numeral 19 in FIG. 1 represents a power unit that generates driving pulses of one of two sawtooth waveforms. The driving pulses of one waveform are each composed of a slowly rising leading edge followed by a rapidly falling trailing edge, as shown in FIG. 4(a); the driving pulses of the other waveform are each made up of a rapidly rising leading edge followed by a slowly falling trailing edge, as depicted in FIG. 4(b). Operating a switch 19a causes the power unit 19 selectively to generate driving pulses of one or the other waveform depending on the driving direction of the apparatus. The driving pulses thus generated by the power unit 19 have a frequency higher than the audio frequency (about 18 kHz). The circuit for generating the pulses above is a known circuit and will not be described herein.

The driving apparatus as embodied above works as follows: when the zoom lens barrel 11 is desired to be moved in the arrowed direction a, the switch 19a of the power unit 19 is operated to select driving pulses of the waveform in FIG. 4(a), i.e., each pulse being composed of a slowly rising leading edge followed by a rapidly falling trailing edge. The selected driving pulses are supplied to the piezo-electric element 18. At the slowly rising leading edge of each driving pulse, the piezo-electric element 18 is expanded slowly in the direction of its thickness. The driving axis 13 moves in the arrowed axial direction a in a correspondingly slow manner.

At this point, the zoom lens barrel 11 moves in a substantially simultaneous manner with the driving shaft 13. The movement is effected because the friction plate 12 is pressed by the contact pressure spring 14 so that the driving shaft 13 is in surface-to-surface contact with the zoom lens barrel 11 and friction plate 12, the components being coupled by the frictional force generated on their contacting surfaces.

At the rapidly falling trailing edge of the driving pulse, the piezo-electric element 18 is rapidly contracted in the direction of its thickness. This causes the driving shaft to move rapidly and axially opposite to the arrowed direction a. At this point, the inertia of the zoom lens barrel 11 and friction plate 12 overcomes the frictional force between the driving shaft 13 on the one hand and the barrel 11 and friction plate 12 on the other. Thus the zoom lens barrel 11 and friction plate 12 stay substantially stationary where they are.

That stationary state of the zoom lens barrel 11 and friction plate 12 which is qualified as "substantial" includes the following case: regardless of the moving direction, the zoom lens barrel 11 and friction plate 12 follow the driving shaft 13 in motion while slipping over them, thus moving as a whole in the arrowed direction a depending on the time interval between the pulses. How the zoom lens barrel 11 and the friction plate 12 move is determined by the frictional conditions in effect.

The driving pulses of the selected waveform are fed continuously to the piezo-electric element 18. This causes the zoom lens barrel 11 to move continuously in the arrowed direction a.

When the zoom lens barrel 11 is desired to be moved opposite to the arrowed direction a, the switch 19a of the power unit 19 is operated to select the driving pulses of the waveform in FIG. 4(b), i.e., each pulse being composed of a rapidly rising leading edge followed by a slowly falling trailing edge. The selected driving pulses are supplied to the piezo-electric element 18, which in turn causes the zoom lens barrel 11 to move in the desired direction.

The driving pulses of one or the other waveform generated by the power unit 19 have a frequency in excess of the audio frequency (about 18 kHz). This means that the vibrating noise will not reach the human ear when the driving mechanism made up of the driving shaft 13 and zoom lens barrel 11 vibrates at the frequency of the driving pulses in keeping with the expansion and contraction of the piezo-electric element 18.

Figure 2:
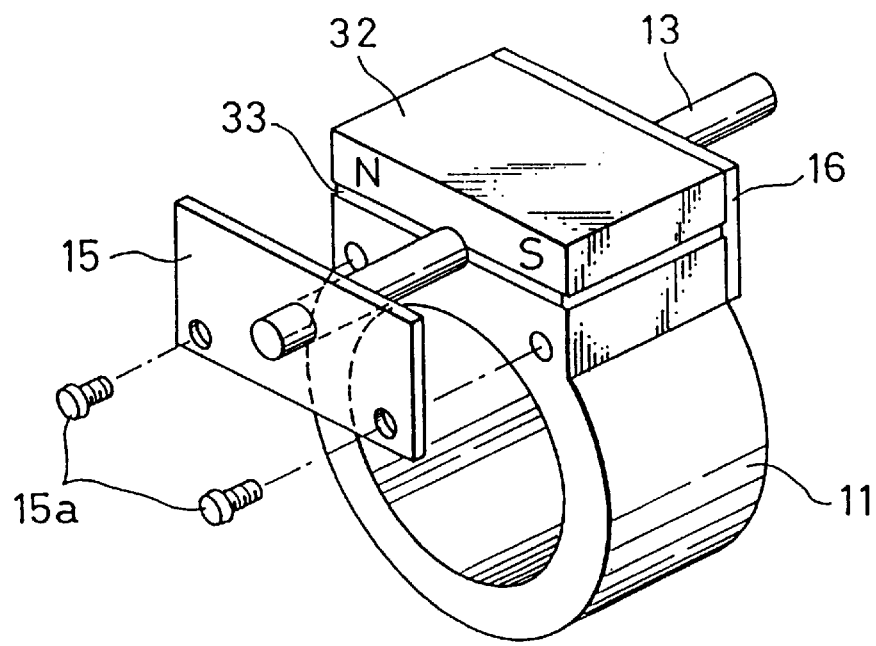
FIG. 2 is a perspective view of a first variation of the first embodiment, depicting the frictionally coupled parts thereof.

FIG. 2 depicts the frictionally coupled parts in the first variation of the first embodiment. In the first embodiment above, the pressure contact spring 14 is used to push the friction plate 12 against the driving shaft 13 so that the frictional force is generated between the driving shaft 13 on the one hand, and the zoom lens barrel 11 and friction plate 12 on the other. In the first variation of the first embodiment, by contrast, the friction plate 32 is made of a permanent magnet and the zoom lens barrel 11 is composed of a magnetic substance. A magnetic path then develops between the frictional plate 32 and the zoom lens barrel 11. The resulting attraction is utilized to push the friction plate 32 against the driving shaft 13, whereby a frictional force is generated over the contacting surfaces.

In the first variation of FIG. 2, the friction plate is made of a permanent magnet with no spring plate utilized. The first variation thus constituted contributes to reducing the number of component parts as well as the number of assembly steps.

The constitution of the first variation in FIG. 2 will now be described in more detail. In FIG. 2, those component parts having their functionally equivalent counterparts in the first embodiment of FIG. 1 are designated by like reference numerals. Those component parts having no counterparts in the first embodiment are described specifically, and repetitive descriptions of any parts are omitted where appropriate.

In FIG. 2, a friction plate 32 has an N-pole and an S-pole furnished astride the driving shaft 13. The driving shaft 13 is located on top of the zoom lens barrel 11 formed of a magnetic substance. A magnetic path develops between the friction plate 32 and the zoom lens barrel 11. The zoom lens barrel 11 attracts the friction plate 32 which pushes the driving shaft 13. Thus the driving shaft 13 comes into surface-to-surface contact with the zoom lens barrel 11 and friction plate 32, whereby a frictional force is generated over the contacting surfaces.

The keep plates 15 and 16 are fixed to the left- and right-hand ends of the zoom lens barrel 11 with small screws 15a. These plates 15 and 16 prevent the friction plate 32 from getting dislodged axially along the driving shaft 13. An elastic cushion member 33, made of rubber or synthetic resin, is interposed between the friction plate 32 and the zoom lens barrel 11. The cushion member 33, provided to adjust the attraction of the magnet, may be omitted where circumstances permit.

Although the first variation of the first embodiment has the zoom lens barrel 11 made of the magnetic substance, the barrel 11 may be formed alternatively of a non-magnetic substance. In this case, a magnetic plate is secured to the surface facing the friction plate 32.

Figure 3:
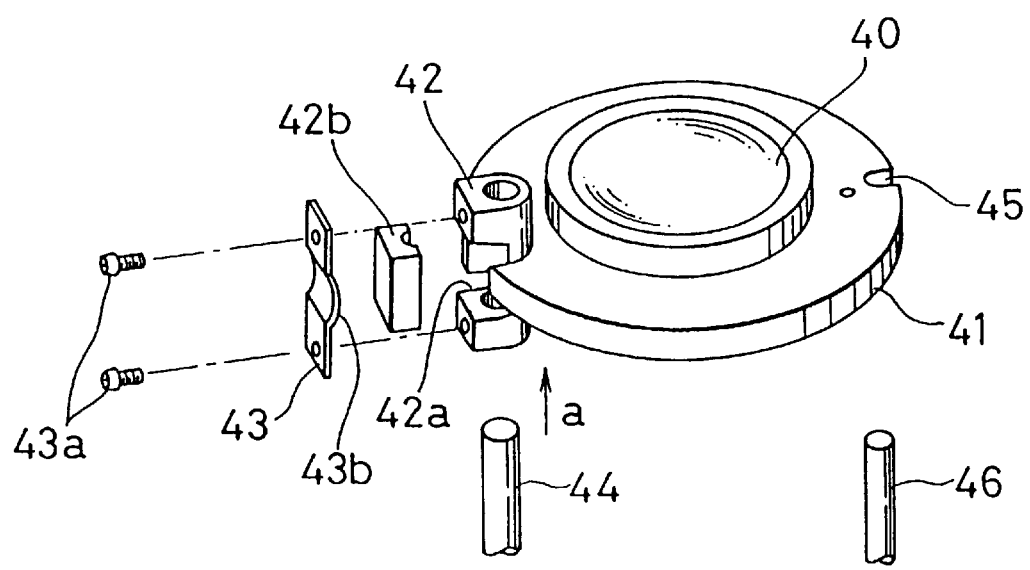
FIG. 3 is a perspective view of a second variation of the first embodiment, illustrating the frictionally coupled parts thereof.

FIG. 3 illustrates the second variation of the first embodiment, highlighting the frictionally coupled parts thereof. In FIG. 3, reference numeral 41 is a lens barrel, a moving member that supports a lens 40. The lens barrel 41 is furnished peripherally with a sleeve 42 having a notch 42a. A driving shaft 44 penetrates the sleeve 42. The notch 42a of the sleeve 42 is engaged with a friction plate 42b shaped to fit the notch contour. A pressure contact spring 43 is fixed to the sleeve 42 with small screws 43a. The spring 43 is secured in such a manner that a curved portion 43b in the middle of the spring pushes the friction plate 42b.

The driving shaft 44 penetrates the sleeve 42 and friction plate 42b. With the pressure contact spring 43 causing the friction plate 42b to push the driving shaft 44 into the sleeve 42, the driving shaft 44 comes into surface-to-surface contact with the sleeve 42 and friction plate 42b, whereby an appropriate frictional force develops over the contacting surfaces.

The driving shaft 44 is supported in an axially movable manner by a frame not shown but similar to that of the first embodiment. One end of the driving shaft 44 is attached fixedly to one end of the piezo-electric element that is displaced in the direction of its thickness. The other end of the piezo-electric element is fixed to the frame.

Reference numeral 45 in FIG. 3 is a groove furnished on then periphery of the lens barrel 41, and 46 is a support bar engaged with the groove 45. The support bar 46 supports the lens barrel 41 movably in the optical axis direction, preventing the barrel 41 from swiveling around its optical axis.

In the constitution of the second variation described above, a power unit, not shown, may supply the piezo-electric element with driving pulses of the waveform in FIG. 4(a) wherein each pulse is composed of a slowly rising leading edge followed by a rapidly falling trailing edge. At the slowly rising leading edge of each driving pulse, the piezo-electric element is expanded slowly in the direction of its thickness. The driving axis 44 moves in the arrowed axial direction a in a correspondingly slow manner.

At this point, the sleeve 11 moves in a substantially simultaneous manner with the driving shaft 44. The movement is effected because the friction plate 42b is pressed by the contact pressure spring 43 so that the driving shaft 44 is in surface-to-surface contact with the sleeve 42 and friction plate 42b, the components being coupled by the frictional force generated on their contacting surfaces.

At the rapidly falling trailing edge of the driving pulse, the piezo-electric element is rapidly contracted in the direction of its thickness. This causes the driving shaft 44 to move rapidly and axially opposite to the arrowed direction a. At this point, the inertia of the lens barrel 41, sleeve 42 and friction plate 42b overcomes the frictional force between the driving shaft 44 on the one hand and the sleeve 42 and friction plate 42b on the other. Thus the lens barrel 41, sleeve 42 and friction plate 42b stay substantially stationary where they are.

The driving pulses of the above waveform are supplied continuously to the piezo-electric element. This causes the lens barrel 41 to move continuously in the arrowed direction a.

When the lens barrel 41 is desired to be moved opposite to the arrowed direction a, the power unit is switched to select and generate the driving pulses of the waveform in FIG. 4(b) wherein each pulse is composed of a rapidly rising leading edge followed by a slowly falling trailing edge. The selected driving pulses are supplied to the piezo-electric element, which in turn causes the lens barrel 41 to move in the desired direction.

In the second variation of the first embodiment in FIG. 3, the friction plate 42b may also be composed of a permanent magnet with no spring plate used. This constitution contributes likewise to reducing the number of component parts as well as the number of assembly steps.

In the embodiments described above, the piezo-electric element is used as the driving source of each. Alternatively, the driving source many be any one of other electro-mechanical transducers including magnetostrictive vibrators.

In each of the above-described embodiments, the driving member is in surface-to-surface contact with the moving member. This makes it possible steadily to ensure a sufficient frictional coupling force over the contacting surfaces without raising deliberately the contact pressure on these surfaces under any of the following circumstances: where the structure of the host device incorporating the driving apparatus requires introducing lubricant between the driving and the moving member; where the contacting surfaces are specularly finished; or where the positional relationship between the driving and the moving member is varied relative to the direction of gravity in accordance with the attitude in which the host device (e.g., camera) containing the driving apparatus is operated. This feature enables the inventive driving apparatus to minimize wear on the contacting surfaces of the driving and moving members while providing a stable driving force at high velocity.

Figure 5:
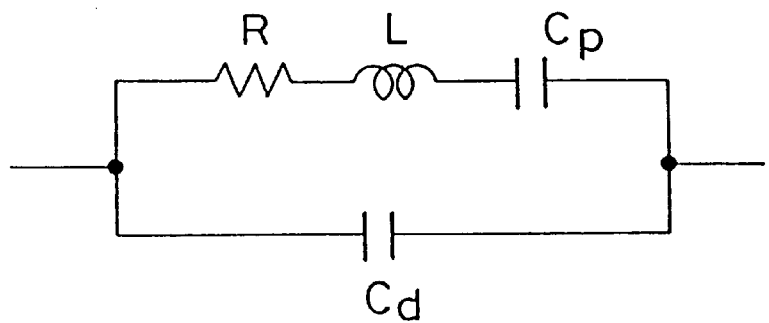
FIG. 5 is an equivalent circuit diagram of the piezo-electric element.

What follows is a description of how the piezo-electric element typically works. FIG. 5 is an equivalent circuit diagram of the piezo-electric element. In FIG. 5, the amount of charge in a capacitor Cp corresponds to the amount of displacement effected by the piezo-electric element. Traditionally, the driving of the piezo-electric element is controlled by the voltage of driving pulses that are supplied thereto. Specifically in the equivalent circuit, the amount of charge in the capacitor Cp is controlled by varying the change in the voltage of the driving pulses.

Figure 6:
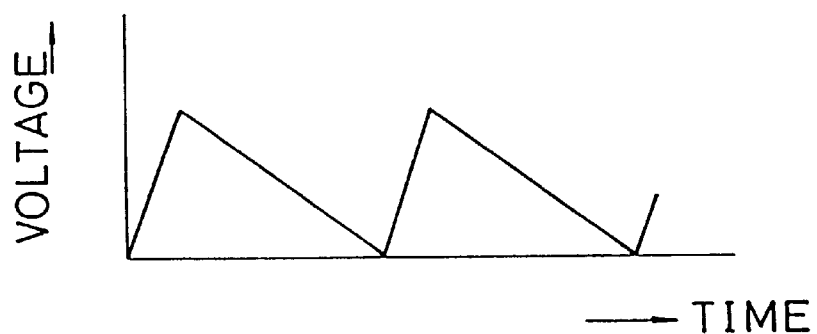
FIG. 6($a$) is a diagram of a typical waveform of driving pulses fed over time to a piezo-electric element.
Figure 6:
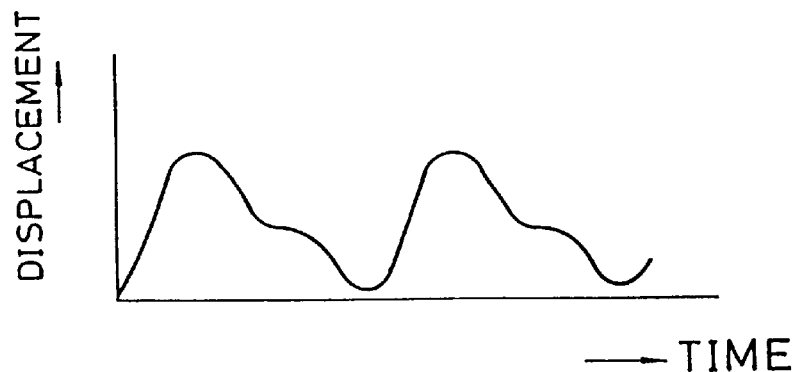

Suppose that the piezo-electric element is supplied with the driving pulses (voltage) whose waveform is that of FIG. 6(a), in which each pulse is composed of a rapidly rising leading edge followed by a slowly falling trailing edge. When fed with such driving pulses, the piezo-electric element produces displacements of rapid expansion and slow contraction.

In such a case, the piezo-electric element generates a short-period vibration by responding excessively to the changes of the input driving pulses. The vibration is called "ringing." With the ringing added to its intrinsic displacements, the piezo-electric element produces over time the displacements illustrated in FIG. 6(b).

It is well known that the ringing vibration is offset by making the rise time of each driving pulse an integer multiple of the resonance frequency of the driving system in use. It is also known that the moving member is moved only when the rise time of each driving pulse is made shorter than its fall time. This means that the rise time of the driving pulse must be less than half of, or in practice much smaller than, each driving period.

What the inventors found was the following: since the amount of charge in the capacitor Cp in the equivalent circuit of FIG. 5 corresponds to the amount of displacement effected by the piezo-electric element, a quick displacement of the element is obtained by rapidly charging the capacitor Cp using a large current; a slow displacement of the piezo-electric element is acquired by slowly charging the capacitor Cp using a constant current. Because desired displacements of the piezo-electric element are produced just as effectively in this manner, the inventors developed a novel driving method for controlling the current of a driving signal that drives the piezo-electric element.

Figure 7:
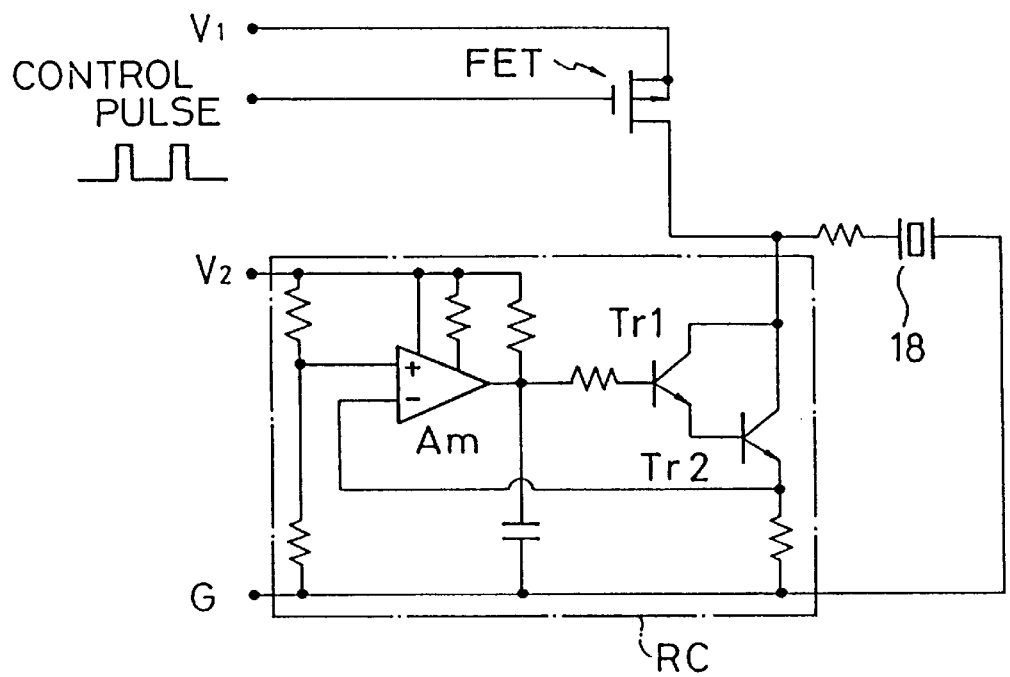
FIG. 7 is a circuit diagram of a first example of the driving circuit used by the piezo-electric element according to the invention.

FIG. 7 is a circuit diagram of the first example of the driving circuit used by the piezo-electric element according to the invention. In this diagram, a constant current circuit RC includes an operation amplifier Am and transistors Tr1 and Tr2. The input side of the constant current circuit RC is connected to a power source V2. The output side of the circuit RC is connected to a piezo-electric element 18. The source electrode of a field-effect transistor FET is connected to a power source V1. The drain electrode of the transistor FET is connected to the piezo-electric element 18 by way of the output side of the constant current circuit RC. The gate electrode of the field-effect transistor FET is connected to a control pulse source.

The driving circuit of FIG. 7 works as follows: when a control pulse is input to the gate electrode of the field-effect transistor FET, the source and the drain electrode conduct. This connects the piezo-electric element 18 to the power source V1 from which a large current flows to the former. When no control pulse enters the gate electrode, the source and the drain electrode of the field-effect transistor FET do not conduct. This allows the constant current circuit RC to supply a constant current to the piezo-electric element 18.

Figure 8:
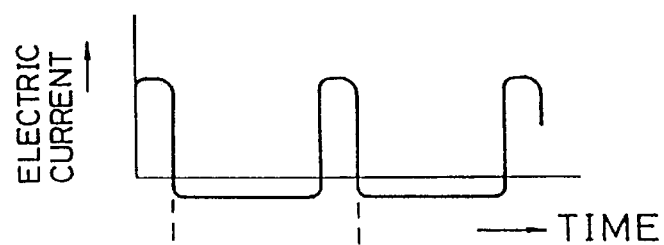
FIG. 8($a$) is a diagram illustrating the current output over time by the driving circuit of FIG. 7.
Figure 8:
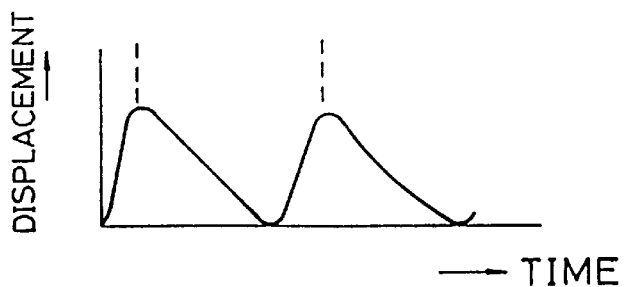

FIG. 8(a) illustrates changes in the current fed to the piezo-electric element by the driving circuit of FIG. 7, and FIG. 8(b) shows typical displacements generated by the piezo-electric element. When a large current (in forward direction) and a constant current (in reverse direction) flow alternately through the piezo-electric element, as shown in FIG. 8(a), the piezo-electric element produces alternately a rapid displacement (expansion) and a slow displacement (contraction) corresponding to the large current (forward) and the constant current (reverse) respectively, as depicted in FIG. 8(b).

Where the moving member is to be moved in a substantially simultaneous manner with the driving member being slowly displaced, the predetermined constant current is fed as the driving signal to the electro-mechanical transducer (e.g., piezo-electric element). Where the moving member is to remain substantially stationary against its frictional coupling with the driving member, the predetermined large current is supplied as the driving signal to the electro-mechanical transducer. These two modes of operation are switched by suitably controlling the driving signal current. This arrangement suppresses the ringing vibration that is prevalent among conventional driving apparatuses, whereby the moving member can be driven at significantly higher velocities than before.

Figure 9:
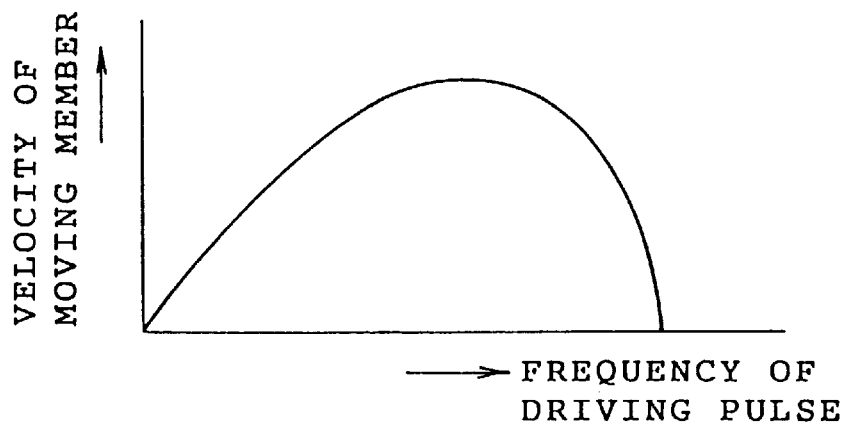
FIG. 9 is a view presenting a typical relationship between the frequency of driving pulses supplied to an electro-mechanical transducer and the velocity of a moving member driven by the transducer.

The electro-mechanical transducer has a physical characteristic called delayed response. It means that the electro-mechanical transducer effects a displacement upon elapse of a certain period of time following the supply of a driving pulse. Because of this characteristic, higher frequencies of the driving pulses applied to the electro-mechanical transducer are more liable to cause the expanding and contracting displacements to overlap. The phenomenon retards and eventually lowers the velocity ratio of expansion to contraction of the electro-mechanical transducer. FIG. 9 presents a typical relationship between the frequency of driving pulses supplied to an electro-mechanical transducer on the one hand, and the moving velocity of a moving member driven by the transducer on the other. As the frequency of the supplied driving pulses is being raised, the velocity of the moving member is increased gradually and correspondingly. Beyond a certain frequency, however, the velocity of the moving member begins to drop. When the velocity ratio of expansion to contraction of the electro-mechanical transducer reaches 1, the amount of movement of the moving member during each period of the driving pulse is reduced to 0; the driving action is now unavailable.

Figure 10:
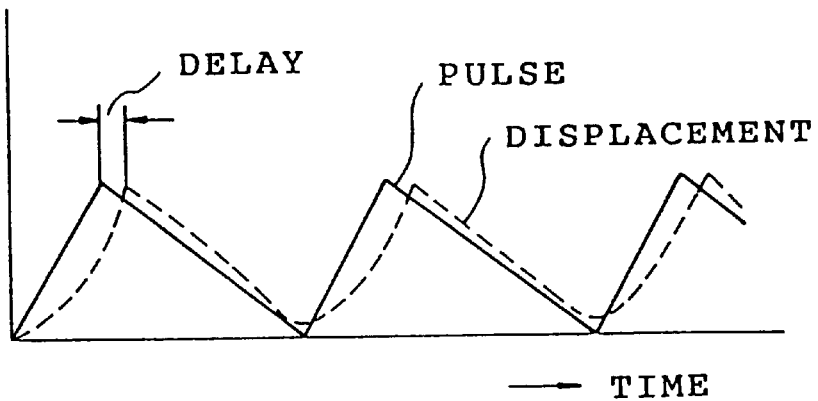
FIG. 10($a$) and FIG. 10($b$) are diagrams showing how electro-mechanical transducers comprising different driving shafts produce different delayed responses.
Figure 10:
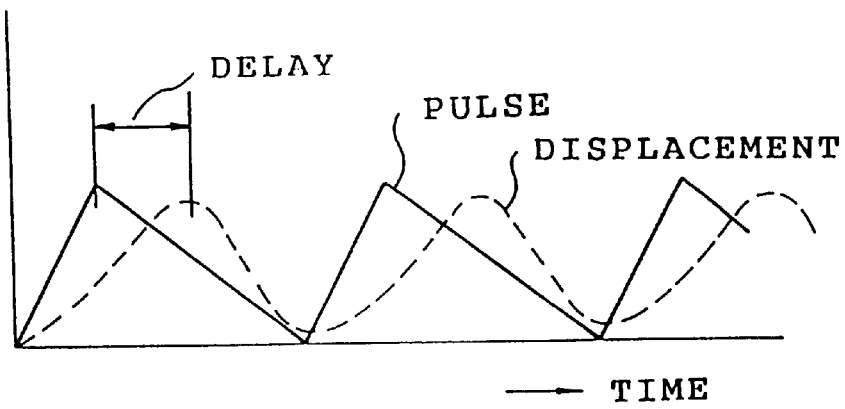

The delayed response, a physical characteristic of the electro-mechanical transducer, is affected significantly by the weight of the driving member fixed to the transducer, as shown in FIG. 10(a) and FIG. 10(b). FIG. 10(a) shows the delayed response in case of a light weight driving member, and FIG. 10(b) shows the delayed response in case of a heavy weight driving member. The heavier the driving member, the greater the delayed response. It is thus important to select an appropriate material from which to manufacture the driving member. Described below is the relationship between the kinds of driving member materials and the velocity of the moving member made from these materials.

Table 1 lists as candidate materials stainless steel SUS304 (as per JIS), ABS resin and a fiber-reinforced synthetic resin composite (fiber-reinforced epoxy resin containing 50 vol % of carbon fiber in this case). The table also shows the results from the tests performed by the inventors on these materials for physical properties, weights and axial elasticities, together with the moving velocities of the test pieces made of the materials.

TABLE 1

| MATERIAL OF DRIVING MEMBER | PHYSICAL PROPERTY | | TEST PIECE** | | MOVING VELOCITY OF MEMBER (mm/sec) |
| --- | --- | --- | --- | --- | --- |
| | DENSITY (g/cm3) | ELASTICITY (kgf/mm$^2$) | WEIGHT (g) | AXIAL ELASTICITY (kgf/mm) | |
| STAINLESS STEEL (SUS 304) | 7.9 | 20000 | 1.23 | 1600 | 0 |
| ABS RESIN | 1.1 | 250 | 0.14 | 20 | 0 |
| FIBER-REINFORCED EPOXY RESIN* | 1.6 | 12000 | 0.25 | 900 | 12 |

*Containing 50 vol % of carbon fiber
**diameter 2 mm × length 40 mm

In the tests, it was impossible to drive the moving member when the driving member was composed of the JIS-stipulated SUS304 stainless steel or of the ABS resin. Presumably the driving member made of the SUS304 stainless steel was so heavy that the piezo-electric element had a significantly delayed response in its displacements. The driving member composed of the ABS resin supposedly had an elastic modulus so low that the driving member developed a considerably delayed response in its movement and was thus unable to drive the moving member.

The driving member constituted by the fiber-reinforced epoxy resin was lightweight and had a relatively high elastic modulus. These characteristics kept the piezo-electric element or the driving member from developing a significantly delayed response in displacements or in movement. Since the fiber-reinforced epoxy resin had a self-lubricating property, there occurred no audible noise attributable to frictional oscillation between the contacting surfaces of the driving and moving members. In conclusion, the optimum material from which to produce the driving member turned out to be the fiber-reinforced epoxy resin containing 50 vol % of carbon fiber.

In addition to the epoxy resin, the fiber-reinforced synthetic resin composite may include any of unsaturated polyester resin, polyimide, bismaleimide, polyamide-imide resin, polyether-imide resin, polyether ether ketone, polyether sulfone, aromatic polyimide, and polycarbonate. In addition to carbon fiber, the reinforcing fiber may be glass fiber, carbon whiskers, or potassium titanate whiskers.

Figure 12:
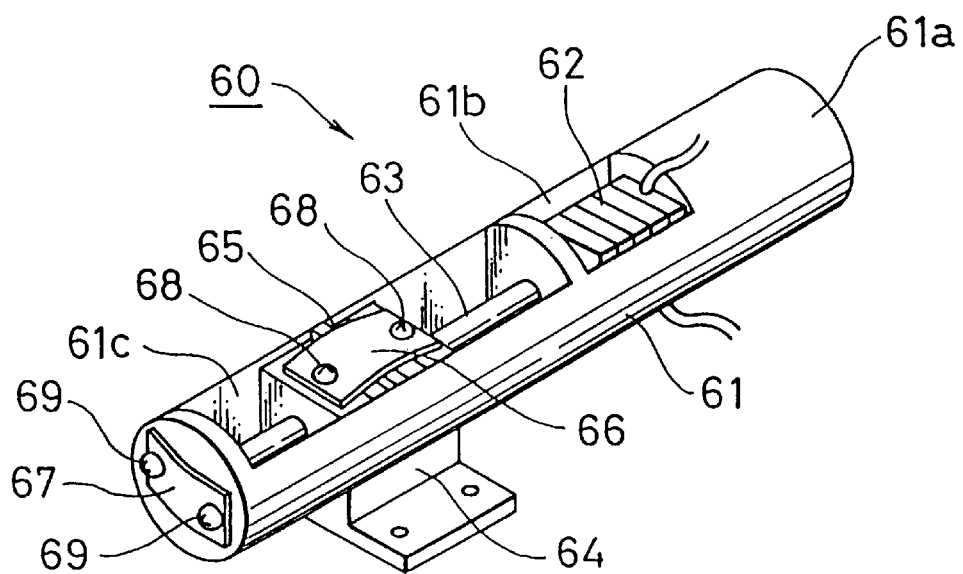
FIG. 12 is a perspective view showing how the driving apparatus of FIG. 11 is assembled.
Figure 11:
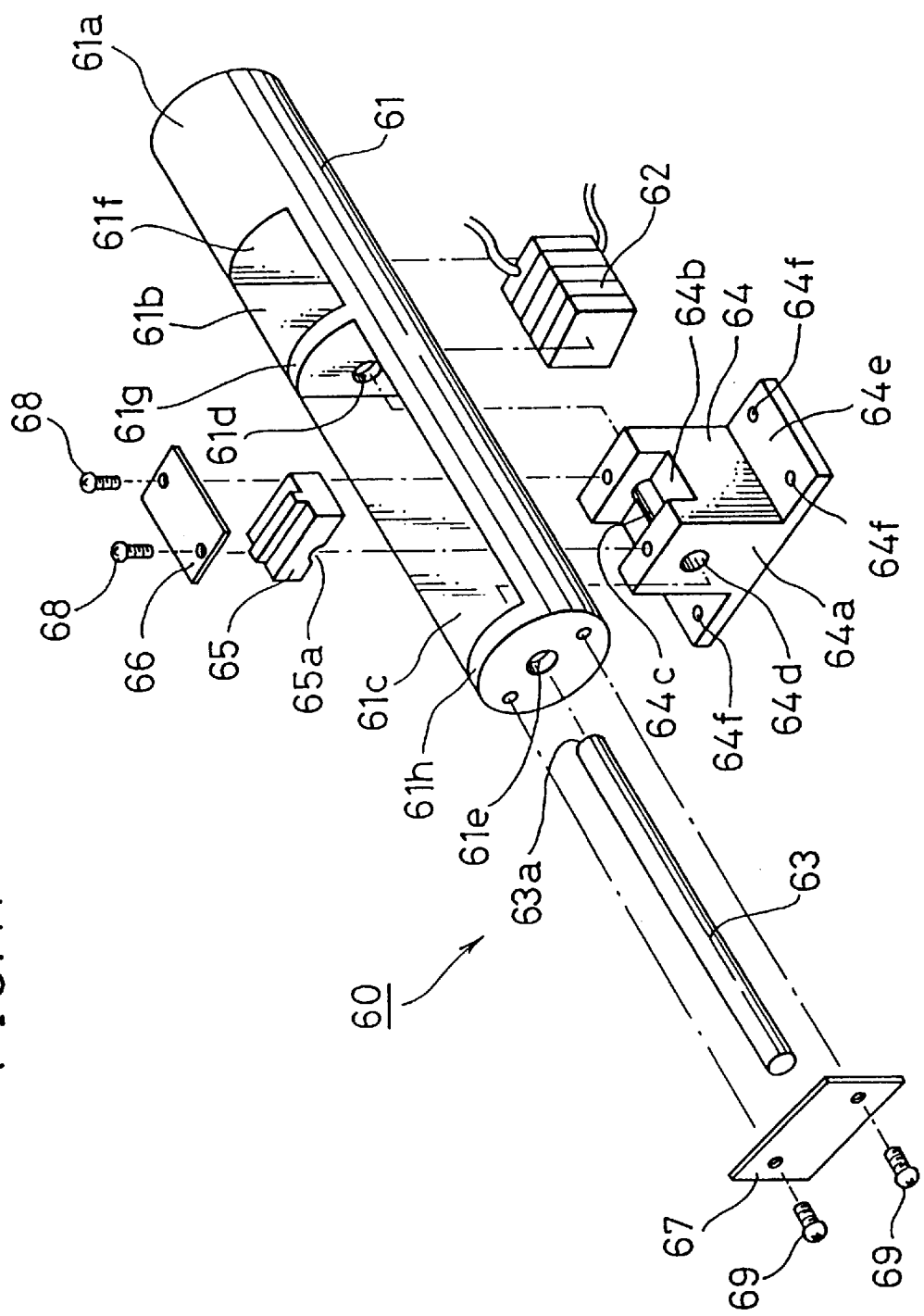
FIG. 11 is an exploded perspective view of a driving apparatus used to drive the focusing lens of an optical system and practiced as a second embodiment of the invention.

What follows is a description of the second embodiment of the invention implemented as the driving apparatus for driving the focusing lens of an assembly type optical system. FIG. 11 is an exploded perspective view of this driving apparatus used to drive the focusing lens. FIG. 12 is a perspective view showing how the driving apparatus 60 of FIG. 11 is assembled. The driving apparatus 60 comprises a stationary member 61, a piezo-electric element 62, a driving shaft 63 and a slider 64.

The stationary member 61 is substantially cylindrical. One end 61a of the stationary member 61 is a mounting part to be attached to the host system, not shown. The stationary member 61 has a hole 61b in which to accommodate the piezo-electric element 62 and a hole 61c in which to house the slider 64. Between the holes 61b and 61c is a partition 61g. An end plate 61h is provided to terminate the hole 61c at the end of the stationary member 61.

The piezo-electric element 62, when placed in the hole 61c of the stationary member 61, has one of its ends attached fixedly to one wall 61f of the hole 61c; the other end of the piezo-electric element 62 is secured to one end 63a of the driving shaft 63.

The driving shaft 63 is supported in an axially movable manner by a bearing hole 61d on the partition 61g of the stationary member 61 as well as by a bearing hole 61e on the end plate 61h. When the piezo-electric element 62 expands and contracts in the direction of its thickness, the driving shaft 63 axially reciprocates correspondingly.

A plate spring 67 is secured with screws 69 to the end plate 61h of the stationary member 61, in such a manner that the driving shaft 63 slightly protruding from the bearing hole 61e will be pushed inward in the axial direction. Thus secured, the plate spring 67 pushes the driving shaft 63 against the piezo-electric element 62 with a predetermined force. The pushing force may be adjusted by tightening or loosening the screws 69.

The slider 64 (i.e., moving member) is housed within the hole 61c. The right- and left-hand walls flanking the hole 61c in its longitudinal direction serve as rotation stoppers doubling as guides for allowing the slider 64 to move axially along the stationary member 61.

The slider 64 comprises a slider body 64a that frictionally contacts the driving shaft 63 and a mounting part 64e to which is attached the moving member such as the lens frame. The slider body 64a has a notch 64b formed in the middle thereof. The right- and left-hand walls flanking the notch 64b have through holes 64d penetrated by the driving shaft 63. The notch 64b has a groove 64c formed to contact approximately the lower half surface of the driving shaft 63, the groove having a semicircle cross section. The mounting part 64e has its lower portion provided with screw holes 64f through which screws are set to mount the target moving member (e.g., lens frame).

The notch 64b has a friction member 65 engaged therein. The friction member 65 contacts from above the driving shaft 63 that penetrates the holes 64d. Under the friction member 65 is formed a groove 65a having a semicircle cross section. Thus formed, the groove 65a contacts approximately the upper half surface of the driving shaft 63. The friction member 65 is structured to engage snugly with the right- and left-hand walls of the notch 64*b*.

The friction member 65 is pushed by a plate spring 66 against the driving shaft 63 for frictional contact therewith. The plate spring 66 is secured with screws 68 to the body 64*a* of the slider 64. The pushing force of the plate spring 66 may be adjusted by tightening or loosening the screws 68.

What is shown in FIG. 12 is the driving apparatus 60 assembled as described above. The apparatus 60 is an independent unit in the state shown.

How the second embodiment above is equipped with the target moving member and mounted on the optical system will now be described with reference to FIG. 13. This optical system has its lens moved to permit various tests. Details of the optical system will be omitted, and only those aspects of the system which are relevant to the invention will be described.

Figure 13:
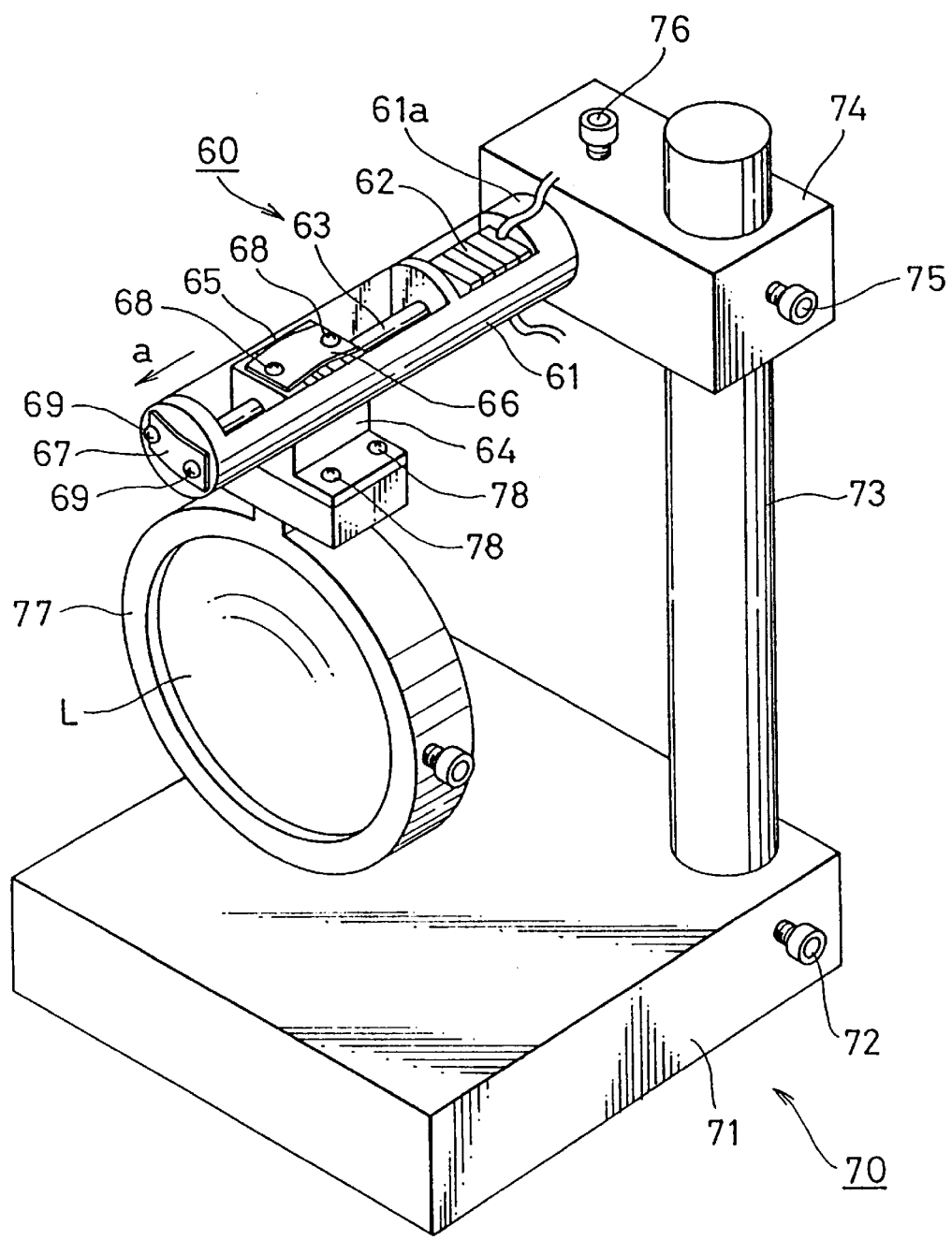
FIG. 13 is a perspective view of the second embodiment as it is used to drive the focusing lens of the optical system.

In FIG. 13, reference numeral 70 is a lens stand; 71 is a base; and 73 is a pillar fixed to the base 71 with a screw 72. Reference numeral 74 represents a head arm secured to the pillar 73 with a screw 75. The driving apparatus 60 has one end 61*a* of its stationary member 61 attached to the head arm 74 and secured thereto with a screw 76.

The mounting part of the slider 64 is equipped with a lens unit 77 that acts as the moving member. The lens unit 77 is fastened with screws 78 to the slider 64. The screws, driven into the screw holes 64*f* of the T-shaped overhung mounting part 64*e*, may be removed from above. Thus the lens unit 77 is easy to dismount for repair, cleaning, adjustment or other servicing purposes.

The stationary member 61 is attached to the head arm 74 of the stand 70 that belongs to the optical system. When the stationary member 61 is to be attached, one end 61*a* of the stationary member 61 is first inserted into an opening of the head arm 74, and the screw 76 is tightened from above. Loosening the screw 76 allows the driving apparatus to be readily dismounted from the optical system. If the piezo-electric element 62, slider 64 or any other part in the driving apparatus 60 develops irregularities that need to be repaired, or if the driving apparatus 60 alone needs to be tested, it is easy to remove the driving apparatus 60 from the optical system. Prior to initial assembly, the driving apparatus 60 may be tested independently in the state shown in FIG. 12. When the test results are found to be normal, the driving apparatus 60 may be assembled into the optical system.

Illustratively, where the lens unit 77 is coupled only with the driving apparatus, loosening the screw 76 allows the driving apparatus and the lens unit to be dismounted together. Where the lens unit 77 is coupled integrally with other members of the optical system and cannot be disconnected therefrom, the driving apparatus 60 alone can still be dismounted as needed by removing the screws 76 and 78.

The driving apparatus 60 is provided independently of the structure and size of the optical system. It follows that the driving apparatus 60 may be used in combination with any other system as long as the latter is structured suitably to accommodate and secure the mounting part 61*a* and to have the target moving member engaged with the slider 64. It is even possible for the same driving apparatus to be switched from one optical system to another for use therewith: the photographic lens of a camera, the projection lens of an overhead projector and others. In addition to the optical systems, the driving apparatus may also be used with other kinds of devices equipped with a moving member, such as X-Y tables and plotters. The inventive driving apparatus is thus used in a wide range of general-purpose applications.

The driving apparatus above provides a linear drive motion without the use of transducers such as gear trains. If used in place of conventional motors, the driving apparatus can drastically simplify the structure of the host device. When produced and marketed as an independent unit, the driving apparatus can find its way into varieties of usage.

During assembly, the driving apparatus may be singled out to have its electro-mechanical transducer (i.e., piezo-electric element) bonded with the driving member and with the stationary member. Thus separated from the other components, the driving apparatus may be subject to such severe conditions as long-term hardening treatment and high-temperature treatment. The result is an apparatus constitution of high strength. Because such driving apparatuses may be treated on a batch basis, a large quantity of them may be bonded at one time.

Figure 50:
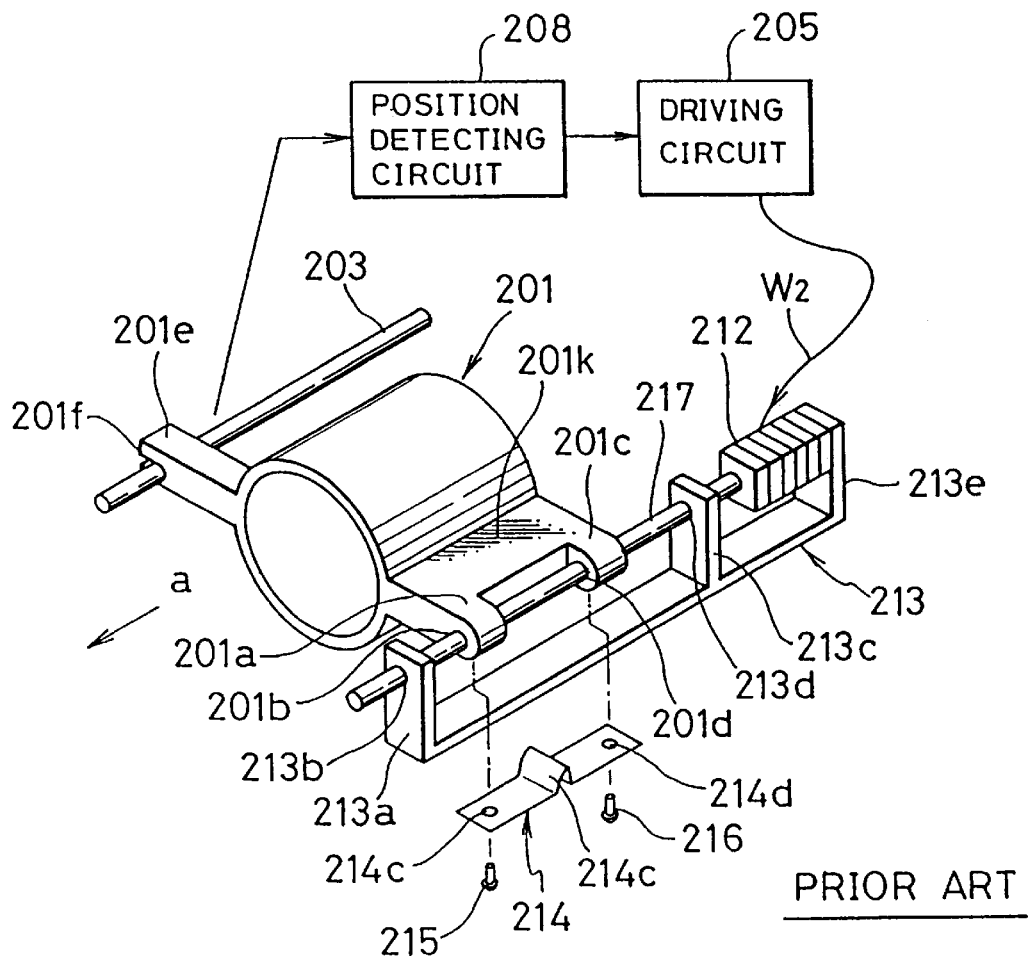
FIG. 50 is a perspective view of a conventional driving apparatus using an electro-mechanical transducer.
Figure 51:
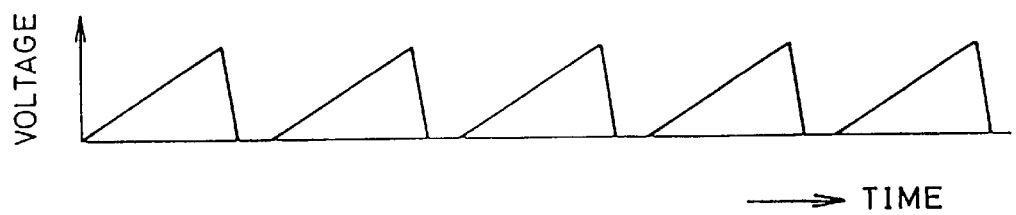
FIG. 51 is a diagram showing a typical waveform of driving pulses applied to the electro-mechanical transducer.
Figure 52:
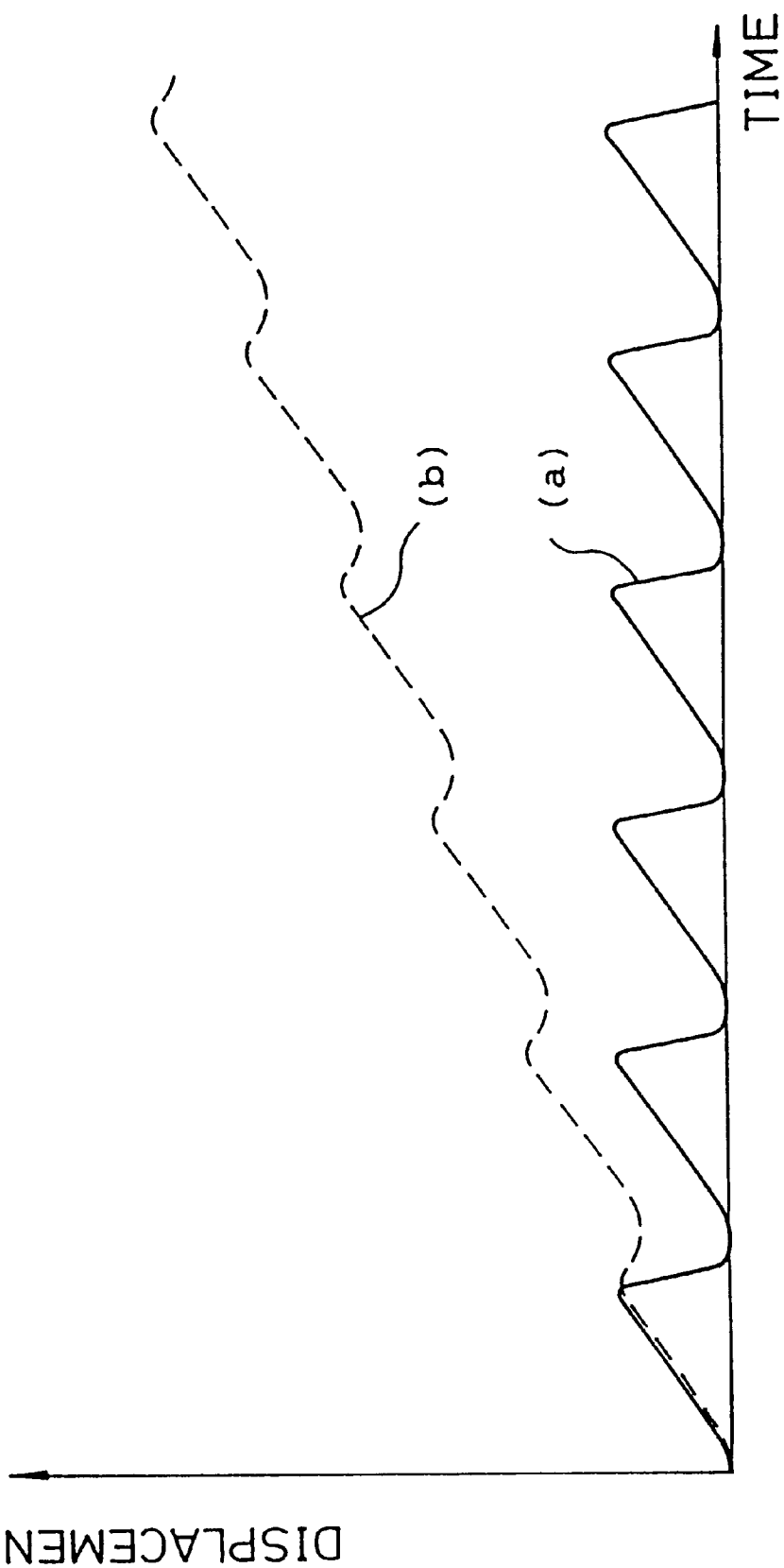
FIG. 52 is a diagram showing how the driving and moving members of the conventional driving apparatus are displaced illustratively.
Figure 53:
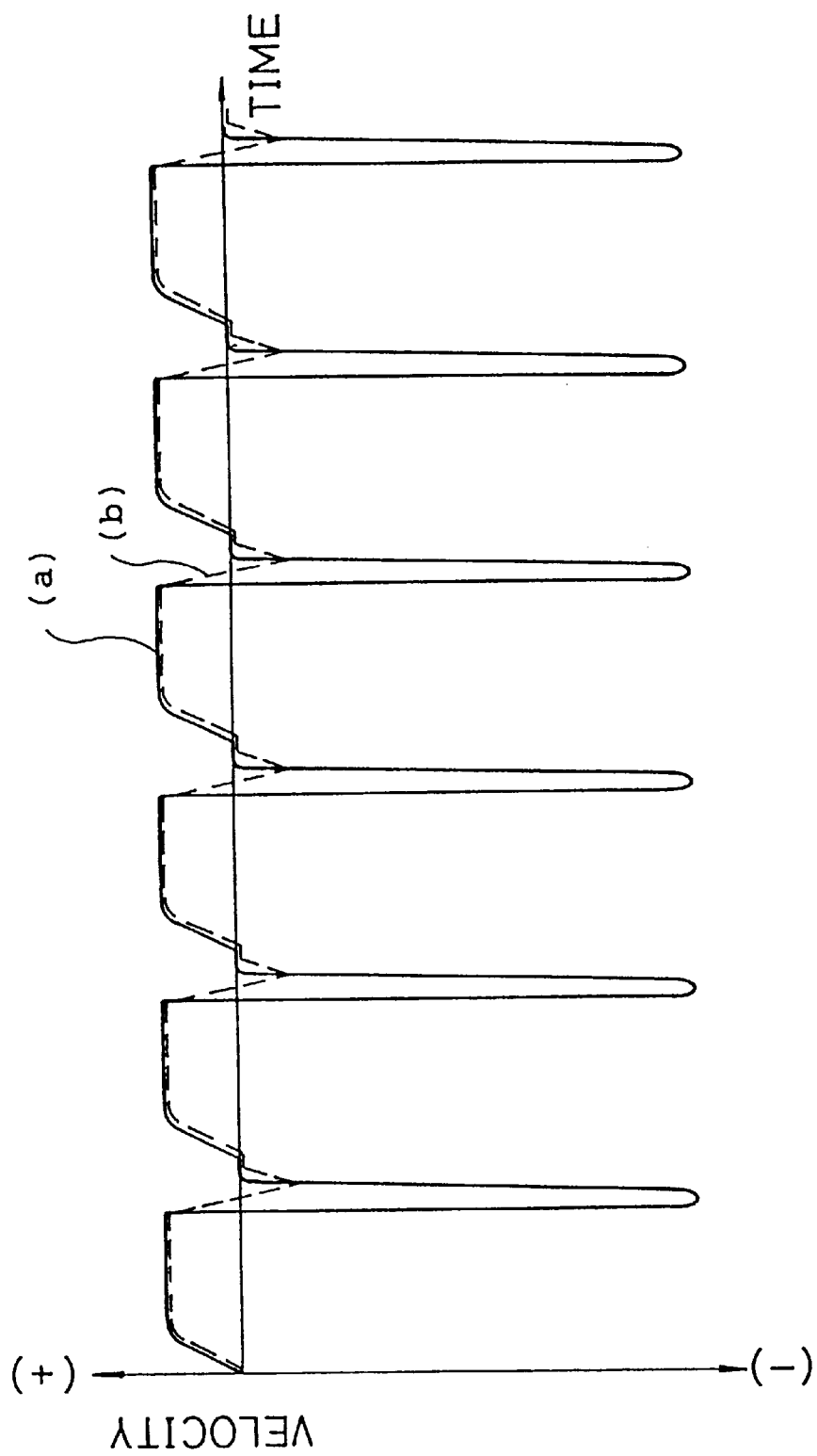
FIG. 53 is a diagram showing typical velocities at which the driving and moving members of the conventional driving apparatus are moved.
Figure 54:
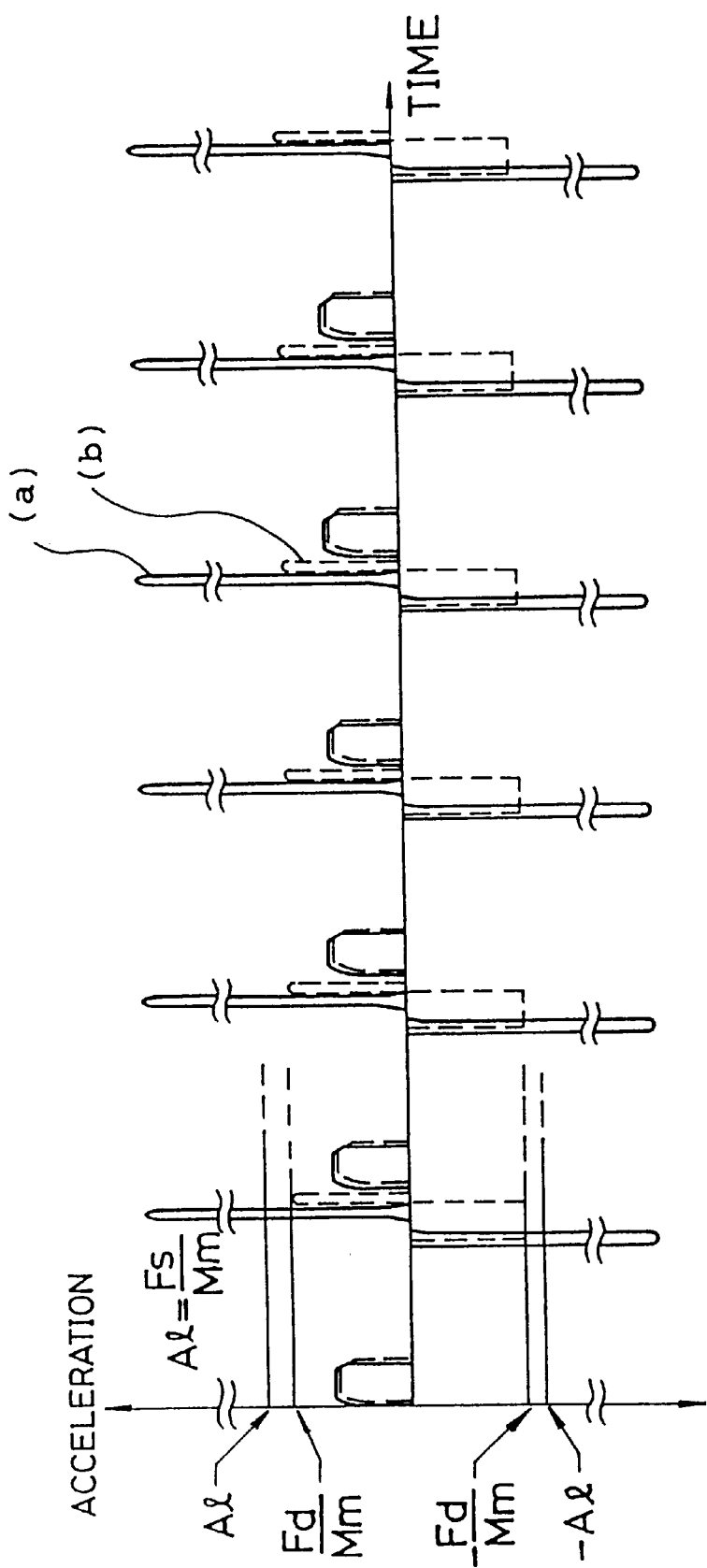
FIG. 54 is a diagram showing how the driving and moving members of the conventional driving apparatus are accelerated illustratively.
Figure 55:
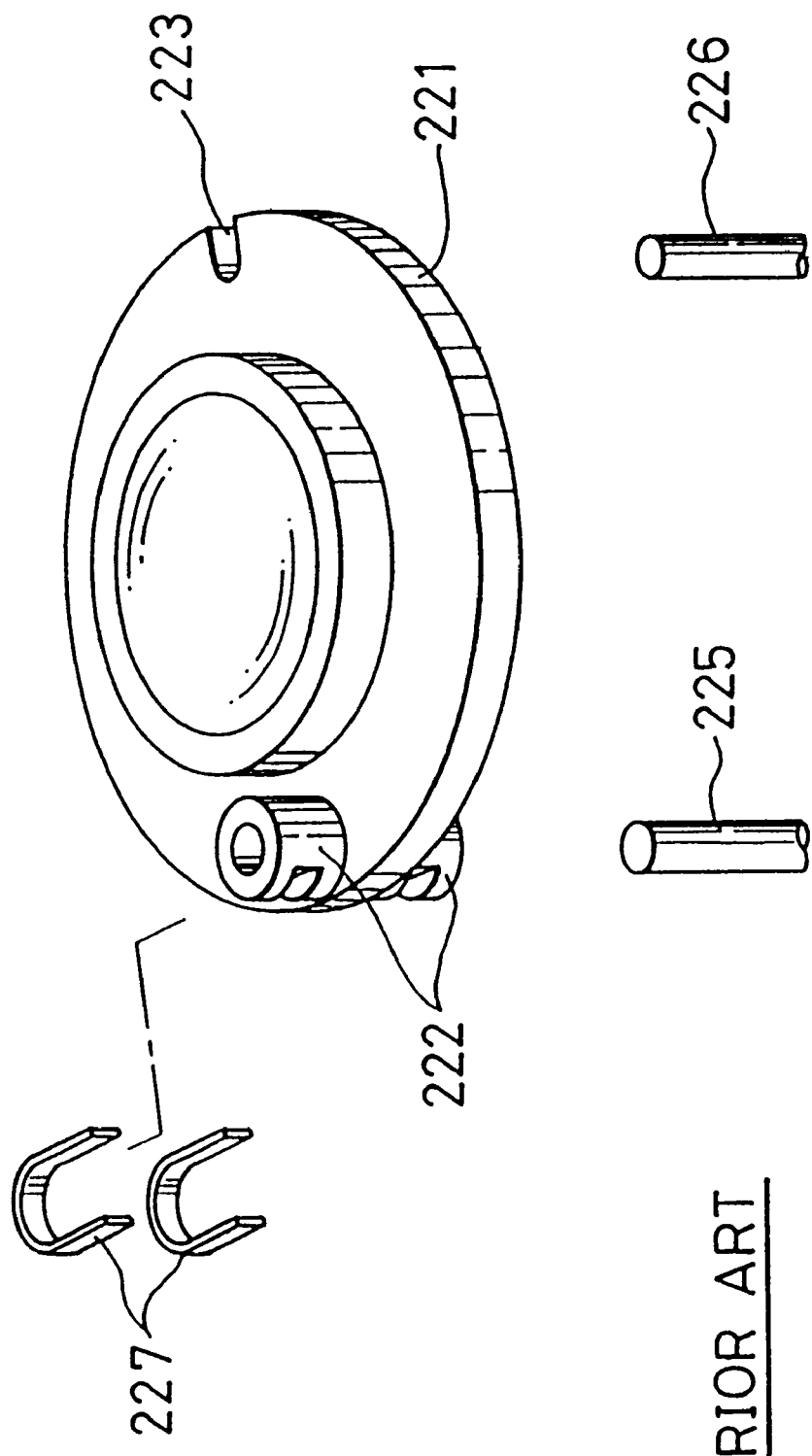
FIG. 55 is a perspective view of an alternative constitution of the conventional driving apparatus using the electromechanical transducer.

The conventional driving apparatus shown in FIG. 50 has only one end of its piezo-electric element 212 supported by the driving member support 213. (The other end of the piezo-electric element 212 connected with the driving member 217 is a free end.) This structure is vulnerable to the effects of vibration and cannot transmit the expanding and contracting displacements of the piezo-electric element 212 precisely to the driving member 217.

By contrast, in the second embodiment of the invention, the piezo-electric element 62 has one of its ends bonded to one wall 61*f* constituting the hole 61*b*; the other end of the piezo-electric element 62 is supported by the pressing force from the plate spring 67 via the driving shaft 63. With both its ends thus supported, the piezo-electric element 62 is much less likely to develop vibration in the portion fixed to the stationary member 61. This makes it possible to transmit faithfully the expansion and contraction of the piezo-electric element 62 to the driving shaft 63. Furthermore, because that surface of the piezo-electric element 62 which is bonded to the stationary member 61 is supported crosswise on both ends, the vibration becomes much less pronounced. This ensures steady transmission of the generated displacements to the driving shaft 63.

The stationary member 61 is designed to protect the piezo-electric element 62 and slider 64, to guide the driving shaft 63, to keep the slider 64 and lens unit 77 from rotating, and to fix the driving apparatus itself. The design has reduced the number of component parts used and has rendered the apparatus smaller. The slider 64 and lens unit 77 may alternatively be stopped from rotating by other means, including the use of a driving shaft with a rectangular cross section.

When the actuating force of the plate spring 67 applies an appropriate pressure to the piezo-electric element 62, the distance and the force of expansion and contraction of the element 62 are increased as desired. There is a significantly reduced possibility of the bonded piezo-electric element 62 getting separated from the stationary member 61 or from the driving shaft 63. Should such separation occur, the actuating force of the plate spring 67 still transmits an appreciable portion of the expansion and contraction of the piezo-electric element 62 to the driving shaft 63. Thus the performance of the driving apparatus can be preserved to some extent.

The slider 64 and the friction member 65 may each be composed of a permanent magnet, as depicted in FIG. 2. In that case, the plate spring 66 becomes unnecessary. This makes it possible further to reduce the number of component parts, whereby the driving apparatus is made smaller in size.

In the conventional driving apparatus of FIG. 50, the frictional contact between the driving member 217 and the barrel 201 is accomplished at a point or along a line by actuation of the spring 214. This kind of contact often lacks stability and durability over the contacting surfaces of the parts involved. In the above embodiment, by contrast, the friction member and the slider have each a groove shaped to fit the outer surface of the driving shaft. With the friction member and the slider sandwiching the driving shaft, these parts stay in surface-to-surface contact therebetween. This structure enhances the stability of the frictional force and the durability of the contacting surfaces between the parts thus engaged. The improvements in turn lead to better performance and higher reliability of the driving apparatus. Alternatively, the grooves may each be a V-groove so that the driving shaft is in linear contact with the grooves along four straight lines. The alternative structure further enhances the performance and reliability of the driving apparatus. Another alternative is that one groove may have a semicircle cross section and the other groove a V-shaped cross section.

The mounting part 61a of the driving apparatus need not be cylindrical; it may be any one of the variations depicted in FIG. 15(a) through FIG. 15(e). As illustrated, the mounting part 61a may be furnished with a male screw 61p or a female screw 61q. Such a threaded portion if provided allows the driving apparatus to be combined with diverse kinds of host devices. At the same time, the threaded portion reinforces the mounting strength of the components thus engaged. A flat cutout 61r formed on the mounting part 61a prevents the driving apparatus from rotating and provides for the precise mounting of the latter. A through hole 61s made on the mounting part 61a in its radial direction allows that part 61a to be fixed with a screw. This reinforces the mounting strength of the parts engaged.

Figure 16A:
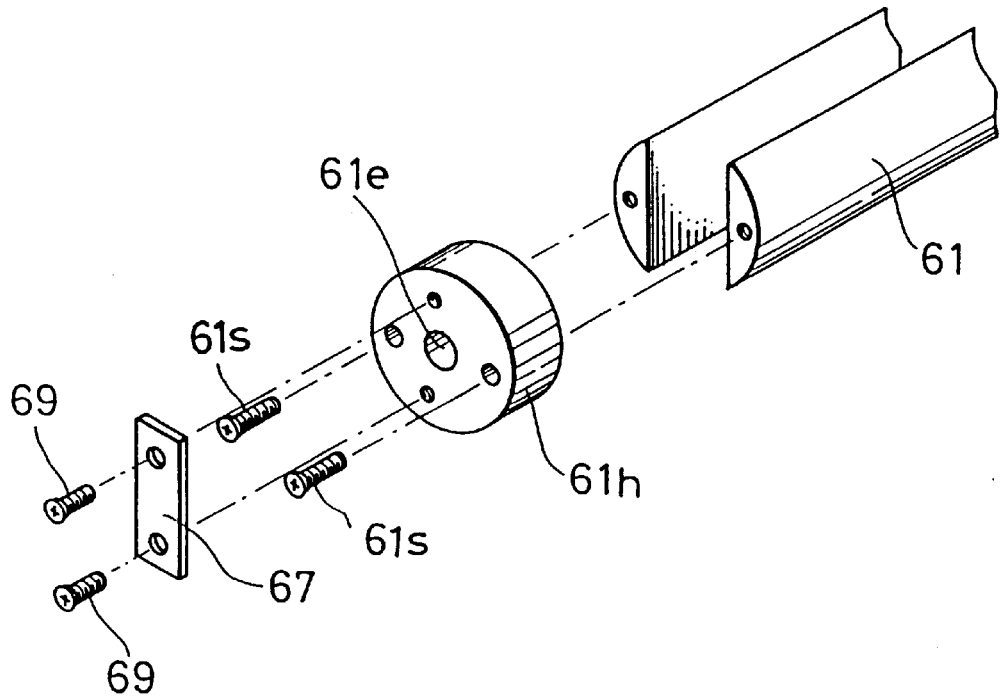
FIG. 16(a) and FIG. 16(b) are views describing a variation of one end of the driving apparatus shown in FIG. 11 and FIG. 12.
Figure 16B:
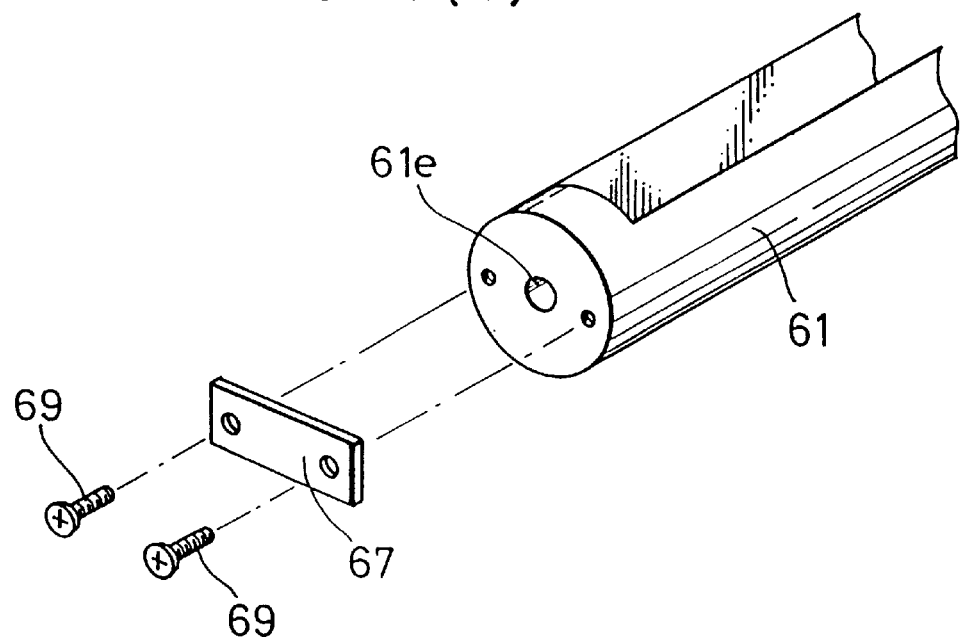

FIG. 16(a) depicts a variation of the driving apparatus shown in FIG. 11 and FIG. 12, and FIG. 16(b) shows the same structure as that of FIG. 12 for comparison. With the variation of FIG. 16(a), end plate 61h comprising the bearing hole 61e is formed as a discrete entity that may be detached from the stationary member 61. In the assembled state, the end plate 61h is secured with screws 61s to the stationary member 61. The structure allows the slider 64 alone to be dismounted while the stationary member 61 remains in place. This feature lowers the cost of having component parts of the driving apparatus replaced while enhancing the degree of freedom at which the driving apparatus is assembled.

Figure 14:
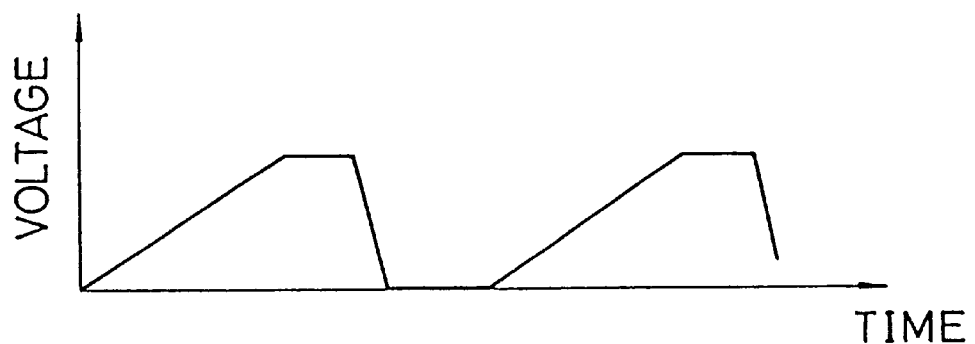
FIG. 14(a) and FIG. 14(b) are diagrams illustrating typical waveforms of voltages applied to an electro-mechanical transducer.
Figure 14:
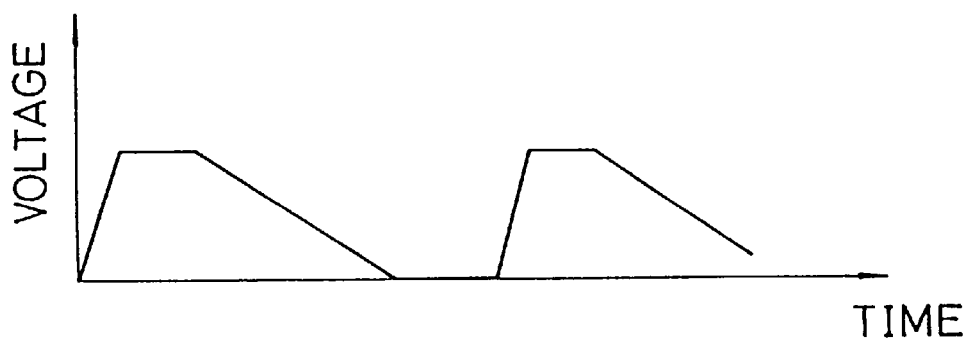
Figure 15A:
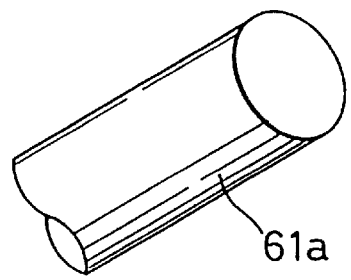
FIG. 15(a) through FIG. 15(e) are views picturing variations of the mounting part of the driving apparatus of FIGS. 11 and 12.
Figure 15B:
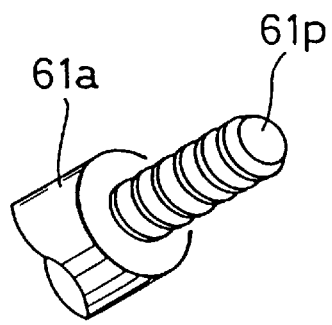
Figure 15C:
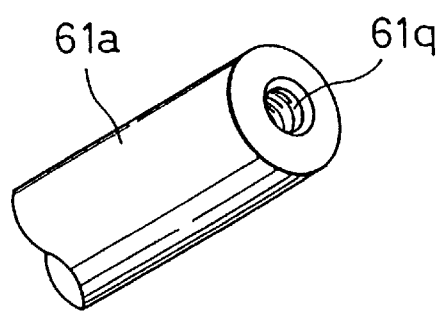
Figure 15D:
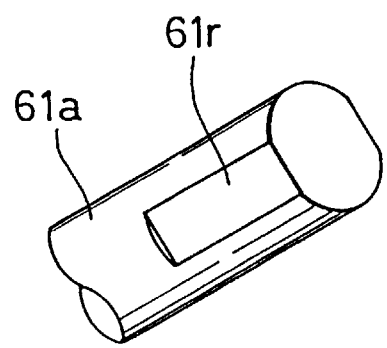
Figure 15E:
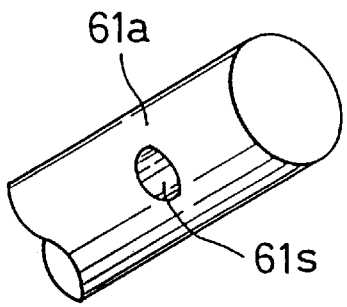

The second embodiment described above works on the same operating principle as that of the prior art. In operation, the piezo-electric element 62 is supplied with one of two kinds of voltages whose waveforms are shown in FIG. 14(a) and FIG. 14(b). With one waveform, each pulse is composed of a slowly rising leading edge followed by a rapidly falling trailing edge; with the other waveform, each pulse is composed of a rapidly rising leading edge followed by a slowly falling trailing edge. Continuous supply of such driving pulses causes the piezo-electric element 62 to expand and contract either slowly or rapidly. When the piezo-electric element 62 expands and contracts slowly, the lens unit 77 moves simultaneously with the driving shaft 63; when the piezo-electric element 62 expands and contracts rapidly, the lens unit 77 remains motionless.

Figure 17:
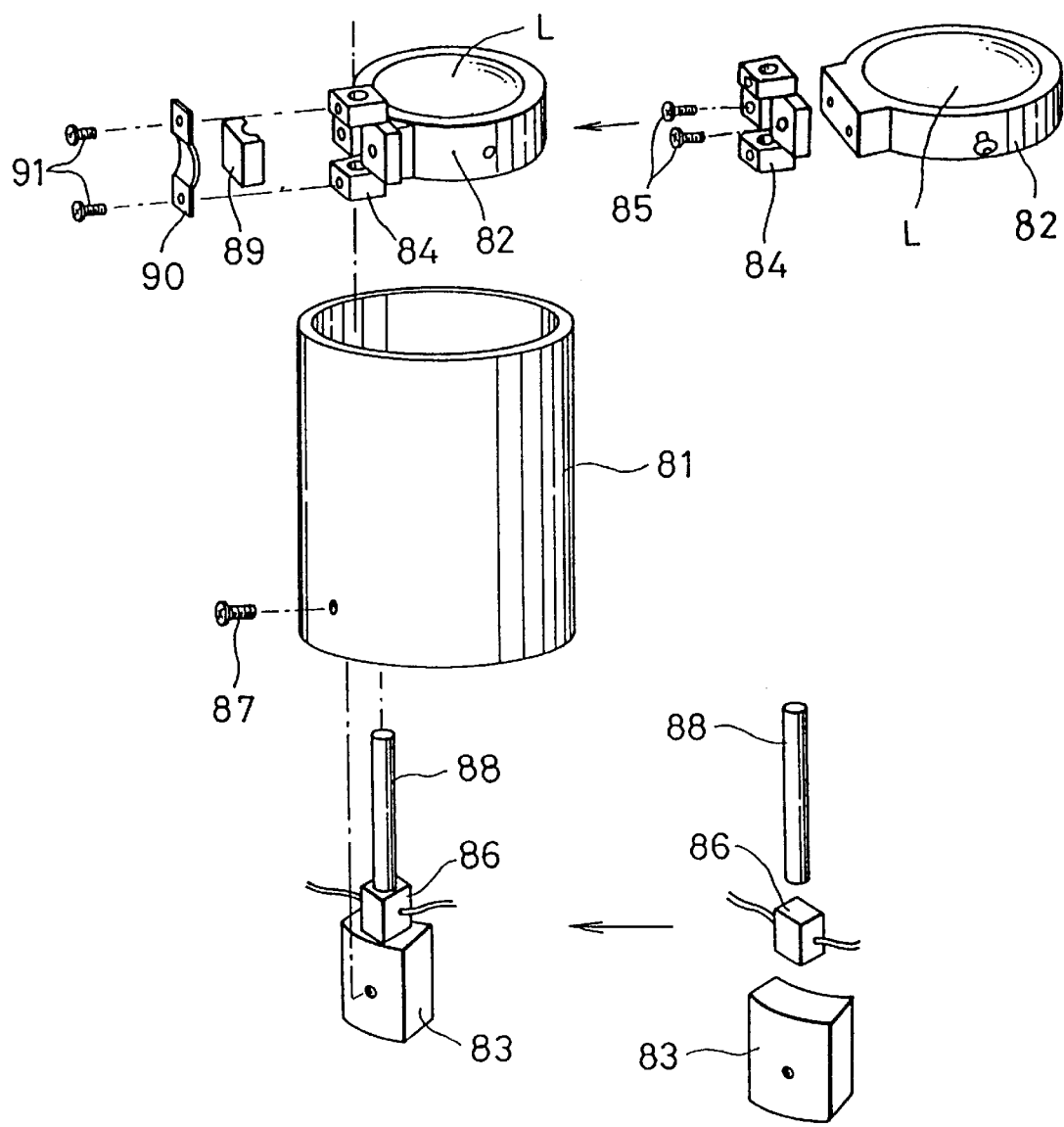
FIG. 17 is an exploded perspective view of the driving apparatus of FIG. 11 as it is applied to the lens barrel of a camera.

Described below with reference to FIG. 17 is the above-described driving apparatus as it is applied to the lens barrel of a camera. In FIG. 17, reference numeral 86 indicates a piezo-electric element. A mounting part 83 is bonded to one end of the piezo-electric element 86. A driving shaft 88 is bonded to the opposite end of the piezo-electric element 86.

Reference numeral 84 represents a slider. The driving shaft 88 penetrates a hole and a groove formed on the slider 84. A friction member 89 having a groove thereon is attached to the slider 84 so that the driving shaft 88 is sandwiched between the grooves of the friction member 89 and of the slider 84. The friction member 89 is held in place by a plate spring 90 fixed with screws 91. The plate spring 90 has a convex portion pushing against the friction member 89. The convex portion of the spring generates a frictional force between the friction member 89, driving shaft 88 and slider 84. The mounting part 83, piezo-electric element 86, driving shaft 88, slider 84, friction member 89 and plate spring 90 constitute an integrated, independent unit.

Reference numeral 81 stands for a fixed lens barrel. Inside the fixed lens barrel 81 is a lens frame 82 that holds a lens L. The lens frame 82 moves inside the fixed lens barrel 81 in the optical axis direction (i.e., in the vertical direction as seen in FIG. 17). As with the second embodiment, the lens frame 82 is attached with screws 85 to the slider 84. The piezo-electric element 86 is attached together with the mounting part 83 to the inside of the fixed lens barrel 81.

In this assembled state, the voltages whose waveforms are shown in FIGS. 14(a) and 14(b) are supplied to the piezo-electric element 86. This causes the lens frame 82 to move in the optical axis direction. Thus the focusing lens or a variator lens may be driven within the barrel in a directly linear manner.

Before being assembled into the host system, the driving apparatus can be tested alone for performance. For maintenance such as repair, the driving apparatus may be detached and serviced all by itself.

Figure 18:
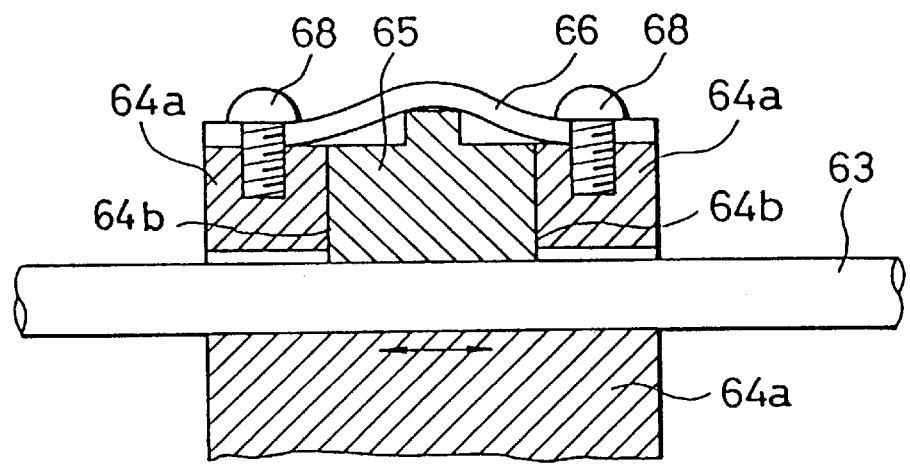
FIG. 18 is a cross-sectional view illustrating in an enlarged manner the contacting portions between the driving shaft and the slider associated with the driving apparatus shown in FIGS. 11 through 13.

FIG. 18 is a cross-sectional view illustrating in an enlarged manner the contacting portions between the driving shaft 63 and the slider 64 associated with the driving apparatus shown in FIG. 11 through FIG. 13. A friction member 65 is interposed between the driving shaft 63 and the slider 64 to generate a frictional force therebetween. The friction member 65 is pushed against the driving shaft 63 for frictional contact therewith by the plate spring 66 secured with screws 68 to the body 64a of the slider 64. The right face and left face of the friction member 65 is engaged closely with the face 64b of the slider body 64a so that the friction member 65 will not deform relative to the slider 64. The actuating force of the plate spring 66 is transmitted to the driving shaft 63 via the non-deforming friction member 65. Thus even when the driving shaft 63 is reciprocated by the piezo-electric element 62 at different velocities in the forward and reverse directions, the plate spring 66 will not be deformed elastically in the moving direction of the driving shaft 63.

Figure 19:
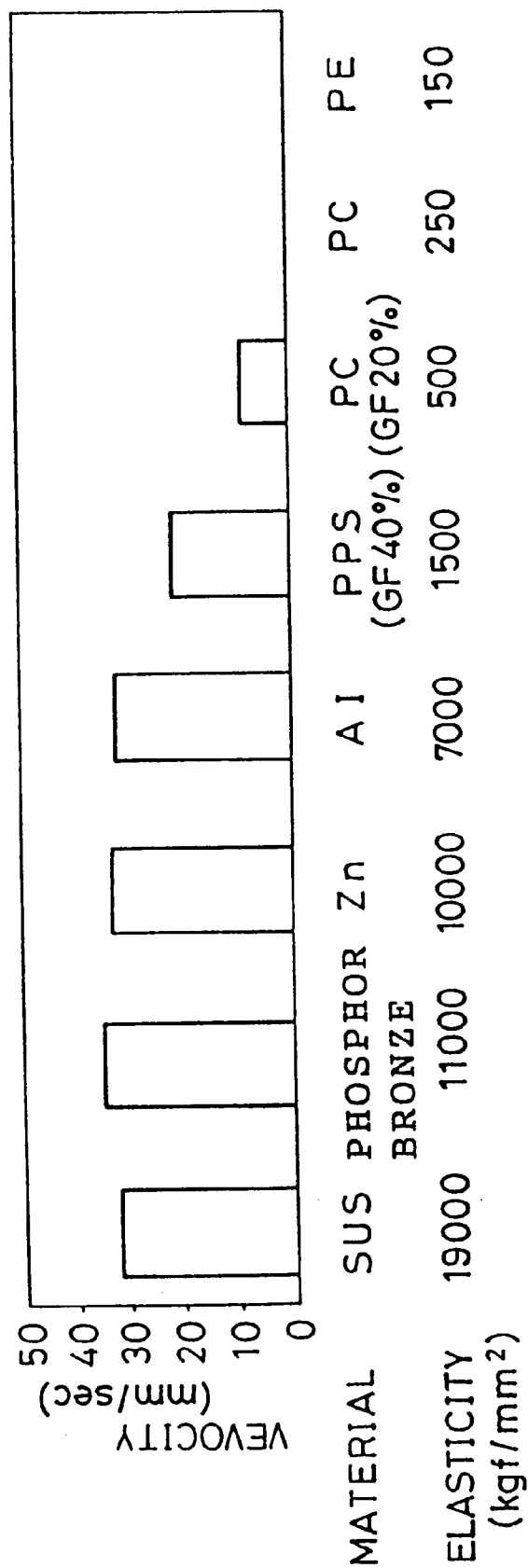
FIG. 19 is a diagram showing relationships between the moving velocities and the elastic moduli of some typical materials from which to make sliders and friction members.

What follows is a description of typical relationships between the moving velocities and the elastic moduli of some typical materials from which to produce sliders and friction members. FIG. 19 lists the materials selected by the inventors to be formed into the necessary components, along with the results from having these components tested for their moving velocity using driving pulses of a frequency of 25 kHz supplied to the piezo-electric element used. The listed materials having different elastic moduli are; stainless steel (SUS), phosphor bronze, zinc (Zn), aluminum (Al), a high-polymer fiber-reinforced composite PPS (containing 40 vol % of glass fiber (GF)), a high-polymer fiber-reinforced composite PC (containing 20 vol % of glass fiber (GF)), polycarbonate (PC), and polyethylene (PE).

The test results given in FIG. 19 reveal that the slider and friction member materials having lower elastic moduli are more liable to deform elastically in the moving direction of the driving shaft, thus reducing the velocity of movement.

Accordingly, the slider and the friction member should preferably be produced from the materials having an elastic modulus of at least 500 kgf/mm².

In some of the inventors' experiments, the slider, the friction member and the driving shaft were each made of a metal or metal compound. In such cases, the contacting surfaces of the parts involved developed seizure (in which the driving shaft, slider and friction member were stuck). Seizure did not occur where the slider and the friction member were each composed of a metal or metal compound and the driving shaft was made of a high-polymer fiber-reinforced composite. Where that component composition makeup was reversed, i.e., where the slider and the friction member were each composed of a high-polymer fiber-reinforced composite and the driving shaft was made of a metal or metal compound, the driving shaft became heavier than when it was formed of the high-polymer fiber-reinforced composite. In this case, the resonance frequency of the driving system dropped and the velocity of movement was reduced accordingly.

The results of the experiments indicate that it is preferable to have the driving shaft composed of a high-polymer fiber-reinforced composite and to have the slider and friction member formed of a metal or metal compound each.

Some aspects regarding the shapes of the slider and friction member will now be described. When the driving mechanism of this invention is operated for extended periods of time, the friction between the driving shaft, slider and friction member causes their contacting surfaces to wear. If left unchecked, the particles from the wear would accumulate on the contacting surfaces and worsen the performance. One proposed solution to this potential bottleneck is as follows: on the slider 64, that groove of the notch 64*b* which contacts substantially the lower half surface of the driving shaft 63 is arranged to have a V-shaped cross section instead of the semicircle cross section 64*c* shown in FIG. 11; likewise, that groove under the friction member 65 which contacts substantially the upper half surface of the driving shaft 63 is equipped with a V-shaped cross section in place of the semicircle cross section 65*a* in FIG. 11, as shown in FIG. 20 and FIG. 21.

Figure 20:
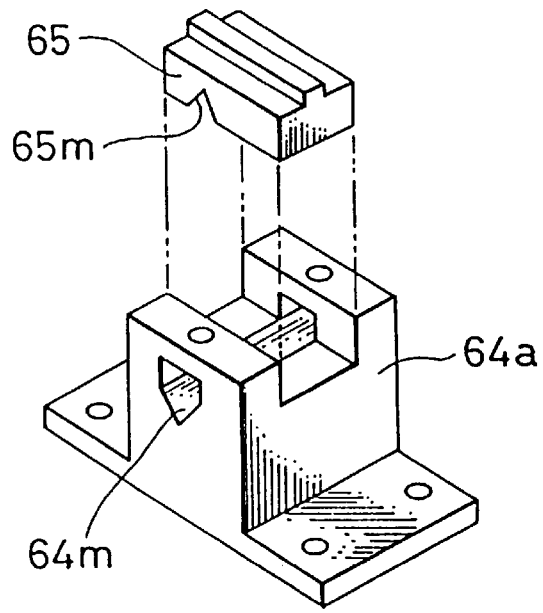
FIG. 20 is a perspective view indicating a first variation of a slider-and-friction member combination.

More specifically, the variation of FIG. 20 involves having the groove 64*c* of the notch 64*b* on the slider and the groove 65*a* under the friction member 65 (FIG. 11) replaced respectively by the grooves 64*m* and 65*m* having the V-shaped cross section each. The particles from the wear over the contacting surfaces of the driving shaft, slider and friction member are pushed out onto the bottoms of the V grooves 64*m* and 65*m* (with no contact with the driving shaft) to be evacuated outside.

Figure 21:
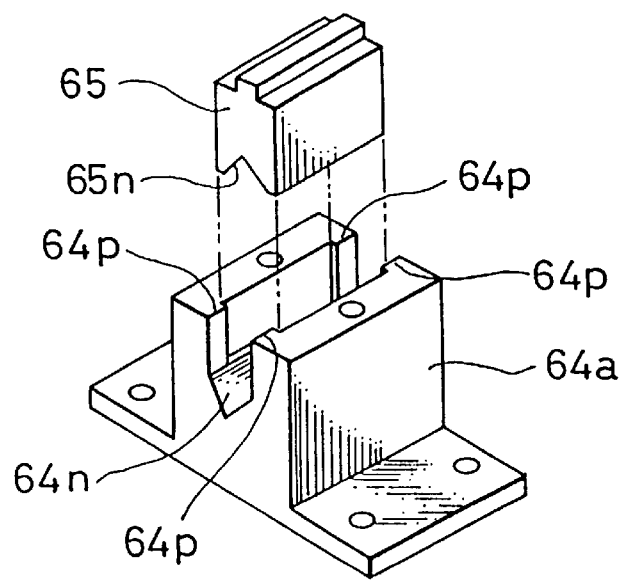
FIG. 21 is a perspective view indicating a second variation of the slider-and-friction member combination.

The variation of FIG. 21 involves having the middle of the slider body 64*a* equipped with a notch 64*n* having a V-groove along the driving shaft 63. Another V-groove 65*n* is formed under the friction member 65. Thus formed, the friction member 65 is engaged from above with the notch 64*n* of the slider body 64*a*. On the right- and the left-hand side of the notch 64*n* in the slider body 64*a* are embossed parts 64*p* contacting the fringe peripheries of the friction part 65. The embossed parts 64*p* are intended to prevent the friction part 65 from following the action of the driving shaft and thus moving away axially from the slider body 64*a*. This structure allows the slider mechanism to be opened upward when the friction member 65 is removed, whereby the slider may be mounted and dismounted in a direction other than the axial direction of the driving shaft.

Although not shown in FIG. 20 or 21, the above-described two variations each have the friction member pushed by a plate spring against the driving shaft for frictional contact therewith, the plate spring being secured to the slider body with screws. As with the second embodiment in FIG. 11, the actuating force of the plate spring may be adjusted by tightening or loosening the screws securing it.

As described, the driving apparatus using an electro-mechanical transducer comprises means for generating a frictional force between the driving member and the moving member. The frictional force generating means is composed of an elastic member fixed to the moving member for generating an actuating force, and of a friction member for transmitting the actuating force generated by the elastic member to the driving member. The friction member is engaged snugly with the moving member in the moving direction of the driving member. The engagement keeps the friction member undisplaced with respect to the moving member.

The structure of the driving apparatus allows the actuating force of the elastic member to be transmitted to the driving member via the friction member that remains motionless with respect to the moving member. When the driving member is axially reciprocated at different velocities in the forward and reverse directions, the elastic member is not elastically deformed in the moving direction of the driving member. Thus the moving member is driven stably at high velocity.

The moving member and friction member are each composed of a material with an elastic modulus of at least 500 kgf/mm². With the moving and friction members made of such materials, they will not develop elastic deformation in the moving direction of the driving shaft.

The driving member is composed of a high-polymer fiber-reinforced composite, and the moving and friction members are each formed of a metal or metal compound. This member composition makeup prevents seizure over the contacting surfaces of the engaged parts and ensures steady driving action.

Preferably, the driving member, moving member and the friction member may have a V-groove formed on each of their contacting surfaces. The V-groove structure facilitates evacuation of the particles from the wear on the contacting surfaces, thereby ensuring stable driving over long periods of time while maintaining the performance of the driving apparatus.

Figure 22:
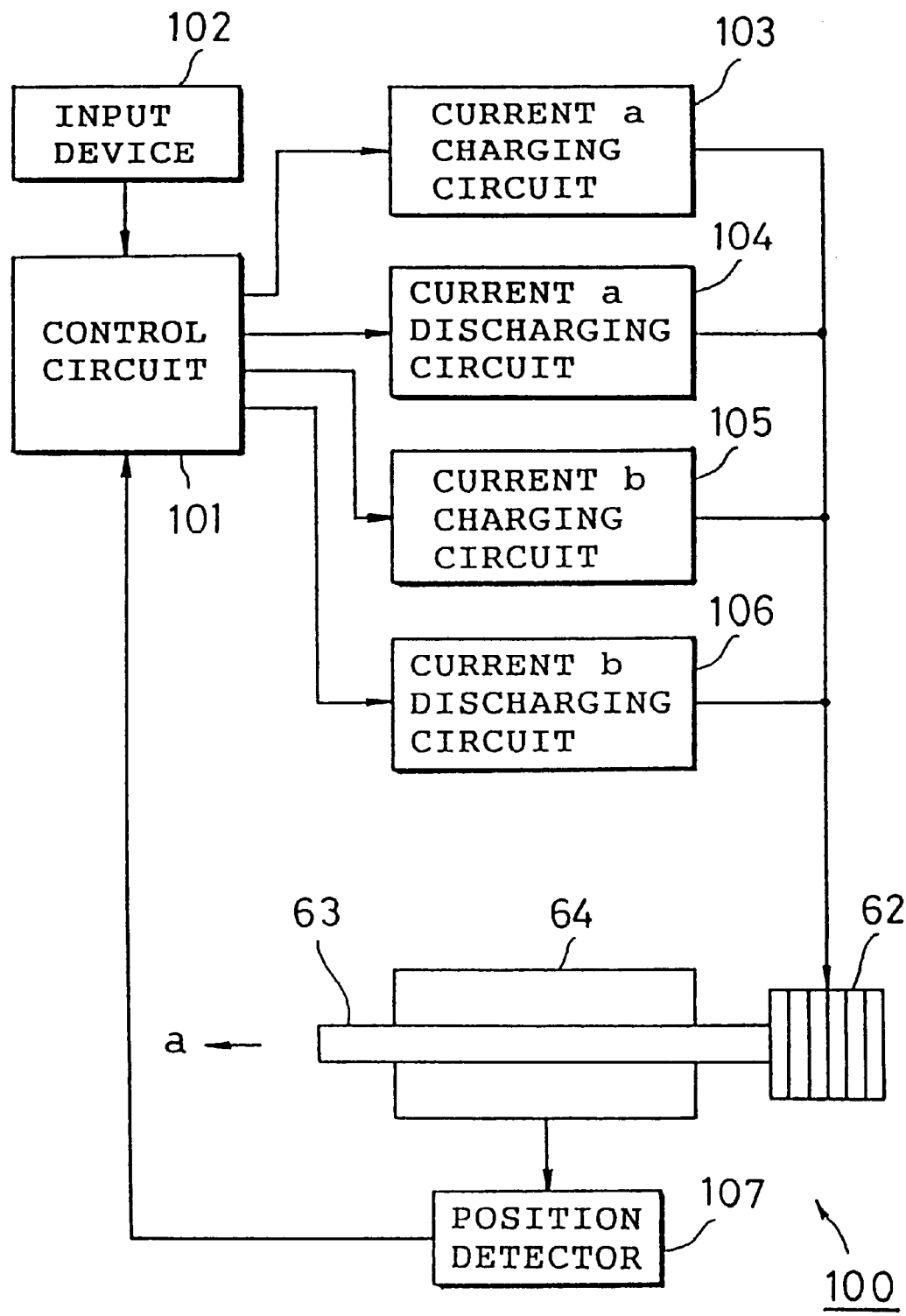
FIG. 22 is a block diagram of a second example of the driving circuit used by the piezo-electric element according to the invention.

How the piezo-electric element works will now be described in connection with the second embodiment driven by that element and shown in FIGS. 11 through 13. FIG. 22 is a block diagram of a typical driving circuit 100 used by the piezo-electric element according to the invention. In FIG. 22, the driving circuit 100 drives the piezo-electric element 62 by charging and discharging it using two different currents a and b (current a>current b). When driven selectively with the two currents of different magnitudes, the piezo-electric element 18 expands and contracts at different velocities.

Figure 23:
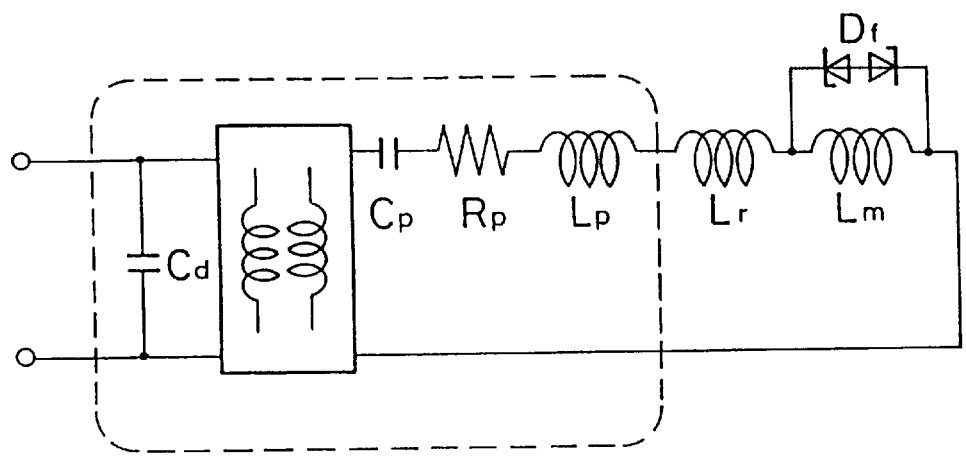
FIG. 23 is an equivalent circuit diagram comprising a piezo-electric element, a driving shaft and a slider and showing how a frictional force is generated illustratively between the driving shaft and the slider.

FIG. 23 is an electrically equivalent circuit diagram comprising a piezo-electric element, a driving shaft and a slider (i.e., moving member) and showing how a frictional force is generated illustratively between the driving shaft and the slider.

In the FIG. 23, it is denoted that:

$C_d$: Capacitance of piezo-electric element (dielectric part)

$C_p$: Capacitance of piezo-electric element (piezo-electric effect part)

$R_p$: Resistance of piezo-electric element (piezo-electric effect part)

$L_p$: Inductance of piezo-electric element (piezo-electric effect part)

Figure 24:
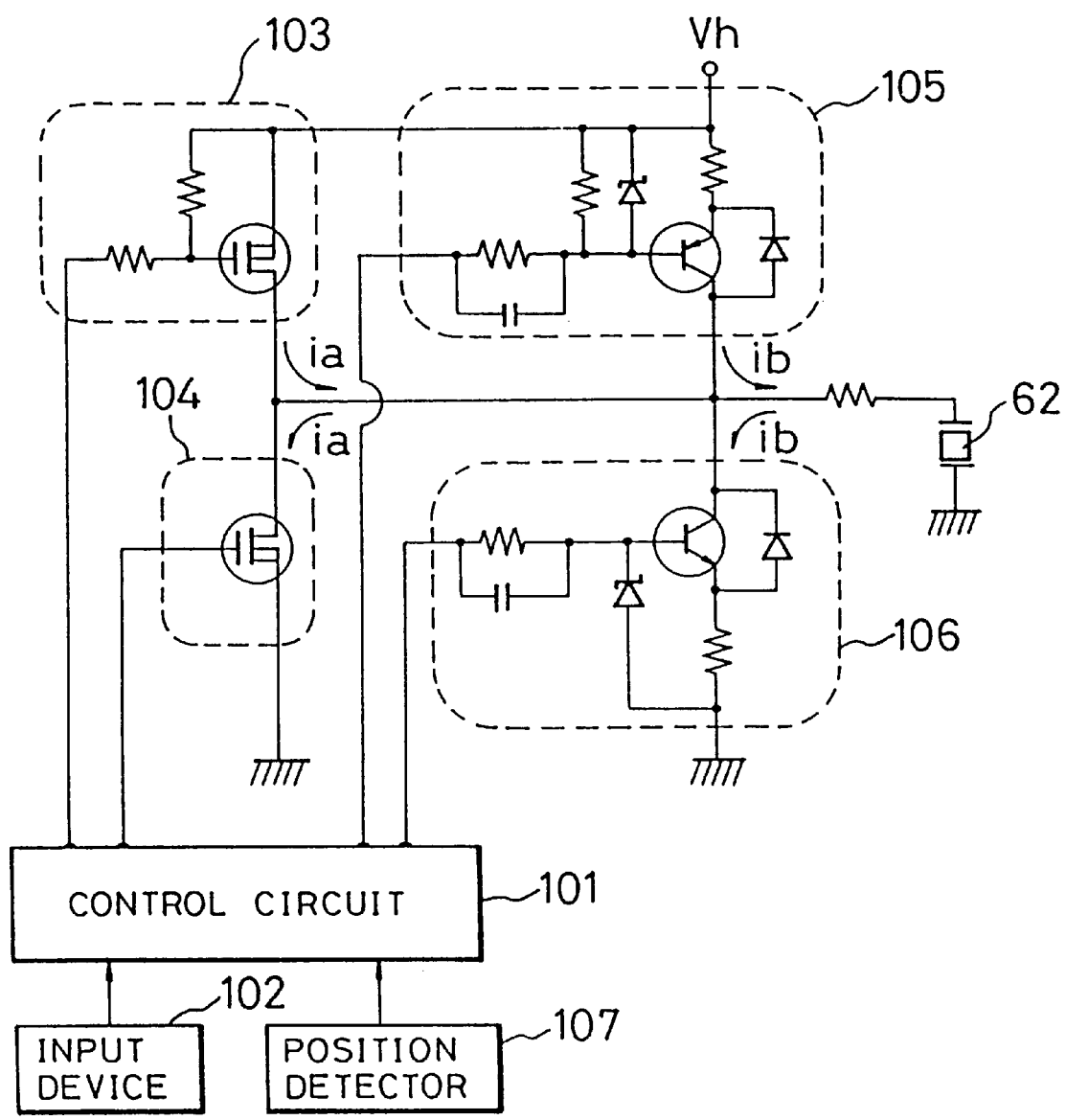
FIG. 24 is a circuit diagram of a current charging and a current discharging circuit.

$L_r$: Inductance which is equivalent to driving member $L_m$: Inductance which is equivalent to moving member $D_f$: Trigger diode which is equivalent to frictional force Referring to FIG. 22, the driving circuit 100 comprises a control circuit 101, an input device 102 for inputting the target position toward which to move the slider 64, a current a charging circuit 103, a current a discharging circuit 104, a current b charging circuit 105, a current b discharging circuit 106, and a position detector 107 for detecting the present position of the slider 64. FIG. 24 is a circuit diagram showing examples of the current a charging circuit 103, current a discharging circuit 104, current b charging circuit 105 and current b discharging circuit 106.

The input device 102 may illustratively be a rotation angle detector attached to a zoom operating ring for applications where the lens L is moved in zoom action. The position detector 107 for detecting the position of the slider 64 may illustratively be of a known type comprising magnetized rods and a magnetic reluctance element for detecting any one of these rods. The magnetized rods may be spaced equally apart and positioned in parallel with the driving shaft 63. The magnetic reluctance element may be attached to the slider 64, located close to the magnetic rods for detection of the latter.

The current a charging circuit 103 charges the piezo-electric element 62 rapidly using a large current. When the current a charging circuit 103 is activated, the piezo-electric element 62 produces a displacement of rapid expansion. The current a discharging circuit 104 discharges the piezo-electric element 62 rapidly using the large current. Activating the current a discharging circuit 104 causes the piezo-electric element 62 to produce a displacement of rapid contraction.

The current b charging circuit 105 is a constant current charging circuit that charges the piezo-electric element 62 slowly using a constant current smaller than that of the current a charging circuit 103. With the current b charging circuit 105 activated, the piezo-electric element 62 produces a displacement of slow expansion. The current b discharging circuit 106 is a constant current discharging circuit that discharges the piezo-electric element 62 slowly using a constant current smaller than that of the current a discharging circuit 104. Activating the current b discharging circuit 106 causes the piezo-electric element 62 to produce a displacement of slow contraction. The current b charging circuit 105 and current b discharging circuit 106 are designed to be a constant current charging circuit and a constant current discharging circuit, respectively. This is because, as evident from the operating principle, the piezo-electric element 62 slowly expanding and contracting will drive the moving member most efficiently when displaced at the most constant velocity possible.

When the piezo-electric element 62 produces displacements of slow expansion and contraction, the driving shaft 63 is moved slowly in the axial direction. The action effectively moves the slider 64 that is frictionally coupled with the driving shaft 63. When the piezo-electric element 62 expands and contracts rapidly, the driving shaft 63 moves rapidly in the axial direction. At this point, the inertia of the slider 64 frictionally coupled with the driving shaft 63 overcomes the frictional coupling force therebetween, allowing the slider 64 to stay substantially motionless where it is.

The above motionless state qualified as "substantial" includes the following case: regardless of the moving direction, the slider 64 follows the driving shaft 63 in motion while slipping over it, thus moving as a whole in the arrowed direction a depending on the time interval between the pulses.

The driving operation effected by the above-described driving circuit 100 will now be described with reference to FIG. 13 and to FIGS. 25 and 26 showing the timings of the driving operation.

How the lens L is moved in the arrowed direction a (FIG. 13) will be described first. The movement is accomplished by getting the piezo-electric element 62 to expand slowly in the arrowed direction a and to contract rapidly opposite to the arrowed direction a. This requires selectively activating the current b charging circuit 105 and the current a discharging circuit 104 in order to charge the piezo-electric element 62 slowly and then to discharge it rapidly. The piezo-electric element 62 is supplied with driving pulses of the waveform (a) in FIG. 25 wherein each pulse is composed of a slowly rising leading edge followed by a rapidly falling trailing edge. This produces a pulse current (b) in FIG. 25 wherein each pulse is made up of a positive constant current portion followed by an abruptly falling negative current portion. The current causes the piezo-electric element 62 to generate displacements of slow expansion in the arrowed direction a and of rapid contraction opposite to the arrowed direction a. This in turn causes the driving shaft 63 and slider 64 to move the lens L in the arrowed direction a.

How the lens L is moved opposite to the arrowed direction a (FIG. 13) will now be described. The movement is accomplished by getting the piezo-electric element 62 to expand rapidly in the arrowed direction a and to contract slowly opposite to the arrowed direction a. This requires selectively activating the current a charging circuit 103 and the current b discharging circuit 106 in order to charge the piezo-electric element 62 rapidly and then to discharge it slowly. The piezo-electric element 62 is supplied with driving pulses of the waveform (a) in FIG. 26 wherein each pulse is composed of a rapidly rising leading edge followed by a slowly falling trailing edge. This produces a pulse current (b) in FIG. 26 wherein each pulse is made up of a steep positive current peak followed by a constant negative current portion. The current causes the piezo-electric element 62 to generate displacements of rapid expansion in the arrowed direction a and of slow contraction opposite to the arrowed direction a. This in turn causes the driving shaft 63 and slider 64 to move the lens L opposite to the arrowed direction a.

FIG. 27(a) illustrates a typical waveform of the voltage applied to the piezo-electric element 62. FIG. 27(b) pictures displacements of the driving shaft 63 activated in response to the applied voltage whose waveform is shown in FIG. 27(a) by solid line (a), the view also indicating the amount of movement of the slider 64 frictionally coupled with the driving shaft 63 by broken line (b).

Described below is how the slider 64 (including the lens frame 77 and the lens L) frictionally coupled with the driving shaft 63 is moved. In the description that follows, the driving shaft 63 will be called the driving member and the slider 64 (including the frame 77 and lens L), the moving member. The moving member frictionally coupled with the driving member is moved by the piezo-electric element 62 producing displacements of expansion and contraction. In such cases, when the acceleration of the driving member is below a critical value, the moving member frictionally coupled therewith is moved without slipping; when the acceleration of the driving member exceeds the critical value, the frictionally coupled surfaces start slipping over each other.

Where the driving member is positioned horizontally, it is assumed that Fb stands for the actuating force of the spring 66 applying an additional frictional force between the driving member and the moving member, $\mu$ for the coefficient of static friction, and Mm for the mass of the moving member. Given these assumptions, the maximum coefficient of static friction between the driving and the moving member is given as:

$$Fs=\mu(Mm \cdot g+2Fb)$$

If $\mu d$ is assumed to represent the coefficient of dynamic friction, the dynamic frictional force Fd is given as:

$$Fd=\mu d(Mm \cdot g+2Fb)$$

When the driving member is actuated, the moving member frictionally coupled therewith is moved correspondingly. At this point, when the acceleration of the driving member is below the critical value, the frictionally coupled moving member is moved thereby without slipping; when the acceleration of the driving member exceeds the critical value, the frictionally coupled surfaces start slipping over each other. As mentioned earlier, the critical value Al of the acceleration is given as:

$$Al=Fs/Mm$$

According to this invention, the velocity of the driving member which drives the moving member in the target given direction is exceeded by the velocity of the driving member which drives the moving member in the opposite direction. Whether the moving member is to be moved in one direction or in the other, the acceleration of the driving member is arranged to exceed the critical value Al.

This means that whether the driving member moves in one direction or in the other, the driving member slips over the moving member frictionally coupled therewith. While such slippage is in progress, the moving member is subjected to the dynamic frictional force Fd in order to reduce the discrepancy in velocity relative to the driving member.

In such a case, the time t1 in which the moving member receives the dynamic frictional force Fd in the target direction due to the discrepancy in velocity relative to the driving member is longer than the time t2 in which the moving member receives the dynamic frictional force Fd opposite to the target direction. As a result, the velocity change dv per cycle in which the moving member is driven in one direction or in the other is given as:

$$dv=Fd(t1-t2)/Mm$$

Figure 28:
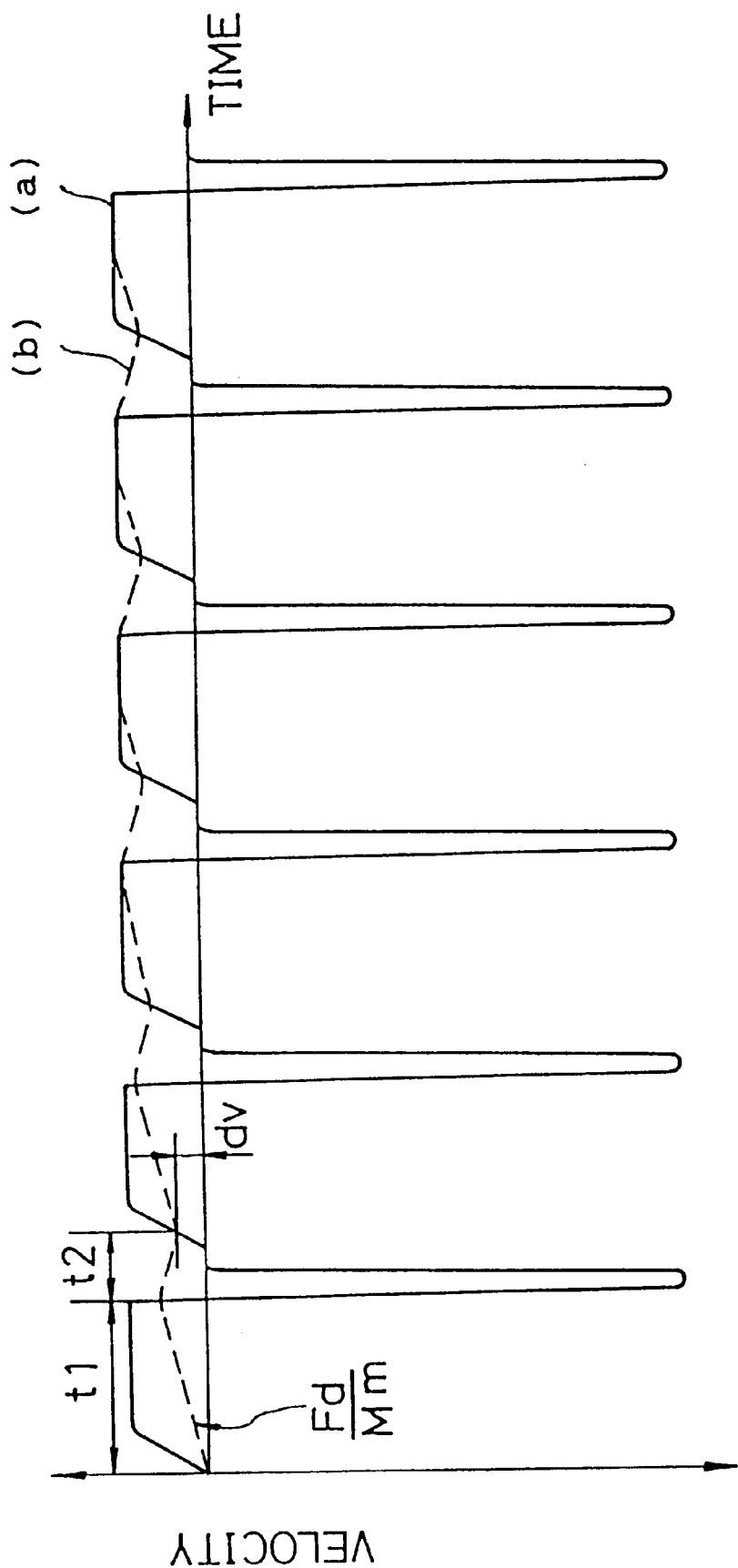
FIG. 28 is a diagram presenting driving velocities of a driving member and moving velocities of a moving member.

FIG. 28 presents velocities of the driving member (in solid line (a)) and velocities of the moving member (in broken line (b)). As illustrated, the moving velocity of the moving member gradually increases as the moving member is repeatedly driven in one direction and in the other. A steady velocity is attained when time t1=time t2 (see FIG. 28), and the moving member is moved in the target direction.

Figure 29:
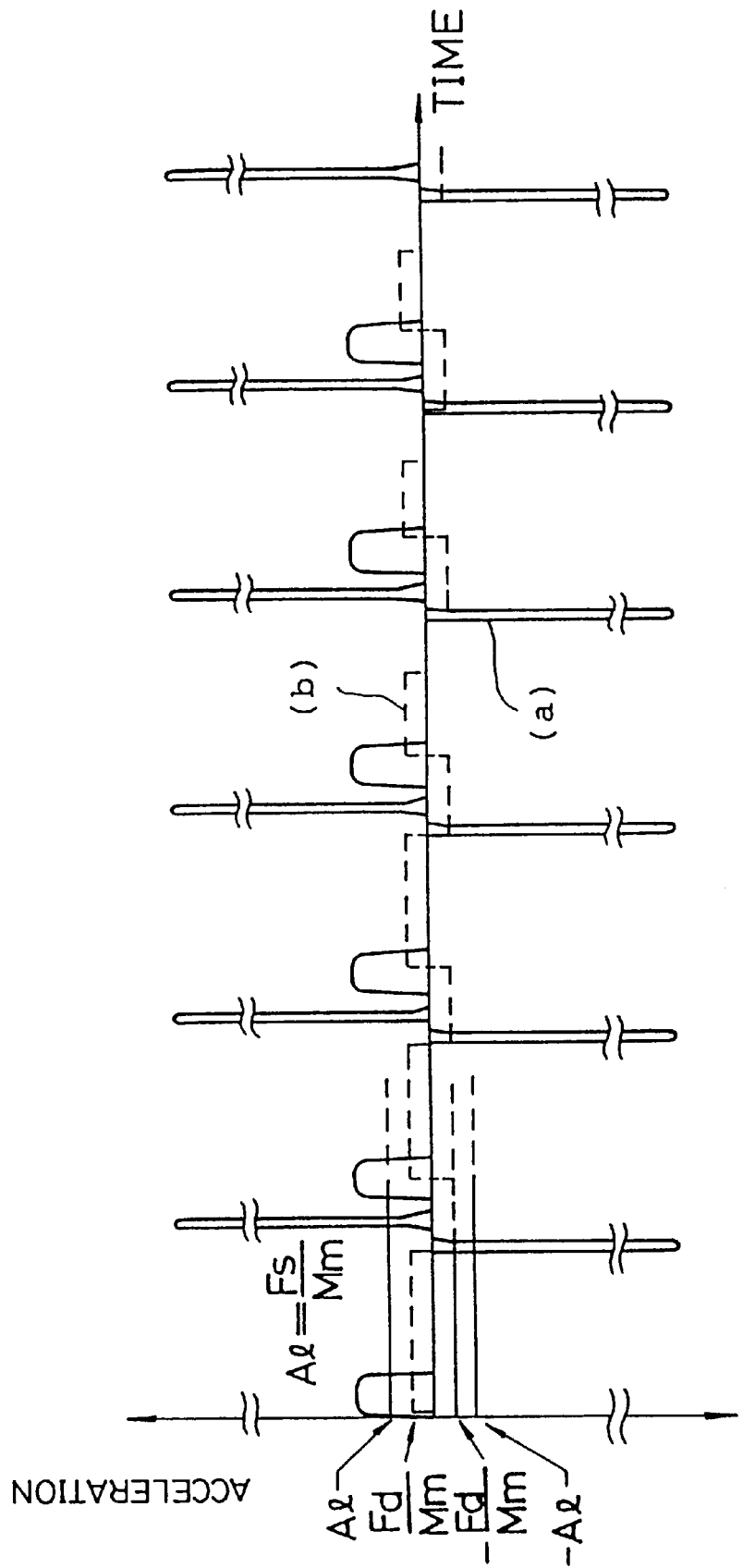
FIG. 29 is a diagram showing driving acceleration of a driving member and moving acceleration of a moving member.

FIG. 29 shows the acceleration of the driving member (in solid line (a)) and the moving acceleration of the moving member (in broken line (b)) in connection with the above movement.

Considered below is how the driving frequency for the driving member is typically related to changes in the velocity of the moving member moved horizontally by the driving member.

FIG. 30(a) through FIG. 34(b) show the results of some of the inventors' experiments depicting how the driving frequency for the driving member is typically related to changes in the velocity of the moving member moved horizontally under conditions 1 and 2 comprising diverse parameters: dimensions, mass and resonance frequency of the piezo-electric element; material type and mass of the driving member; resonance frequency and driving voltage of the component system; mass mm of the moving member; actuating force Fb of the spring; and the static frictional force Fs.

FIG. 30(a) shows how the component system is affected by different resonance frequencies. Specifically, FIG. 30(a) depicts how, under conditions 1 and 2 listed in FIG. 30(b), the driving frequency for the driving member is typically related to changes in the velocity of the moving member moved horizontally. Conditions 1 and 2 are resonance frequencies of 45 kHz and 25 kHz of the component system, respectively.

Figures 31A, 31B:
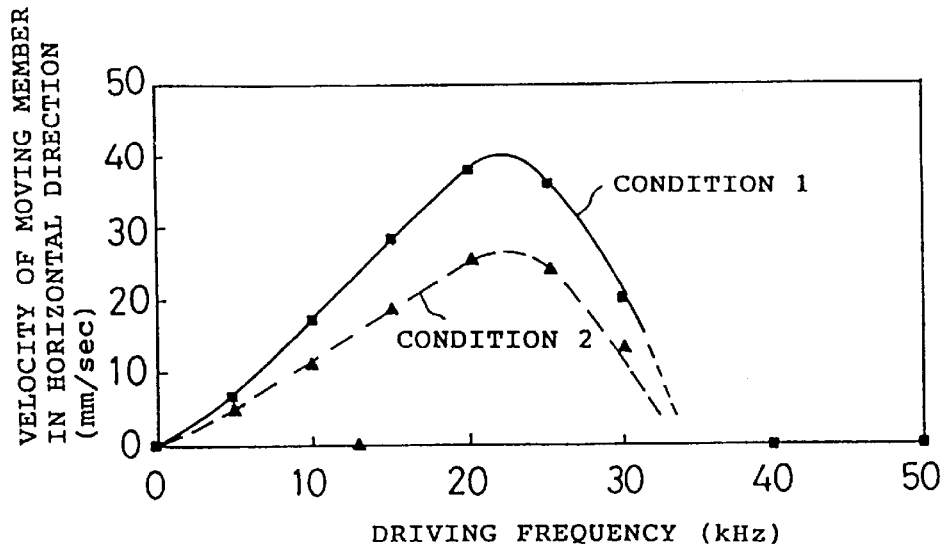
FIG. 31(a) and FIG. 31(b) are diagrams showing how, with a piezo-electric element driven on different maximum voltages, the driving frequency for the driving member of the element is typically related to changes in the velocity of a moving member moved horizontally by the driving member.

FIG. 31(a) shows how the piezo-electric element is affected by maximum driving voltages. Specifically, FIG. 31(a) indicates how, with the piezo-electric element driven under conditions 1 and 2 listed in FIG. 31(b), the driving frequency for the driving member of the element is typically related to changes in the velocity of the moving member moved horizontally. Conditions 1 and 2 are maximum driving voltages of 30 V and 20 V for the piezo-electric element, respectively. The other parameters remain unchanged.

Figures 32A, 32B:
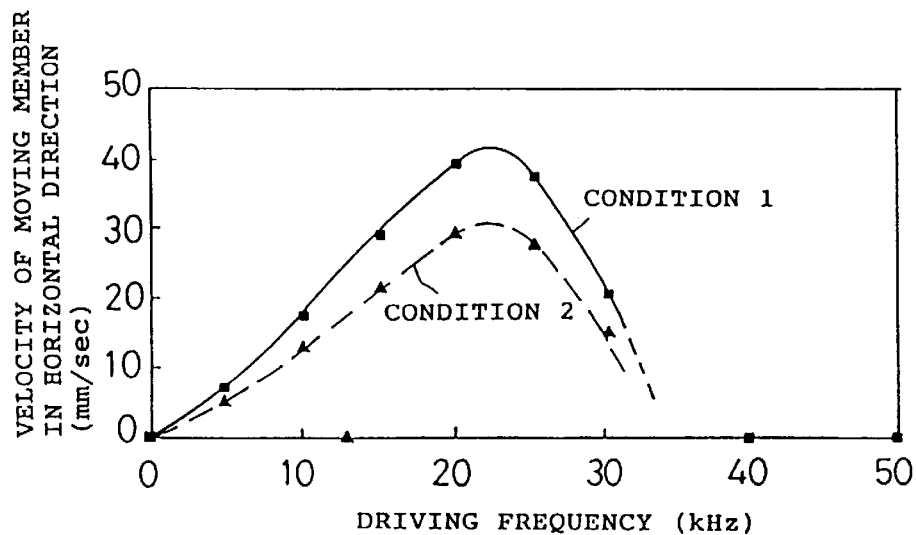
FIG. 32(a) and FIG. 32(b) are diagrams showing how, with a piezo-electric element driven by voltages of different waveforms, the driving frequency for the driving member of the element is typically related to changes in the velocity of a moving member moved horizontally by the driving member.

FIG. 32(a) shows how the piezo-electric element is affected by the waveform of applied driving pulse. Specifically, FIG. 32(a) illustrates how, with the piezo-electric element driven under conditions 1 and 2 listed in FIG. 32(b), the driving frequency for the driving member of the element is typically related to changes in the velocity of the moving member moved horizontally. Condition 1 stands for the piezo-electric element provided with a driving pulse having an optimum waveform, and condition 2 represents the driving pulse of a sawtooth waveform. The other parameters remain unchanged.

Figures 33A, 33B:
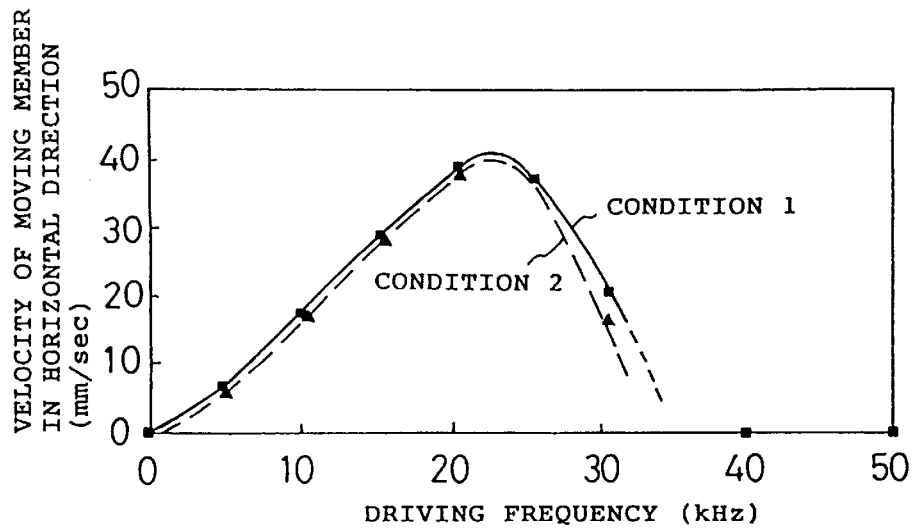
FIG. 33(a) and FIG. 33(b) are diagrams showing how, with moving members having different masses, the driving frequency for a driving member is typically related to changes in the velocity of each moving member moved horizontally by the driving member.

FIG. 33(a) shows how the moving member is affected by its mass. Specifically, FIG. 33(a) depicts how, under conditions 1 and 2 listed in FIG. 33(b), the driving frequency for the driving member is typically related to changes in the velocity of each moving member moved horizontally. Conditions 1 and 2 represent masses of 20 g and 40 g of the moving member, respectively. The other parameters remain unchanged.

Figures 34A, 34B:
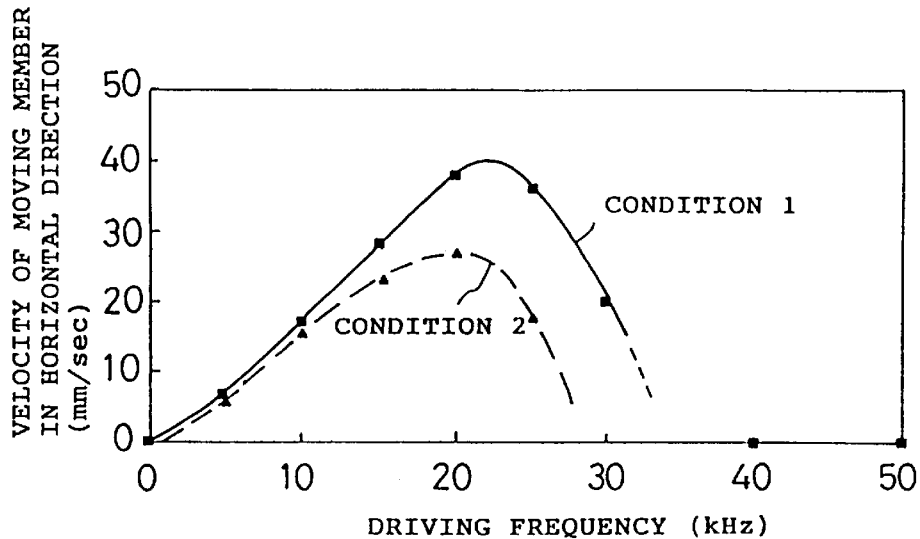
FIG. 34(a) and FIG. 34(b) are diagrams showing how, given different frictional forces between a driving and a moving member, the driving frequency for the driving member is typically related to changes in the velocity of the moving member moved horizontally by the driving member.

FIG. 34(a) shows how the driving member and moving member are affected by the frictional working force therebetween. Specifically, FIG. 34(a) depicts how, under conditions 1 and 2 listed in FIG. 34(b), the driving frequency for the driving member is typically related to changes in the velocity of the moving member moved horizontally. Condition 1 denotes an actuating force of 500 gf of the spring generating a frictional force of 200 gf. (The frictional force is determined by adjusting the actuating force of the spring. Under condition 1, the frictional force of 200 gf is provided by setting the actuating force of 500 gf. of the spring.) Condition 2 represents an actuating force of 1000 gf of the spring resulting in a frictional force of 400 gf. The other parameters remain unchanged.

The above-described results of the inventors' experiments reveal the following: that the driving frequency at which the moving member is moved most rapidly is affected significantly by the resonance frequency of the component system comprising the driving member and piezo-electric element (see FIG. 30(a)); and that the other parameters, while somewhat affecting the maximum moving velocity of the moving member, have only negligible effects on the driving frequency currently in effect. Additional experiments indicated that the above findings applied to other piezo-electric elements of varying dimensions and volumes.

The reasons for the effects exerted by the resonance frequency of the component system are surmised theoretically as follows: the driving apparatus drives the moving member by utilizing different velocities of the piezo-electric element in its contracting motion. However, when the moving member is driven by the piezo-electric element using driving pulses of a frequency exceeding the resonance frequency of the component system made up of the driving member and piezo-electric element, it is impossible to use different velocities of the piezo-electric element in its contracting motion. This is theoretically unavoidable due to the delayed response of the piezo-electric element. In that case, the moving member cannot be moved even if the driving frequency is raised above the resonance frequency of the component system. Conventional theoretical studies so far failed to say how close the driving frequency can be set to the resonance frequency of the component system.

The inventors' experiments described above indicate that the velocity of the moving member in its horizontal movement reaches its maximum level Vmax when the driving frequency is about half the resonance frequency f1 of the component system (see FIG. 30(a)). If f is assumed to represent the driving frequency falling within the range of:

$$\tfrac{1}{3}f1 \leq f \leq \tfrac{2}{3}f1$$

then the horizontal moving velocity v of the moving member falls within the range of:

$$v \geq Vmax/2$$

That is, the moving member can be driven efficiently at a practically high enough velocity.

Conversely, where the driving frequency f is predetermined, the resonance frequency f1 of the component system is arranged to fall within the range of;

$$f1 \geq 3f/2$$

This improves the moving velocity v.

Where it is desired to drive the moving member stably at high velocity using a driving frequency of 20 kHz or higher, the resonance frequency f1 of the component system should be set for 30 kHz or higher.

Assume that f0 stands for the resonance frequency in effect when the piezo-electric element has both its ends left free and subject to no load, Mp for the mass of the piezo-electric element, and Mr for the mass of the driving member. Under these assumptions, the resonance frequency f1 of the component system is given by the following expression:

$$f1 = \frac{f0}{2}\sqrt{\frac{Mp}{Mp+2Mr}} \quad (1)$$

Described below are the results of comparative experiments conducted by the inventors comparing under varying conditions the velocity of the moving member moved by the inventive driving apparatus, with the velocity of the moving member moved by a conventional driving apparatus.

Experiments

The comparative experiments outlined above were carried out under the following conditions:

Resonance frequency of the piezo-electric element fr=138 kHz

Mass of the piezo-electric element Mp=0.29 g

Mass of the driving member Mr=0.20 g

Mass of the entire moving member Mm=50 g

Voltage applied to the piezo-electric element V=30 (displacement of 1.5 µm in static state under no load)

The actuating force of the spring was set so as to produce the following frictional forces:

Dynamic frictional force of 200 gf between the driving and the moving member according to the invention Dynamic frictional force of 2000 gf between the driving and the moving member as per the prior art Calculated delayed response t1≅140 µsec. in effect when the driving member is moved in the target direction Calculated delayed response t2=10 µsec. in effect when the driving member is moved opposite to the target direction The following results were obtained:

|  | Maximum velocity | Velocity peak frequency |
| --- | --- | --- |
| Conventional apparatus | 8 mm/sec | 6 kHz |
| Inventive apparatus | 40 mm/sec | 25 kHz |

Comparing the prior art with the invention in terms of characteristics

Figure 35:
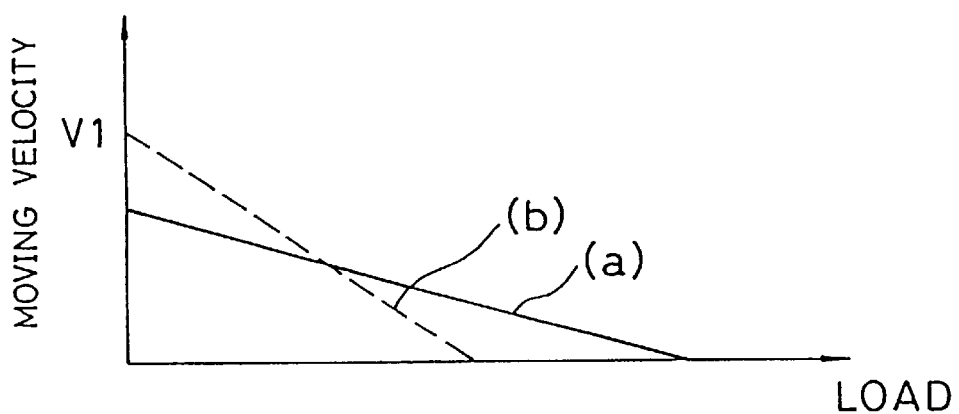
FIG. 35 is a diagram comparing typical characteristics of the invention with those of the prior art, in effect when low-frequency driving pulses are used.
Figure 36:
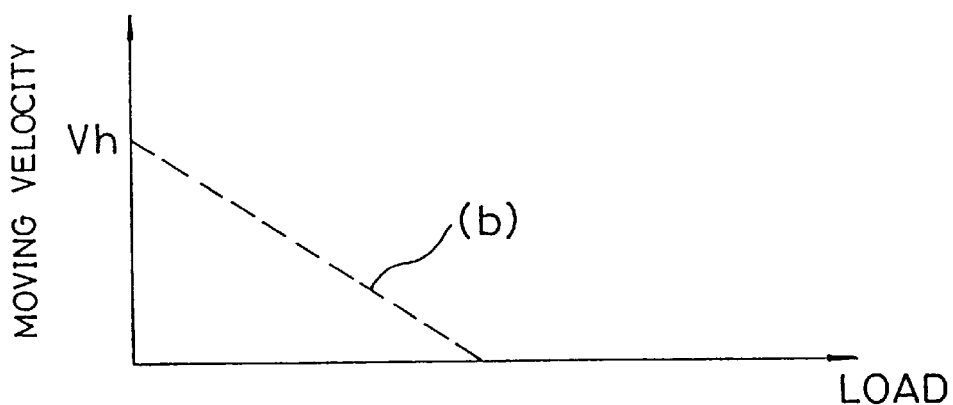
FIG. 36 is a diagram comparing typical characteristics of the invention with those of the prior art, in effect when high-frequency driving pulses are used.

FIG. 35 is a diagram comparing typical characteristics of the invention in line (b) with those of the prior art in line (a), the characteristics being in effect when low-frequency driving pulses are used. FIG. 36 compares typical characteristics of the invention in line (b) with those of the prior art (no line (a) appears), the characteristics being in effect when high-frequency driving pulses are used (i.e., frequencies at which the maximum velocity is achieved). In each of these figures, solid lines (a) represent the characteristics of the prior art and broken lines (b) those of the invention.

In FIGS. 35 and 36, the axis of abscissa stands for loads and the axis of ordinate for the current velocity of the moving member. The loads are adjusted by changing the mass of the moving member and by moving it upward. The zero load is in effect when the moving member is driven horizontally. The velocity is one which is in effect when the moving member is in a steadily moving state.

At low driving frequencies, trade-offs in performance were found to exist between the invention and the prior art. On the one hand, the inventive driving apparatus is superior to the conventional apparatus in having a less decrease in the velocity of the moving member when the driving member moves opposite to the target direction. This allows the inventive driving apparatus to boost its steady-state velocity. As shown in FIG. 28, the steady-state velocity may be increased close to the velocity at which the driving member moves in the target direction. The ideal maximum velocity of the moving member is given by the following formula:

Velocity of Moving Member=Driving Velocity×Actual Displacement of Piezo-electric Element×2

On the other hand, the inventive driving apparatus working at low driving frequencies is not expected to drive heavy loads.

Furthermore, the inventive driving apparatus has a slower build-up velocity than the conventional driving apparatus. Whereas the conventional driving apparatus attains its steady-state velocity starting from the first period, the inventive driving apparatus takes three periods to reach its steady-state velocity, as shown in FIG. 27(a), FIG. 27(b), FIG. 28 and FIG. 29 (especially in FIG. 28). Given these advantages and disadvantages, the inventive driving apparatus operating at low driving frequencies is suitable for moving a low-load target object at high velocity (e.g., for moving an object horizontally).

Described so far has been the comparison between the inventive and the conventional driving apparatus working at low driving frequencies. However, to operate at high velocity the driving apparatus such as one proposed by the invention requires that the driving frequency be as high as possible. FIG. 36 compares typical characteristics of the invention with those of the prior art, the characteristics being in effect when the driving frequency is raised so that the moving member is driven at maximum velocity. With the driving frequency thus raised, the conventional driving apparatus is incapable of driving the moving member.

Figure 37:
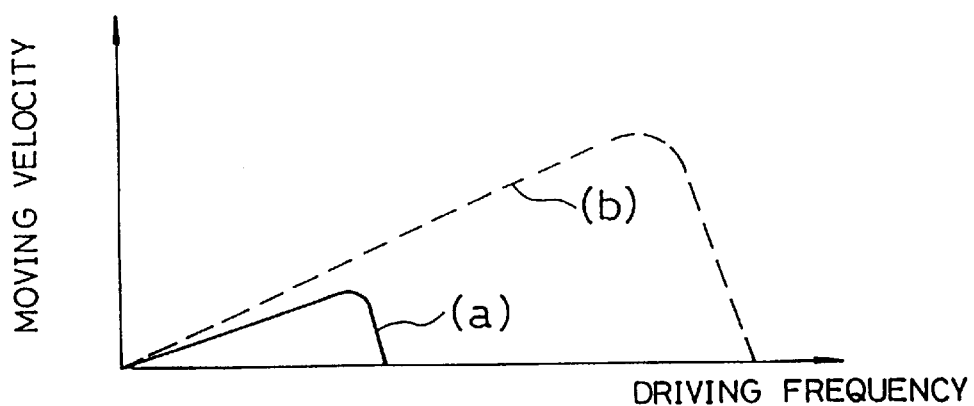
FIG. 37 is a diagram comparing typical characteristics of the invention with those of the prior art in effect at varying driving frequencies.

The immobility of the conventional driving apparatus is attributable to a difference between the invention and the prior art in terms of drivable frequency ranges. FIG. 37 compares typical characteristics of the invention with those of the prior art in effect at varying driving frequencies. The solid line stands for the prior art and the broken line for the invention.

In FIG. 37, the axis of abscissa represents driving frequencies and the axis of ordinate denotes velocities of the moving member. The velocities are those in effect when each moving member is moved steadily. As can be seen from the figure, the velocity of the moving member is increased substantially in proportion to the driving frequency being raised. The velocity peaks at a certain frequency, and then drops. The velocity of the moving member in the inventive setup peaks at a higher driving frequency than the velocity in the conventional setup. This affords the inventive driving apparatus the ability to provide higher moving velocities.

Raising the driving frequency not only boosts the velocity of the moving member but also offers benefits that offset the apparent disadvantages of the invention at low driving frequencies compared with the prior art. Such benefits include: a higher start-up velocity gained by the shortened driving cycle of the moving member; enhanced critical value Al of the acceleration derived from the boosted acceleration of the driving member to allow heavier loads to be driven; and a reduced noise level of the operation made possible because the apparatus may be driven at 20 kHz or higher, in excess of the audio frequency for the human ear.

Figure 38:
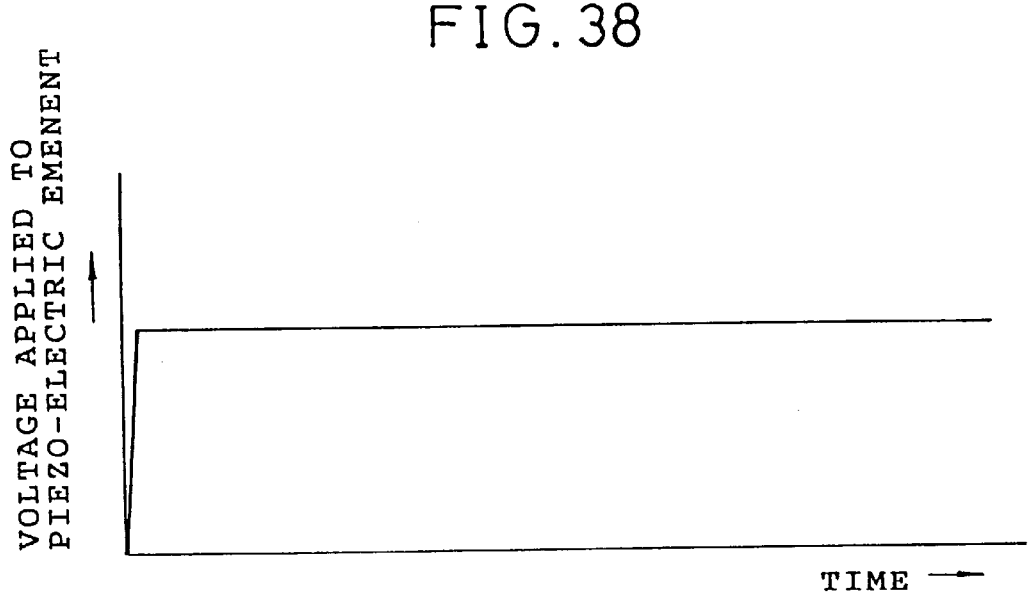
FIG. 38 is a diagram showing a typical voltage applied to a piezo-electric element.
Figure 39:
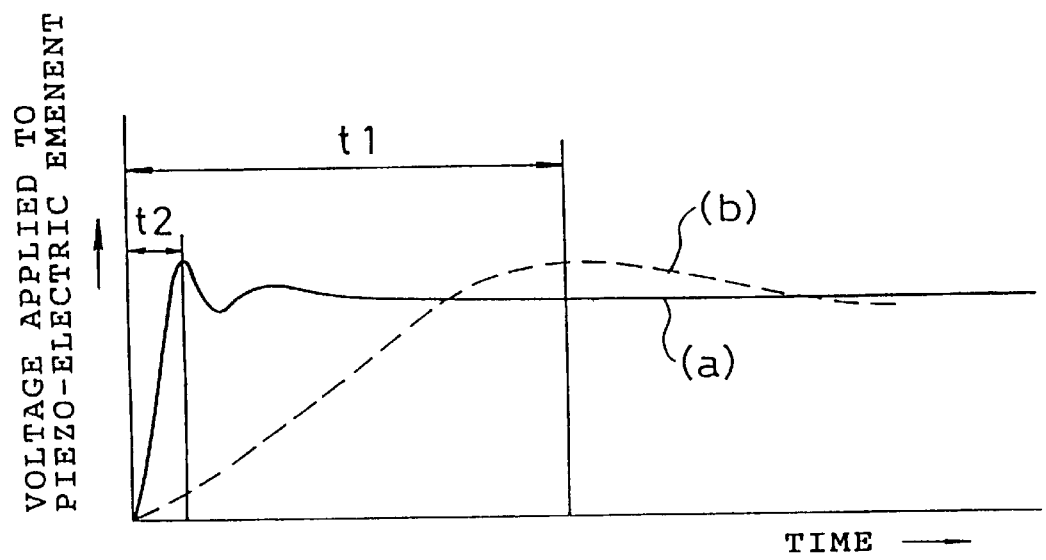
FIG. 39 is a diagram showing delayed responses of a piezo-electric element.

The delayed response of the piezo-electric element used by the driving apparatus will now be described. The conventional driving apparatus using the piezo-electric element has its response delayed in accordance with the mass of the target object to be moved. This means that, as shown in FIG. 39, the piezo-electric element fed with an impact voltage such as one in FIG. 38 has different delayed responses in two states: in one state, the piezo-electric element moves both the driving member and the moving member; in the other state, the piezo-electric element moves the driving member alone. In FIG. 39, the solid line (a) represents the state where the driving member alone moves while the moving member slips and remains motionless, and the broken line (b) denotes the state where both the driving member and the moving member (not slipping) are moved.

Figure 40:
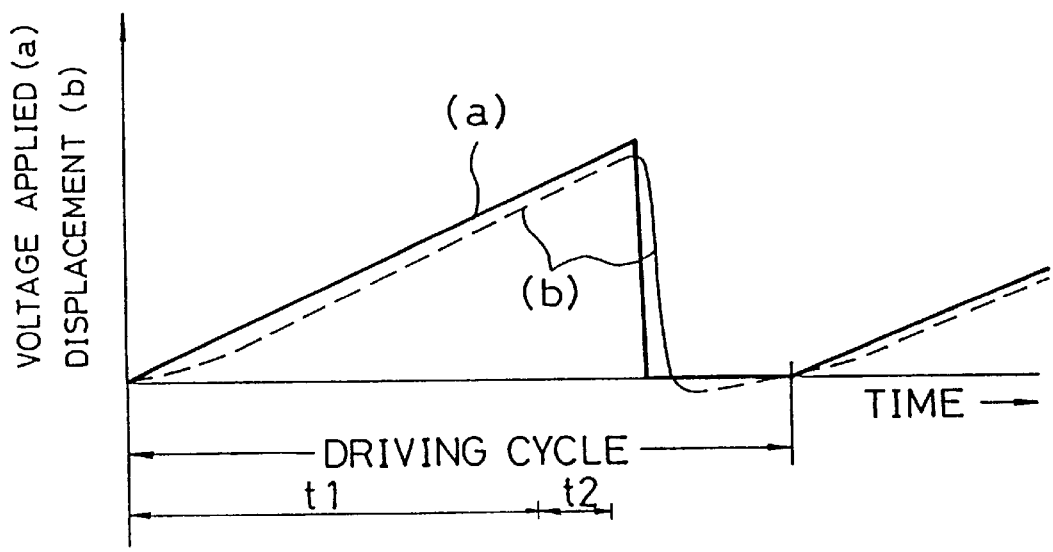
FIG. 40 is a diagram showing typical displacements generated by a prior art arrangement operating at a low frequency.
Figure 41:
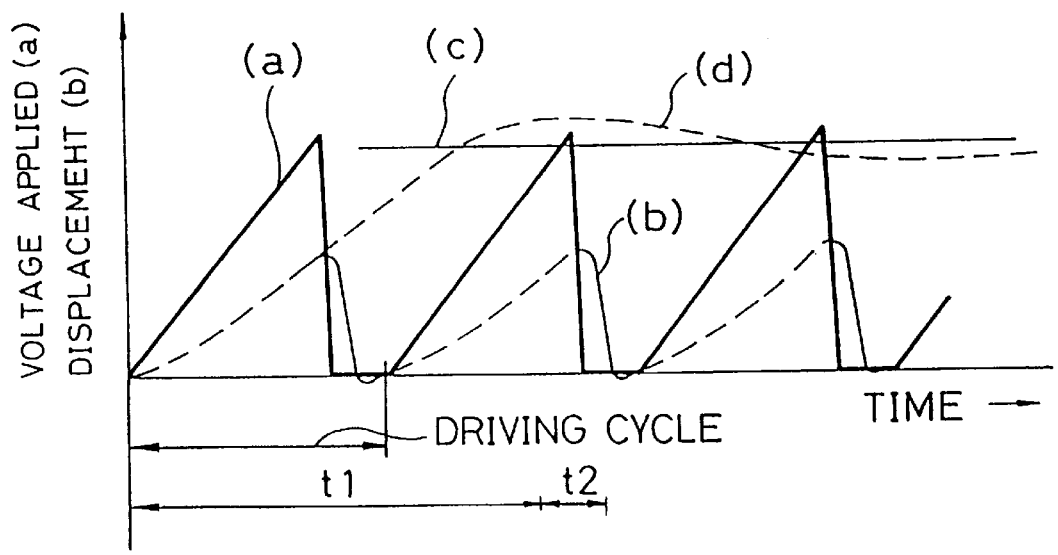
FIG. 41 is a diagram showing typical displacements generated by the prior art arrangement operating at a high frequency.

Assume that the delay times of the two states are represented by t1 and t2 (t1≫t2). When the driving member is moved in the target direction, the moving member does not slip and the delay time is t1. When the driving member is moved opposite to the target direction, the moving member is allowed to slip and thus its mass is ignored. In the latter case, the delay time is t2. If the driving cycle is longer than the sum of these two delay times (t1+t2), the piezo-electric element fully expands with no delayed response, as shown in FIG. 40. If the driving cycle is shorter than the sum of the two delay times (t1+t2), the piezo-electric element starts to contract before expanding to the full, as illustrated in FIG. 41. Accordingly, the amount of displacement effected by the piezo-electric element is reduced. This in turn lowers the velocity of the moving member. As a result, the velocity of the moving member driven by the conventional driving apparatus peaks in a driving cycle close to the duration of (t1+t2) and at a driving frequency of 1/(t1+t2).

In FIGS. 40 and 41, thick solid straight lines (a) represent the voltages, and curves in broken and solid lines (b) denote displacements of the piezo-electric element and hence of the driving member. In the broken line portions, the moving member is not slipping; the moving member slips in the solid line portions. In FIG. 41, the horizontal line (c) parallel to the axis of abscissa indicates the displacement level to which the piezo-electric element should normally expand when supplied with the voltage shown in this figure. The broken line (d) curves represent the approximate positions to which the piezo-electric element expands when the moving member continues to slip.

The delay in the response of a given system generally amounts to half of its resonance frequency. The resonance period is the reciprocal number of the resonance frequency. The resonance frequency f1 of a system having no slipping member is equal to the resonance frequency of the piezo-electric element of the system, one end of that element being secured and the other free end being attached fixedly to an integral assembly of the driving and moving members. The resonance frequency f2 of a system having a slippery moving member is equal to the resonance frequency of the piezo-electric element of the system, one end of that element being secured and the other free end being attached fixedly to the driving member.

Assume that f0 stands for the resonance frequency in effect when the piezo-electric element has both its ends left free and subject to no load, Mp for the mass of the piezo-electric element, and Mr for the mass of the driving member. Under these assumptions, the resonance frequencies f1 and f2 of the component system are given as:

$$f1 = \frac{f0}{2} \sqrt{\frac{Mp}{Mp + 2(Mr + Mm)}}$$

$$f2 = \frac{f0}{2} \sqrt{\frac{Mp}{Mp + 2Mr}}$$

Using the resonance frequencies f1 and f2 thus obtained, one finds the driving frequency fp1 at which the driving velocity of the conventional driving apparatus peaks, as follows:

$$fp1 \approx 1/(t1+t2),\ t1=1/(2 \cdot f1),\ t2=1/(2 \cdot f2)$$

Therefore, $$fp1 \approx \frac{2 \cdot f1 \cdot f2}{f1 + f2}$$

Raising the driving frequency higher than its peak fails to increase the velocity of the moving member. With the prior art, the moving member cannot be driven at any higher velocity.

According to the invention, the piezo-electric element is assumed to cause slippage between the driving and the moving member both when expanding and when contracting. It is also assumed that f1 represents the resonance frequency of such a piezo-electric element with one end thereof secured and the other end thereof attached fixedly to the driving and moving members. It is further assumed that f2 denotes the resonance frequency of the piezo-electric element with one end thereof secured and the other end thereof attached fixedly to the driving member. Under these assumptions, the invention is arranged so that the driving frequency of the piezo-electric element will fall within the range of:

$$\frac{2 \cdot f1 \cdot f2}{f1 + f2} < f < f2$$

The voltages supplied to the piezo-electric element, and the displacements, velocities and acceleration of the moving member in the inventive driving setup are as illustrated in FIG. 27(a), FIG. 27(b), FIG. 28 and FIG. 29.

Figure 42:
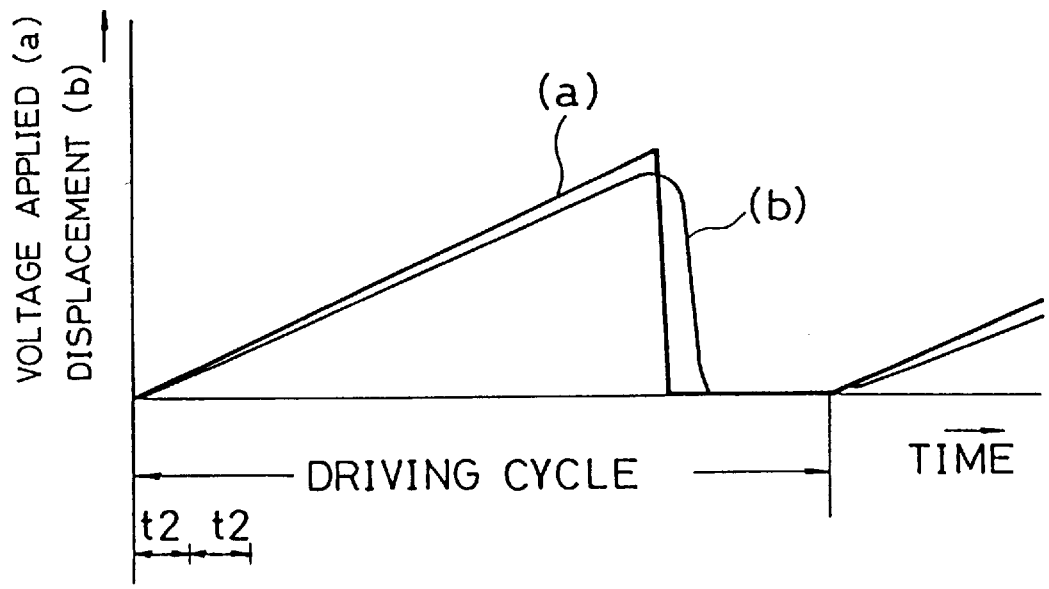
FIG. 42 is a diagram showing typical displacements generated according to the invention at a low frequency.
Figure 43:
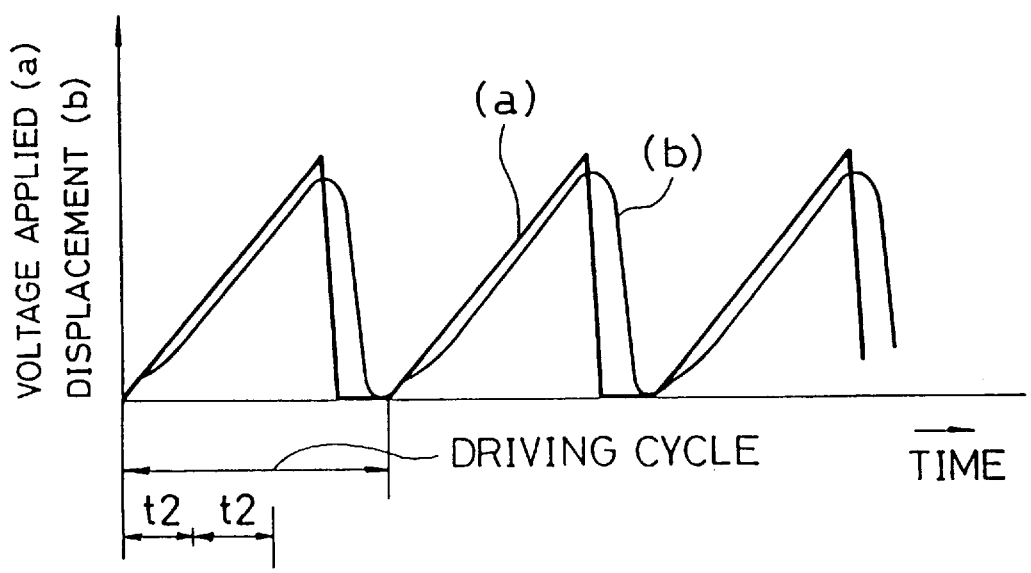
FIG. 43 is a diagram showing typical displacements generated according to the invention at a high frequency.

According to the invention, whether the driving member moves in the target direction or opposite to the target direction, there occurs slippage between the driving and the moving member. This means that the delay time is 2·t2 throughout the driving periods. Because the delay in response is much smaller with the invention than with the prior art (since t1≫t2), high-frequency driving pulses such as those shown in FIG. 42 and FIG. 43 still allow the piezo-electric element to be fully displaced. In this way, the driving frequency is made higher than ever before.

The driving frequency fp2 at which the velocity of the inventive actuator peaks is in the range of:

fp2<f2 because $$fp2 < \frac{1}{2 \cdot t2}, \quad t2 < \frac{1}{2 \cdot f2}$$

Where the frictional force between the driving member and the moving member of the driving apparatus is made variable, a practically optimum frictional force is available. Such a setup can prevent those losses of the driving energy which are attributable to excess frictional forces needlessly applied.

Described below with reference to FIG. 44 through FIG. 49 is the third embodiment of the invention. This embodiment is arranged so that the frictional force between the driving and the moving member may be changed as needed. The third embodiment is similar in constitution to the second embodiment of FIG. 11 with the exception of the slider mechanism. In describing the third embodiment, the parts having their functionally equivalent counterparts in the second embodiment of FIG. 11 are given like reference numerals, and any repetitive descriptions of these parts are omitted. The constitution of the slider mechanism will be specifically described.

Figure 44:
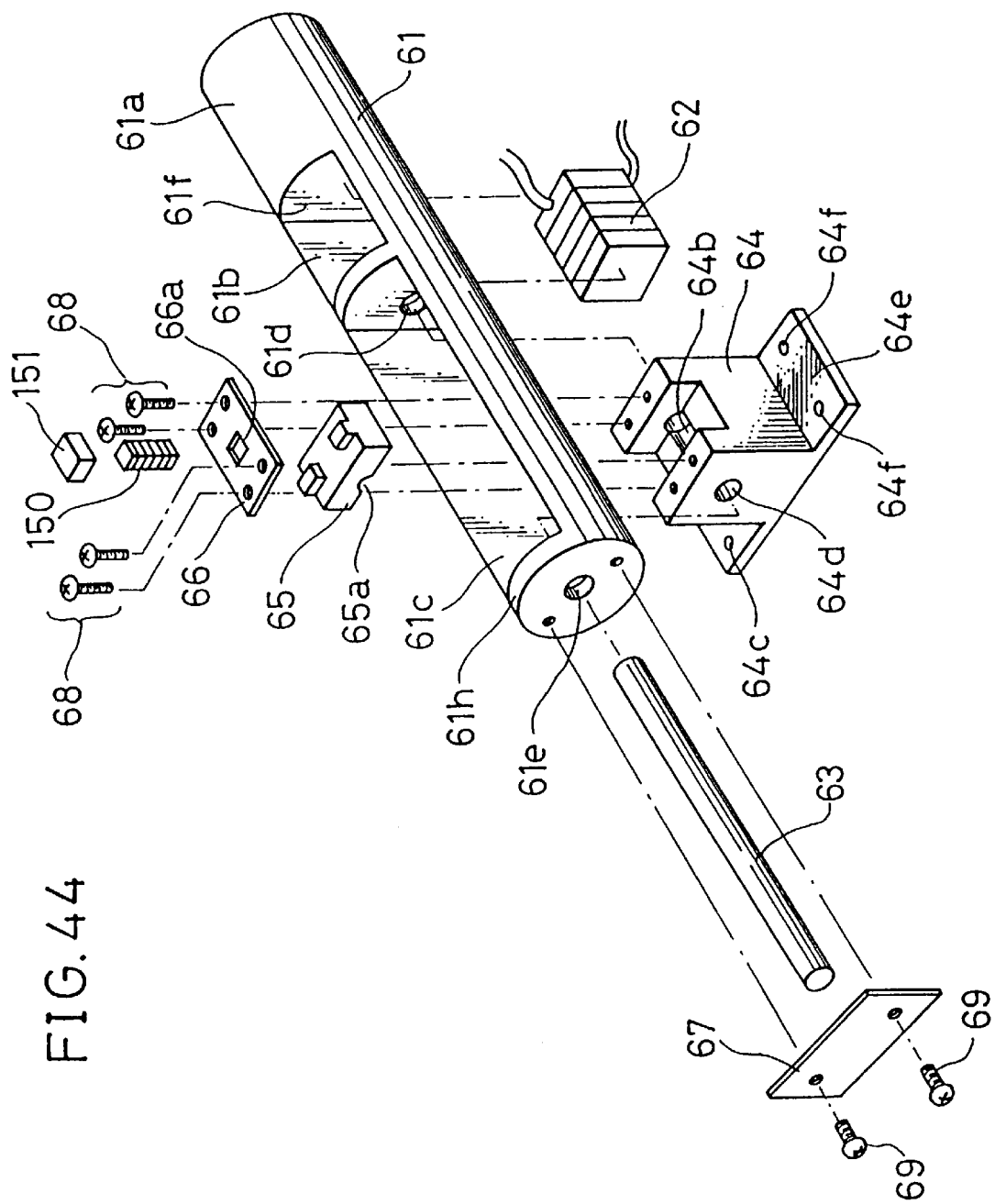
FIG. 44 is an exploded perspective view of a driving apparatus designed to vary the frictional force between the driving and the moving member in use and practiced as a third embodiment of the invention.
Figure 45:
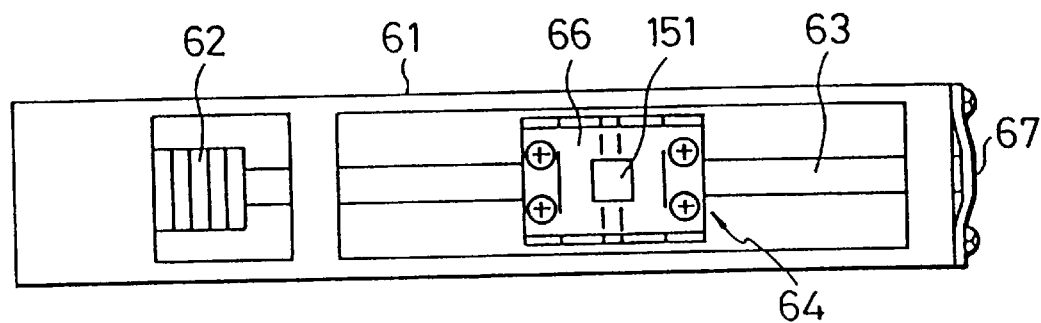
FIG. 45(a) is a plan view showing key components of the third embodiment of FIG. 44.
FIG. 45(b) is a cross-sectional view also showing key components of the third embodiment of FIG. 44.
Figure 45:
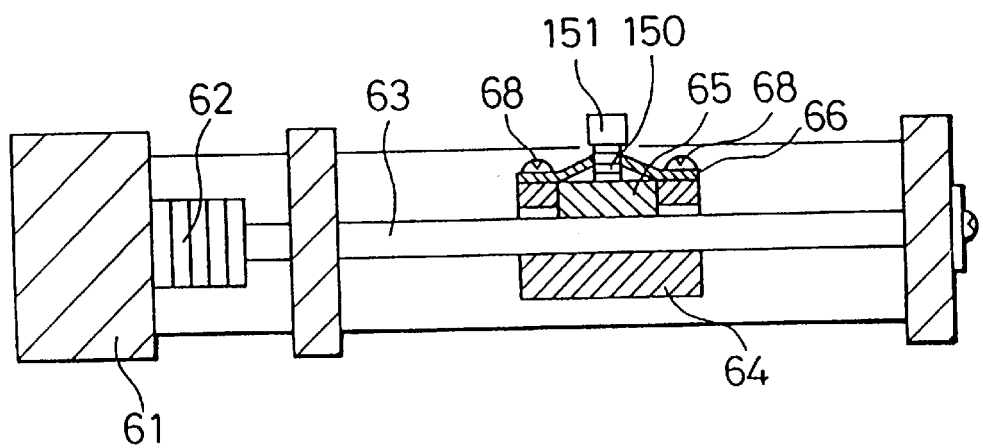

FIG. 44 is an exploded perspective view of the third embodiment. In FIG. 44, a friction member 65 located on top of the slider 64 has a groove 65a formed underneath with a semicircle cross section. The groove 65a engages a driving shaft 63 from above into a notch 64b of the slider 64. A plate spring 66 pushes from above the assembly of the friction member 65 and driving shaft 63. Four screws 68 secure the plate spring 66 to an edge of the slider 64. The actuating force of the plate spring 66 is transmitted to the driving shaft via the friction member 65.

One end of a second piezo-electric element 150 is attached with adhesive or the like to the top of the friction member 65. An inertial member 151 is attached also with adhesive or the like to the top of the second piezo-electric element 150. The second piezo-electric element 150 penetrates a through hole 66a in the middle of the plate spring 66. Thus the inertial member 151 is located above the plate spring 66.

FIG. 45(a) is a plan view showing the third embodiment as it is assembled, and FIG. 45(b) is a cross-sectional view taken on a plane along the driving shaft 63 and also showing the third embodiment as it is assembled.

Figure 46:
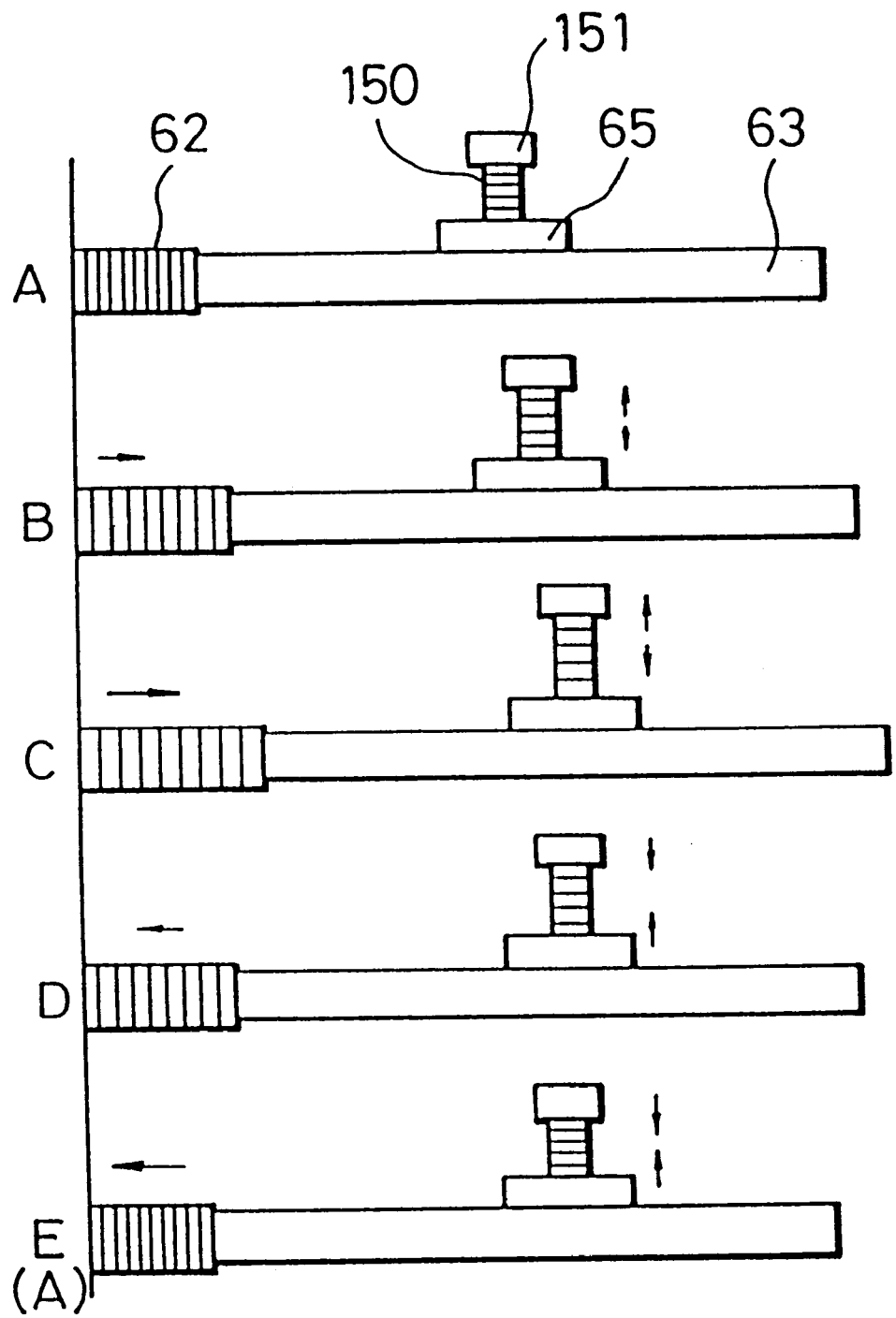
FIG. 46 is a view showing how the third embodiment of FIG. 44 works in one direction.
Figure 47A:
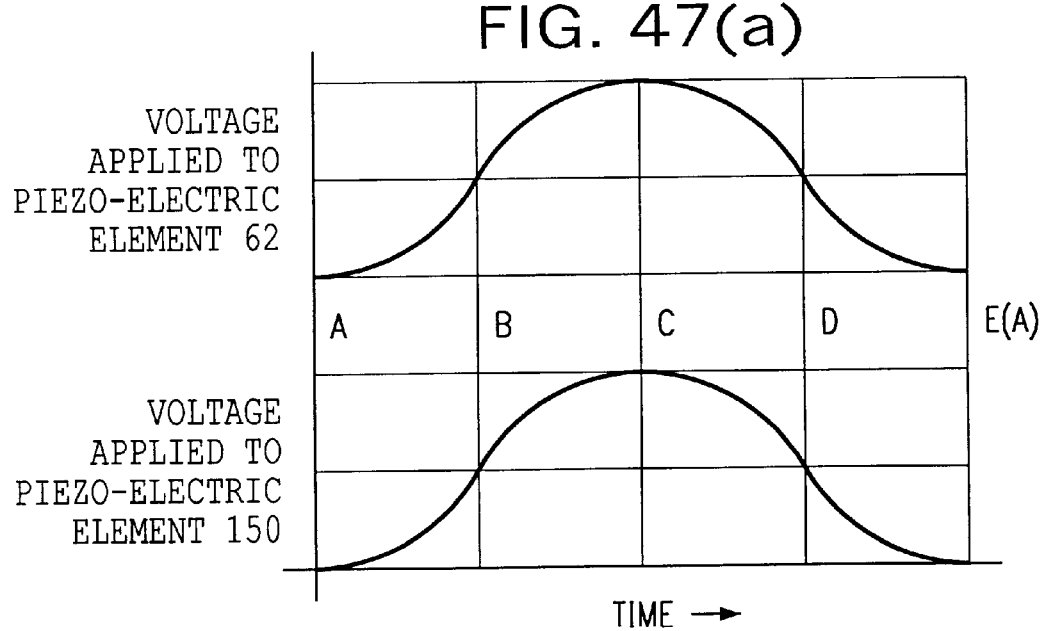
FIG. 47(a) and FIG. 47(b) are diagrams showing varying voltages applied to a piezo-electric element.
Figure 47B:
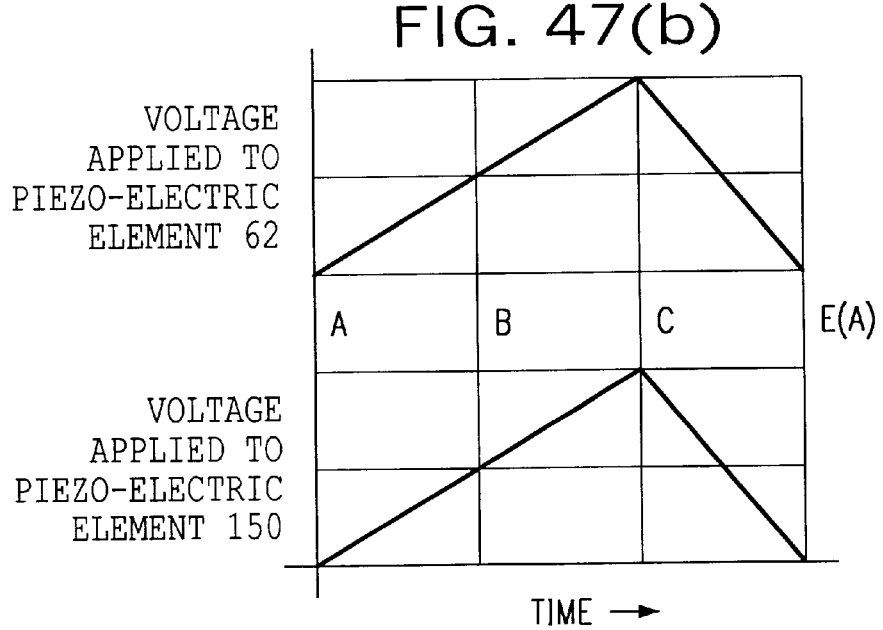
Figure 48:
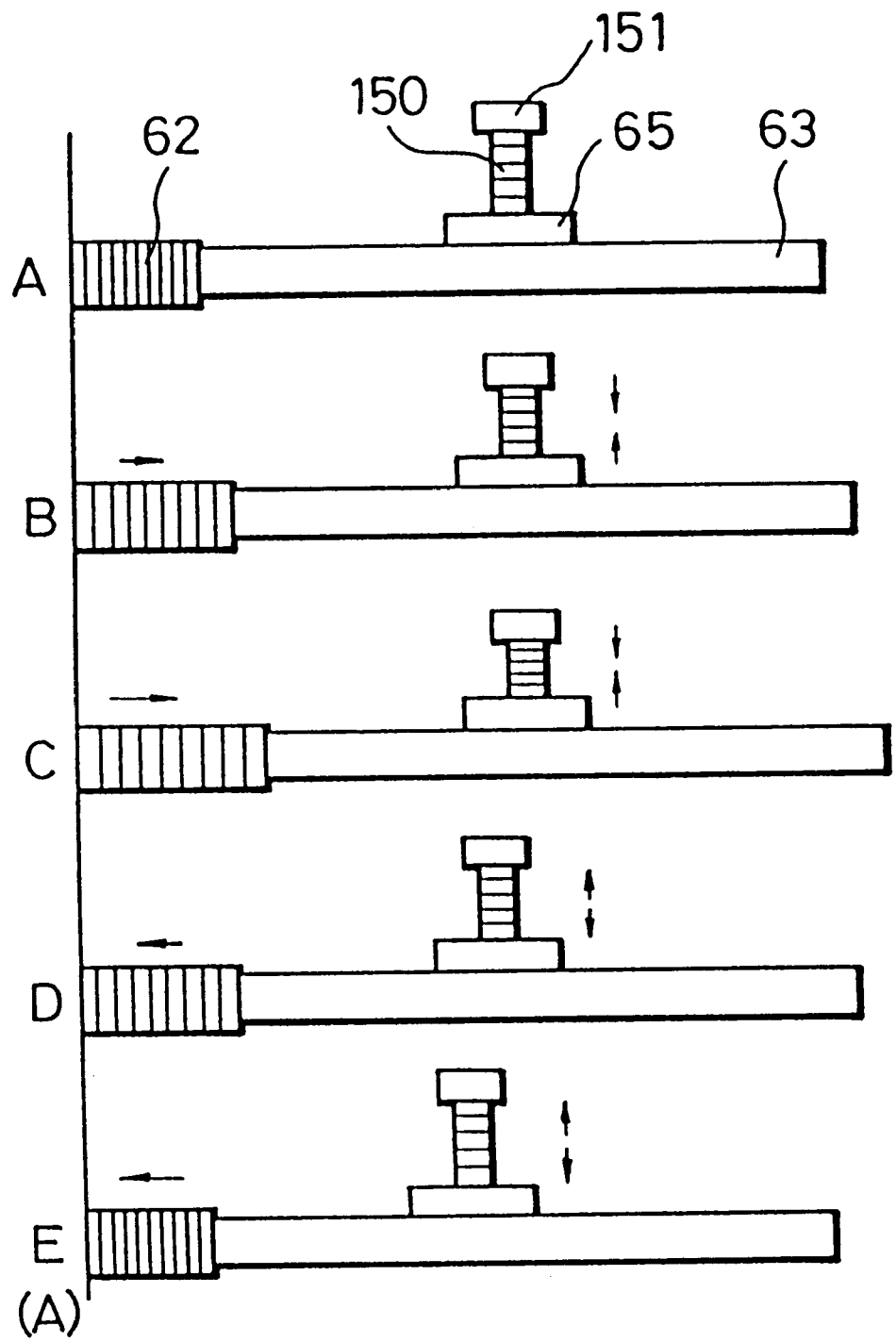
FIG. 48 is a view showing how the third embodiment of FIG. 44 works in the other direction.

How the piezo-electric elements 62 and 150 work will now be described with reference to FIG. 46 through FIG. 49. FIG. 46, FIG. 47(a) and FIG. 47(b) show the third embodiment with its slider 64 being moved rightward. More specifically, FIG. 46 depicts how the key components of the third embodiment work during the rightward movement of the slider, and FIG. 47(a) illustrates the driving voltages applied to the piezo-electric elements during the movement in FIG. 46. FIG. 48, FIG. 49(a) and FIG. 49(b) show the third embodiment with its slider 64 being moved leftward. More specifically, FIG. 48 depicts how the key component of the third embodiment work during the leftward movement of the slider, and FIG. 49(a) presents the driving voltages applied to the piezo-electric elements during the movement in FIG. 48. Since the slider 64 moves simultaneously with the friction member 65, only the friction member 65 is shown in FIGS. 46 and 48 for space reasons; the movement of the slider 64 and that of the friction member 65 are the same.

In FIG. 46 and FIG. 47(a), the initial state is represented by reference character A. In the initial state, both piezo-electric elements 62 and 150 are fed with no voltage. That is, each piezo-electric element is in its most contracted state.

Starting from the initial state, both piezo-electric elements 62 and 150 are supplied with voltages in a sine wave curve each, as shown from A through C in FIG. 47(a). This causes the two piezo-electric elements 62 and 150 to start expanding slowly, as shown in the state B of FIG. 46. As the piezo-electric element 62 expands, so does the piezo-electric element 150. This causes the inertial member 151 to receive an upward force and the friction member 65 a downward force. The force exerted to the friction member 65 increases the frictional force between the friction member 65 and the driving shaft 63. This causes the friction member 65 and slider 64 to follow the driving shaft 63 in the rightward movement of the latter. The friction member 65 and slider 64 keep moving until the driving shaft 63 reaches its rightmost position, as shown in the state C of FIG. 46.

After that, the supplied voltages are removed in keeping with the voltage curve that ranges from C to E in FIG. 47(a). This causes both piezo-electric elements 62 and 150 to contract. As the piezo-electric element 62 contracts, the driving shaft 63 moves leftward. The friction member 65 and slider 64 are about to follow the leftward movement of the driving shaft 63. At this point, however, the piezo-electric element 150 contracts to exert a downward force onto the inertial member 151 while the friction member 65 is being pulled up. This reduces the frictional force between the friction member 65 and the driving shaft 63, causing a slippage therebetween. As a result, the friction member 65 and slider 64 remain stationary where they are, as shown in the states C through E in FIG. 46.

Repeating the states A through E above causes the slider 64 to move rightward until the target position is reached.

Referring now to FIG. 48 and FIG. 49(a), the piezo-electric element 150 is first supplied with a maximum voltage, as shown in the state A of FIG. 49(a). This causes the piezo-electric element 150 to expand, as shown in the state A of FIG. 48. At this point, the inertial member 151 is given an upward force and the friction member 65 a downward force, whereby the friction member 65 is pushed into contact with the driving shaft 63.

After that, the piezo-electric element 62 is supplied with a voltage while the piezo-electric element 150 is deprived of its supplied voltage, as shown in the state B of FIG. 49(a). The piezo-electric element 62 then expands, moving the driving shaft 63 rightward as viewed in FIG. 48. At this point, the piezo-electric element 150 contracts to pull the friction member 65 upward, thus reducing the frictional force between the friction member 65 and the driving shaft 63. This allows the friction member 65 and the slider 64 to stay motionless where they are.

With the piezo-electric element 62 in its most expanded state of C in FIG. 49(a), the piezo-electric element 150 is fed with the voltage while the piezo-electric element 62 is deprived of its supplied voltage. This causes the piezo-electric element 62 to contract, moving the driving shaft 63 leftward. At this point, the piezo-electric element 150 in its expanding motion pushes the friction member 65 downward. This allows the friction member 65 and slider 64 to follow the movement of the driving shaft 63, until the state E of FIG. 48 is reached in which the piezo-electric element 62 contracts the most.

Repeating the states A through E above causes the slider 64 to move leftward until the target position is reached. After the target position has been reached, the piezo-electric element 150 being fed with the maximum voltage starts to be deprived thereof.

The specificities of the preceding description are not limitative of the invention. For example, the piezo-electric elements may be fed alternatively with the voltages of a chopping waveform as shown in FIG. 47(b) or FIG. 49(b) instead of the voltages of the sine curve waveform in FIG. 47(a) or FIG. 49(a). That is, where the slider 64 (together with the friction member 65) is to be moved rightward, the piezo-electric elements 62 and 150 are fed with voltages gradually, as shown in FIG. 47(b). When the piezo-electric elements 62 and 150 have expanded the most, the supplied voltages are quickly removed. Repeating these operations moves the slider 64 rightward.

Where the slider 64 (and the friction member 65) is to be moved leftward, the piezo-electric element 150 being fed with the voltage is first deprived rapidly thereof while the piezo-electric element 62 is supplied quickly with the voltage, as shown in FIG. 49(b). When the piezo-electric element 62 has expanded the most, the voltage supplied thereto is gradually reduced while the piezo-electric element 150 is fed gradually with its voltage. Repeating these operations causes the slider 64 to move leftward.

Where the piezo-electric elements are supplied with voltages whose rise and fall characteristics are made linear as outlined above, the resulting frictional force is available more optimally than when these elements are driven by sine wave voltages. Another advantage of the use of chopping wave voltages is that the efficiency of the driving operation is enhanced. A further advantage is that positioning control is made easier. The last feature is particularly convenient where fine positioning is required.

Meanwhile, the driving of the piezo-electric elements with sine wave voltages offers different advantages. One advantage is that the circuit constitution of the driving apparatus is simple and efficient compared with the setup utilizing voltages whose rise and fall characteristics are linear. Another advantage is the ease with which to drive the target member using high-frequency driving pulses.

As described, the driving apparatus according to the invention has the means for varying the frictional force between the driving and the moving member. This inventive constitution not only allows a practically optimum frictional force to be generated but also prevents those losses in the amount of movement which derive from the boosted frictional force. As such, the inventive driving apparatus employing the electro-mechanical transducer is practical and versatile in its usage.

Although the above-described embodiments, variations and examples of the invention deal mostly with the structure for driving the lens assembly of the focusing system in still cameras, video cameras and the like, the invention may be applied to many other driving and actuating apparatuses. Illustratively, specimen-carrying stages, positioning devices, manipulators and other precision equipment requiring control over fine movement of the target object can benefit from the driving apparatus according to the invention.

The embodiments discussed above utilize piezo-electric elements as their transducers. Known materials for making up the piezo-electric element include illustratively PZT (lead zirconate titanate), BaTiO (barium titanate) and LiNbO$_3$ (lithium niobate). This invention applies to these and other like materials.

In addition to piezo-electric elements, electrostrictive elements and magnetostrictors are known to be used as the transducer and thus fall within the scope of this invention. The magnetostrictor does not receive electric energy directly; it generates electric action internally under the influence of magnetism and turns what is generated into mechanical action.

Furthermore, optical-strictive elements also fall within the scope of this invention. Known materials for composing the optical-strictive element include PLZT and PVDF (polyvinylidene fluoride). Some of the optical-strictive elements generate electric action inside when receiving optical input; others do not generate such action. This invention applies to both types of these optical-strictive elements.

While there have been described preferred embodiments of the present invention, it will be apparent for those skilled in the art that changes and modifications can be made within the spirit and scope of the present invention as defined by the appended claims.

What is claimed is:

1. A driving apparatus comprising:

a driving mechanism having a transducer for producing repeatable linear displacements in a predetermined linear direction;

a moving member movable in a linear direction along the linear displacement of said transducer;

contact surfaces relatively frictionally contacted for frictionally supporting said moving member;

a friction mechanism for providing a friction force with said contact surfaces so as to produce a friction force necessary for moving said moving member; and a driving circuit for supplying said transducer with driving pulses of a frequency higher than the audio frequency for the human ear, said driving pulses having a wave form so as to displace the transducer in expanding and contracting linear directions thereof at different displacement velocities.

2. A driving apparatus according to claim 1, wherein the driving pulses supplied to said driving circuit have a frequency of at least 18 kHz.

3. A driving apparatus comprising:
a driving mechanism having a transducer for producing both expansion and contraction displacements along a predetermined linear direction;
a moving member movable in a linear direction along the linear displacement of said transducer;
contact surfaces relatively frictionally contacted for frictionally supporting said moving member;
a friction mechanism for providing a friction force with said contact surfaces so as to produce a friction force necessary for moving said moving member; and
a driving circuit for driving said transducer in such a manner that during both expansion and contraction of said transducer while the moving member is being moved in the predetermined linear direction, slippage will occur in said contact surfaces.

4. A driving apparatus according to claim 3, wherein said driving circuits supply said transducer with driving pulses such that an acceleration at least F/M will occur, wherein F represents the static frictional force resulting from the maximum coefficient of static friction generated between said contact surfaces and M denotes the mass of said moving member.

5. A driving apparatus comprising:
a transducer for producing both expansion and contraction displacements along a predetermined direction;
a driving member coupled with said transducer for simultaneous displacement therewith and having a guide surface formed along the direction of displacement of said transducer;
a moving member having a friction part in contact with the guide surface of said driving member, said moving member being moved in a predetermined direction along said guide surface by repetition of the expansion and contraction of said transducer;
a driving circuit for driving said transducer in such a manner that during both expansion and contraction of said transducer, slippage will occur between said driving member and said moving member;
wherein said driving circuit supplies said transducer with driving pulses having a frequency f falling within the range of:

$$(2 \cdot f1 \cdot f2)/(f1+f2) < f < f2$$

where, f1 denotes the resonance frequency in effect when one end of said transducer is secured and the other end thereof is attached fixedly to said driving member and said moving member, and f2 denotes the resonance frequency in effect when one end of said transducer is secured and the other end thereof is attached fixedly to said driving member.

6. A driving apparatus comprising:
a transducer for producing both expansion contraction displacements along a predetermined direction;
a driving member coupled with said transducer for simultaneous displacement therewith and having a guide surface formed along the direction of displacement of said transducer;
a moving member having a friction part in contact with the guide surface of said driving member, said member being moved in a predetermined direction along said guide surface by repetition of the expansion and contraction of said transducer;
a driving circuit for driving said transducer in such a manner that during both expansion and contraction of said transducer, slippage will occur between said driving member and said moving member;
wherein said driving circuit supplies said transducer with driving pulses having a frequency f falling within the range of:

$$\tfrac{1}{3}f2 \leq f \leq \tfrac{2}{3}f2$$

where, f2 denotes the resonance frequency in effect when one end of said transducer is secured and the other end thereof is attached fixedly to said driving member.

7. A driving apparatus comprising:
a driving mechanism having a displacement transducer for producing displacement in a predetermined direction;
a moving member movable along said displacement direction;
contact surfaces relatively frictionally contacted for continuously frictionally supporting said moving member;
a pushing member having a contact transducer provided on said moving member displaced in such a direction as to cause said pushing member to push said moving member to vary the frictional engagement of said contact surfaces as a function of voltage applied to the contact transducer; and
a driver which supplies variable voltages to said displacement transducer and said contact transducer in such a manner that the amount of friction of said contact surfaces is varied in synchronism with the displacement of said displacement transducer so as to allow said moving member to move.

8. A driving apparatus according to claim 7, further comprising:
a first driving circuit for supplying said displacement transducer with driving pulses for displacing said displacement transducer in a reciprocating manner in a predetermined direction; and
a second driving circuit for supplying said contact transducer with driving pulses so that when said displacement transducer is displaced in such a direction as to move said moving member, said contact transducer will push said friction part against said guide surface.

9. A driving apparatus according to claim 8, wherein said first driving circuit supplies said displacement transducer with driving pulses so as to drive said displacement transducer in the expanding and contracting directions thereof at different displacement velocities.

10. A driving method for driving a moving member frictionally supported by contact surfaces to be movable by a transducer displacing along a predetermined linear direction in a reciprocating manner, said driving method comprising the steps of:
displacing firstly said transducer linearly in the predetermined direction by use of a first force causing slippage between said contact surfaces;
displacing secondly said transducer linearly in a second direction opposite to said predetermined direction by use of a second force greater than said first force; and
repeating the first and second step to continue motion of the moving member in the predetermined direction.

11. A driving method according to claim 10, further comprising the step of repeating said first and said second step at least 18,000 times per second.

12. A driving method for driving a moving member frictionally supported by contact surfaces to be movable in a predetermined first direction by a transducer displacing in a reciprocating manner, said driving method comprising the steps of:

displacing firstly said transducer in the first direction by use of a first force causing slippage between said contact surfaces;

displacing secondly said transducer linearly in a second direction opposite to said first direction by use of a second force greater than said first force causing slippage between said contact surfaces; and repeating the first step and the second step to continuously move the moving member in the first direction.

13. A driving apparatus comprising:

a transducer for producing linear displacement in a predetermined direction;

a driving member coupled with said transducer for simultaneous displacement therewith;

a contacting member contacting the driving member to urge the driving member against the transducer in the direction of the linear displacement of said transducer;

a stationary member defining a first aperture and a second aperture, a first surface and a second surface of the stationary member forming a portion of the first aperture, an end of the transducer fixed to the first surface of the stationary member, a third surface and fourth surface of the stationary member forming a portion of the second aperture, the second surface and third surface being connected by a first bearing hole, the fourth surface of said stationary member having a second bearing hole formed therethrough, a first end of the driving member being in contact with the transducer, the driving member being supported for movement in the predetermined linear direction in said first and second bearing holes, the contacting member being a spring acting on an end of the driving member opposite the end in contact with the transducer.

14. The driving apparatus of claim 13 wherein the spring is secured to the stationary member by detachable fasteners.

15. The driving apparatus of claim 13 wherein the spring is attached to the stationary member by fastening elements permitting an adjustment of the force exerted by the spring on the driving member.

16. The driving apparatus of claim 13 wherein the stationary member is formed by a main portion and a end plate removably secured to the main portion, said first bearing hole formed through the end plate, said spring mounted on said end plate.

17. A driving apparatus comprising:

a transducer for producing linear displacement in a predetermined direction;

a driving member coupled with said transducer for simultaneous displacement therewith;

a contacting member contacting the driving member to urge the driving member against the transducer in the direction of the linear displacement of said transducer;

a stationary member, an end of the transducer being fixed to a first surface of the stationary member, a first end of the driving member being in contact with said transducer, the stationary member having a plurality of bearing holes, said driving member being supported for movement in the predetermined linear direction by said bearing holes, said contacting member being a spring member acting on an end of the driving opposite the end in contact with the transducer.

* * * * *

UNITED STATES PATENT AND TRADEMARK OFFICE
CERTIFICATE OF CORRECTION

PATENT NO. : 6,111,336
DATED : August 29, 2000
INVENTOR(S) : Ryuichi Yoshida, Yasuhiro Okamoto, and Minoru Kuwana Page 1 of 1

It is certified that error appears in the above-identified patent and that said Letters Patent is hereby corrected as shown below:

Title page,
Item [30] Foreign Application Priority Data, insert

-- March 29, 1994    [JP]    Japan    6-081127
    March 29, 1994    [JP]    Japan    6-081128
    March 29, 1994    [JP]    Japan    6-081129
    March 29, 1994    [JP]    Japan    6-081130
    April 26, 1994    [JP]    Japan    6-088562
    April 27, 1994    [JP]    Japan    6-089797
    August 30, 1994    [JP]    Japan    6-227396
    October 4, 1994    [JP]    Japan    6-240339
    November 21, 1994    [JP]    Japan    6-309488 --.

Column 35,
Line 59 (claim 6, line 2), after "expansion", insert -- and --.
Line 66 (claim 6, line 9), after the second instance of "said", insert -- moving --.

Column 38,
Line 33 (claim 17, line 16), delete "member".
Line 33 (claim 17, line 16), after "driving", insert -- member --.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*